(12) United States Patent  (10) Patent No.: US 8,306,503 B2
Morrison  (45) Date of Patent: Nov. 6, 2012

(54) MOBILE ALERTING NETWORK

(75) Inventor: James Morrison, Henderson, NV (US)

(73) Assignee: Global Alert Network, Inc., Howard, PA (US)

( * ) Notice: Subject to any disclaimer, the term of this patent is extended or adjusted under 35 U.S.C. 154(b) by 521 days.

(21) Appl. No.: 12/351,641

(22) Filed: Jan. 9, 2009

(65) Prior Publication Data

US 2009/0209233 A1  Aug. 20, 2009

Related U.S. Application Data

(63) Continuation-in-part of application No. 12/251,155, filed on Oct. 14, 2008, now Pat. No. 8,126,479, which is a continuation-in-part of application No. 11/970,922, filed on Jan. 8, 2008, now Pat. No. 8,099,113.

(51) Int. Cl.
*H04M 11/00* (2006.01)
*H04M 1/66* (2006.01)
*H04M 1/68* (2006.01)
*H04M 3/16* (2006.01)

(52) U.S. Cl. ..................................................... 455/411

(58) Field of Classification Search .............. 455/67.11, 455/558, 575.1–4, 572, 550.1, 34.1, 34.2, 455/59, 208, 57, 343.1–343.4, 456.1, 438, 455/988, 426.1, 426.19, 539.13, 521, 506, 455/41.1, 517, 504, 404.1, 132, 90; 340/904, 340/436, 990, 995.1, 988, 907, 426.16, 426.19, 340/438, 539.13, 902, 326, 539, 994, 961, 340/905, 693.1, 693.2, 693.3, 903, 901; 701/204, 701/207, 208, 211, 213, 214, 301, 300, 1, 701/19, 23, 200
See application file for complete search history.

(56) References Cited

U.S. PATENT DOCUMENTS

| | | | | |
|---|---|---|---|---|
| 4,894,642 A | * | 1/1990 | Ashbaugh et al. | 340/692 |
| 5,021,780 A | * | 6/1991 | Fabiano et al. | 340/994 |
| 5,091,906 A | * | 2/1992 | Reed et al. | 370/278 |

(Continued)

FOREIGN PATENT DOCUMENTS

JP  2003217088 A1  7/2003

(Continued)

OTHER PUBLICATIONS

"U.S. Appl. No. 11/970,922, Final Office Action mailed Apr. 8, 2011", 20 pgs.

(Continued)

*Primary Examiner* — Melody Mehrpour

(74) *Attorney, Agent, or Firm* — Schwegman, Lundberg & Woessner, P.A.

(57) ABSTRACT

A system for providing a mobile application includes a Mobile Subscriber Detection Authorization and Verification System (MSDAVS), to request and receive confidential information from a confidential information owner relating to a user who opted-in to a mobile service application, and to communicate the received confidential information to a mobile application service provider. The MSDAVS can include an opt-in database, to store opt-in or registration data of the opted-in users of the mobile service application and a service policy database. The mobile application service can be a mobile traffic alerting service, the confidential information owner a telephone number database of one of a wireless carrier or a telephone number database operator, and the requested confidential information a list telephone numbers of opted-in users in an alert area, defined by the mobile traffic alerting service.

48 Claims, 47 Drawing Sheets

U.S. PATENT DOCUMENTS

| | | | | |
|---|---|---|---|---|
| 5,181,027 | A | * | 1/1993 | Shafer .......................... 370/961 |
| 5,235,329 | A | * | 8/1993 | Jackson ........................ 340/902 |
| 5,289,181 | A | * | 2/1994 | Watanabe et al. ............. 340/902 |
| 5,307,060 | A | * | 4/1994 | Prevulsky et al. ............. 340/902 |
| 5,402,117 | A | * | 3/1995 | Zijderhand ................... 340/905 |
| 5,440,489 | A | * | 8/1995 | Newman ........................ 701/20 |
| 5,554,982 | A | | 9/1996 | Shirkey et al. |
| 6,236,336 | B1 | * | 5/2001 | Oliva et al. .................... 340/901 |
| 6,411,220 | B1 | | 6/2002 | Davis et al. |
| 6,590,507 | B2 | | 7/2003 | Burns |
| 6,882,837 | B2 | | 4/2005 | Fernandez et al. |
| 6,944,679 | B2 | | 9/2005 | Parupudi et al. |
| 6,973,384 | B2 | | 12/2005 | Zhao et al. |
| 6,990,407 | B1 | | 1/2006 | Mbekeani et al. |
| 7,099,774 | B2 | * | 8/2006 | King et al. .................... 701/213 |
| 7,260,472 | B2 | | 8/2007 | Sutardja |
| 7,319,931 | B2 | | 1/2008 | Uyeki et al. |
| 7,385,499 | B2 | | 6/2008 | Horton et al. |
| 7,502,687 | B2 | * | 3/2009 | Flick ............................. 701/213 |
| 7,609,203 | B2 | | 10/2009 | Dockemeyer, Jr. et al. |
| 7,653,480 | B2 | | 1/2010 | Tsuge et al. |
| 7,764,946 | B1 | | 7/2010 | Sennett et al. |
| 7,769,544 | B2 | * | 8/2010 | Blesener et al. ............. 701/301 |
| 7,898,407 | B2 | | 3/2011 | Hufton |
| 8,099,113 | B2 | | 1/2012 | Morrison |
| 8,126,479 | B2 | | 2/2012 | Morrison |
| 8,126,480 | B2 | | 2/2012 | Morrison |
| 2002/0103668 | A1 | | 8/2002 | Ecklund et al. |
| 2003/0014187 | A1 | | 1/2003 | Chun et al. |
| 2003/0046541 | A1 | | 3/2003 | Gerdes et al. |
| 2004/0203851 | A1 | | 10/2004 | Vetro et al. |
| 2005/0250440 | A1 | | 11/2005 | Zhou et al. |
| 2005/0266894 | A9 | | 12/2005 | Rankin |
| 2006/0089160 | A1 | | 4/2006 | Othmer |
| 2006/0246911 | A1 | | 11/2006 | Petermann |
| 2007/0091836 | A1 | | 4/2007 | Oprescu-Surcobe et al. |
| 2007/0149214 | A1 | | 6/2007 | Walsh et al. |
| 2007/0265006 | A1 | | 11/2007 | Washok et al. |
| 2007/0293210 | A1 | * | 12/2007 | Strub et al. .................... 455/420 |
| 2007/0299601 | A1 | | 12/2007 | Zhao et al. |
| 2008/0083000 | A1 | | 4/2008 | Orrell et al. |
| 2008/0133336 | A1 | * | 6/2008 | Altman et al. .................. 705/10 |
| 2008/0134276 | A1 | | 6/2008 | Orrell et al. |
| 2008/0167017 | A1 | * | 7/2008 | Wentker et al. ............ 455/414.1 |
| 2009/0118995 | A1 | | 5/2009 | Zhao et al. |
| 2009/0163183 | A1 | | 6/2009 | O'donoghue et al. |
| 2009/0176511 | A1 | | 7/2009 | Morrison |
| 2009/0176512 | A1 | | 7/2009 | Morrison |
| 2009/0233575 | A1 | | 9/2009 | Morrison |
| 2009/0233633 | A1 | | 9/2009 | Morrison |
| 2009/0299857 | A1 | | 12/2009 | Brubaker |
| 2009/0315770 | A9 | | 12/2009 | Abraham et al. |
| 2010/0069093 | A1 | | 3/2010 | Morrison |

FOREIGN PATENT DOCUMENTS

| | | |
|---|---|---|
| KR | 1020030041112 A | 5/2003 |
| KR | 1020050017256 A | 2/2005 |
| KR | 1020070005762 A | 1/2007 |
| KR | 1020070071664 A | 7/2007 |
| WO | WO-2009089251 A2 | 7/2009 |

OTHER PUBLICATIONS

"U.S. Appl. No. 11/970,922, Non Final Office Action mailed Dec. 21, 2010", 18 pgs.

"U.S. Appl. No. 11/970,922, Response filed Mar. 21, 2011 to Non Final Office Action mailed Dec. 21, 2010", 17 pgs.

"U.S. Appl. No. 12/402,286, Final Office Action mailed Apr. 14, 2011", 15 pgs.

"U.S. Appl. No. 12/402,286, Non Final Office Action mailed Jan 3, 2011", 14 pgs.

"U.S. Appl. No. 12/402,286, Response filed Apr. 4, 2011 to Non Final Office Action mailed Jan. 3, 2011", 15 pgs.

"U.S. Appl. No. 12/402,310, Non Final Office Action mailed Apr. 7, 2011", 11 pgs.

"U.S. Appl. No. 12/566,012, Non Final Office Action mailed Apr. 20, 2011", 16 pgs.

"U.S. Appl. No. 12/566,012, Non Final Office Action mailed Dec. 28, 2010", 12 pgs.

"U.S. Appl. No. 12/566,012, Response filed Mar. 25, 2011 to Non Final Office Action mailed Dec. 28, 2010", 16 pgs.

"U.S. Appl. No. 12/566,012, Response filed Mar. 28, 2011 to Non Final Office Action mailed Dec. 28, 2010", 16 pgs.

"International Application No. PCT/US2009/030278, International Search Report mailed Aug. 27, 2009", 3 pgs.

"International Application No. PCT/US2009/030278, Written Opinion mailed Aug. 27, 2009", 4 pgs.

"U.S. Appl. No. 11/970,922 , Response filed Aug. 17, 2011 to Non Final Office Action mailed Jun. 21, 2011", 13 pgs.

"U.S. Appl. No. 11/970,922, Non Final Office Action mailed Jun. 21, 2011", 6 pgs.

"U.S. Appl. No. 11/970,922, Notice of Allowance mailed Sep. 14, 2011", 5 pgs.

"U.S. Appl. No. 11/970,922, Response filed Jun. 8, 2011 to Final Office Action mailed Apr. 8, 2011", 20 pgs.

"U.S. Appl. No. 12/251,155 , Response filed Sep. 29, 2011 to Non Final Office Action mailed Jun. 29, 2011", 12 pgs.

"U.S. Appl. No. 12/251,155, Non Final Office Action mailed Jun. 29, 2011", 14 pgs.

"U.S. Appl. No. 12/251,155, Notice of Allowance mailed Oct. 13, 2011", 5 pgs.

"U.S. Appl. No. 12/402,286, Advisory Action mailed Jul. 1, 2011", 3 pgs.

"U.S. Appl. No. 12/402,286, Non Final Office Action mailed Oct. 31, 2011", 15 pgs.

"U.S. Appl. No. 12/402,286, Response filed Jun. 14, 2011 to Final Office Action mailed Apr. 14, 2011", 8 pgs.

"U.S. Appl. No. 12/566,012 , Response filed Oct. 11, 2011 to Final Office Action mailed Aug. 11, 2011", 9 pgs.

"U.S. Appl. No. 12/566,012, Final Office Action mailed Aug. 11, 2011", 17 pgs.

"U.S. Appl. No. 12/566,012, Notice of Allowance mailed Oct. 19, 2011", 5 pgs.

"U.S. Appl. No. 12/566,012, Response filed Jul. 20, 2011 to Non Final Office Action mailed Apr. 20, 2011", 17 pgs.

"U.S. Appl. No. 12/402,286 , Response filed Feb. 29, 2012 to Non Final Office Action mailed Oct. 31, 2011", 15 pgs.

"U.S. Appl. No. 12/402,286, Decision on Pre-Appeal Brief mailed Aug. 23, 2011", 2 pgs.

"U.S. Appl. No. 12/402,286, Non Final Office Action mailed Mar. 12, 2012", 9 pgs.

"U.S. Appl. No. 12/402,286, Pre-Appeal Brief filed Jul. 14, 2011", 5 pgs.

"U.S. Appl. No. 13/323,111, Preliminary Amendment filed Dec. 12, 2011", 7 pgs.

"U.S. Appl. No. 13/360,192, Preliminary Amendment filed Jan. 27, 2012", 8 pgs.

* cited by examiner

111 — collecting traffic information from a plurality of traffic data providers

112 — optionally creating a traffic-assessment by modeling traffic using collected traffic information 113 — identifying a traffic event by integrating collected traffic information and optionally the traffic assessment

122 — determining a location of the mobile communicator from location data provided by mobile communication stations of a mobile communication network or from data provided by a global positioning system 123 — selecting the user-zone as an area centered at the location of the mobile communicator with a shape and extent

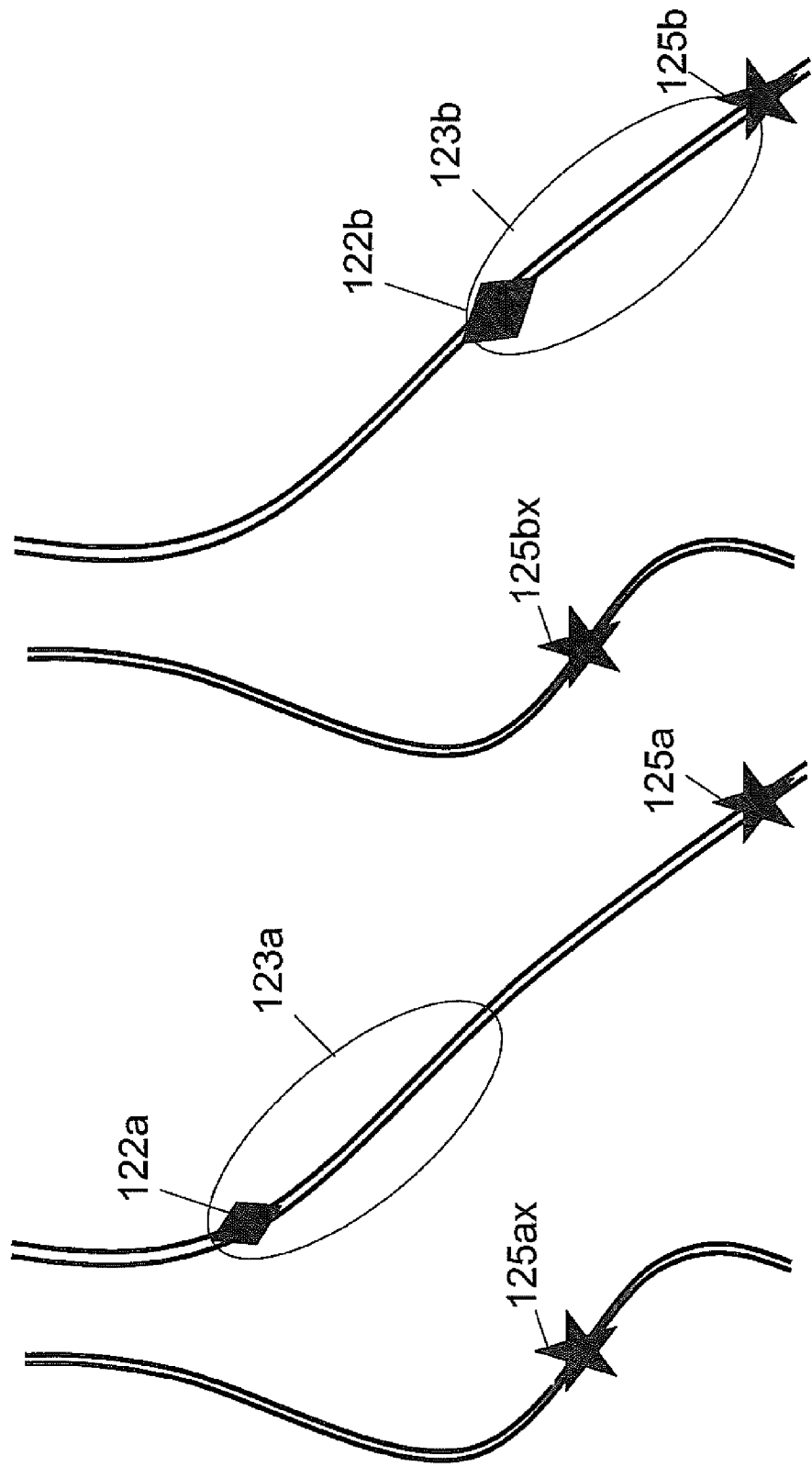

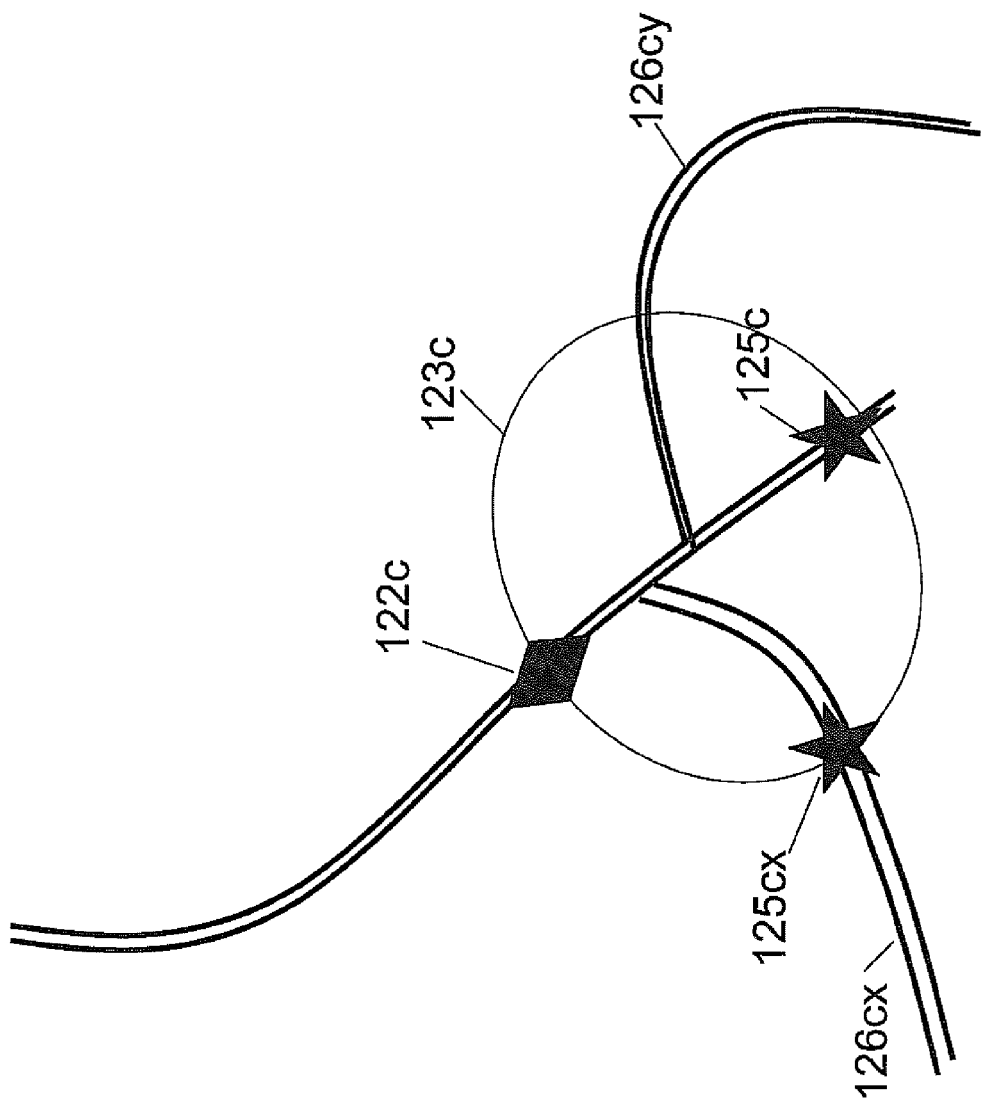

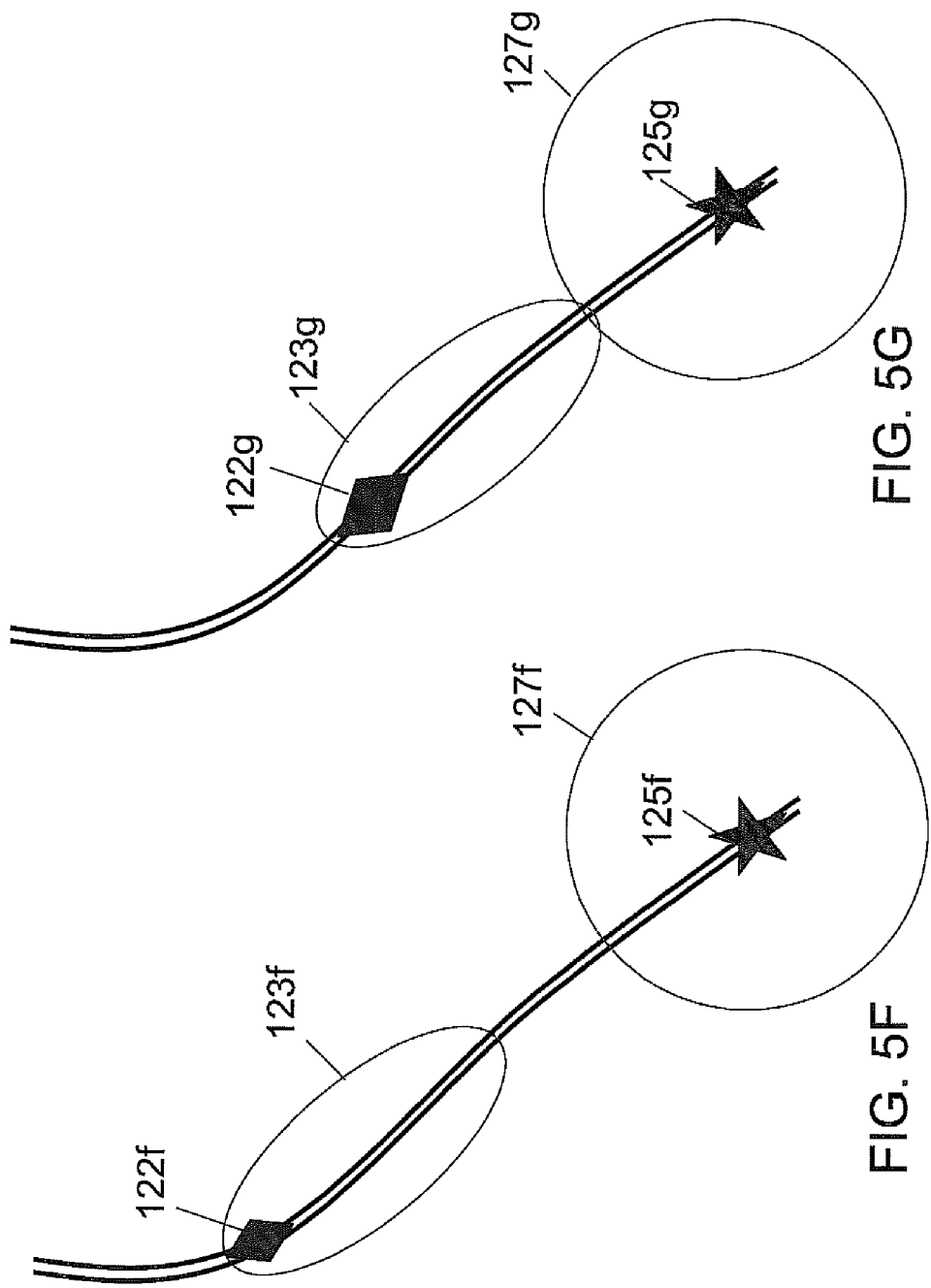

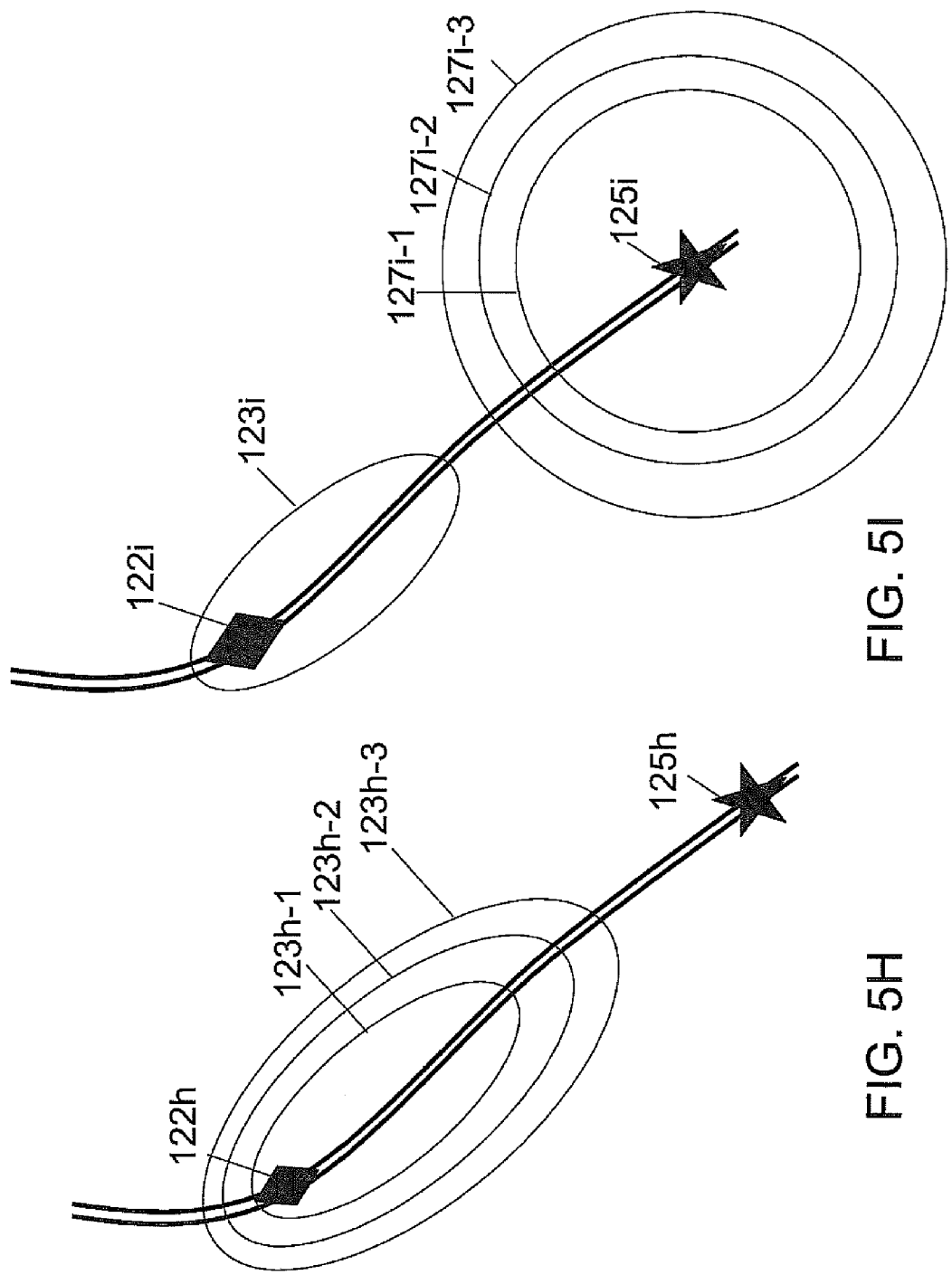

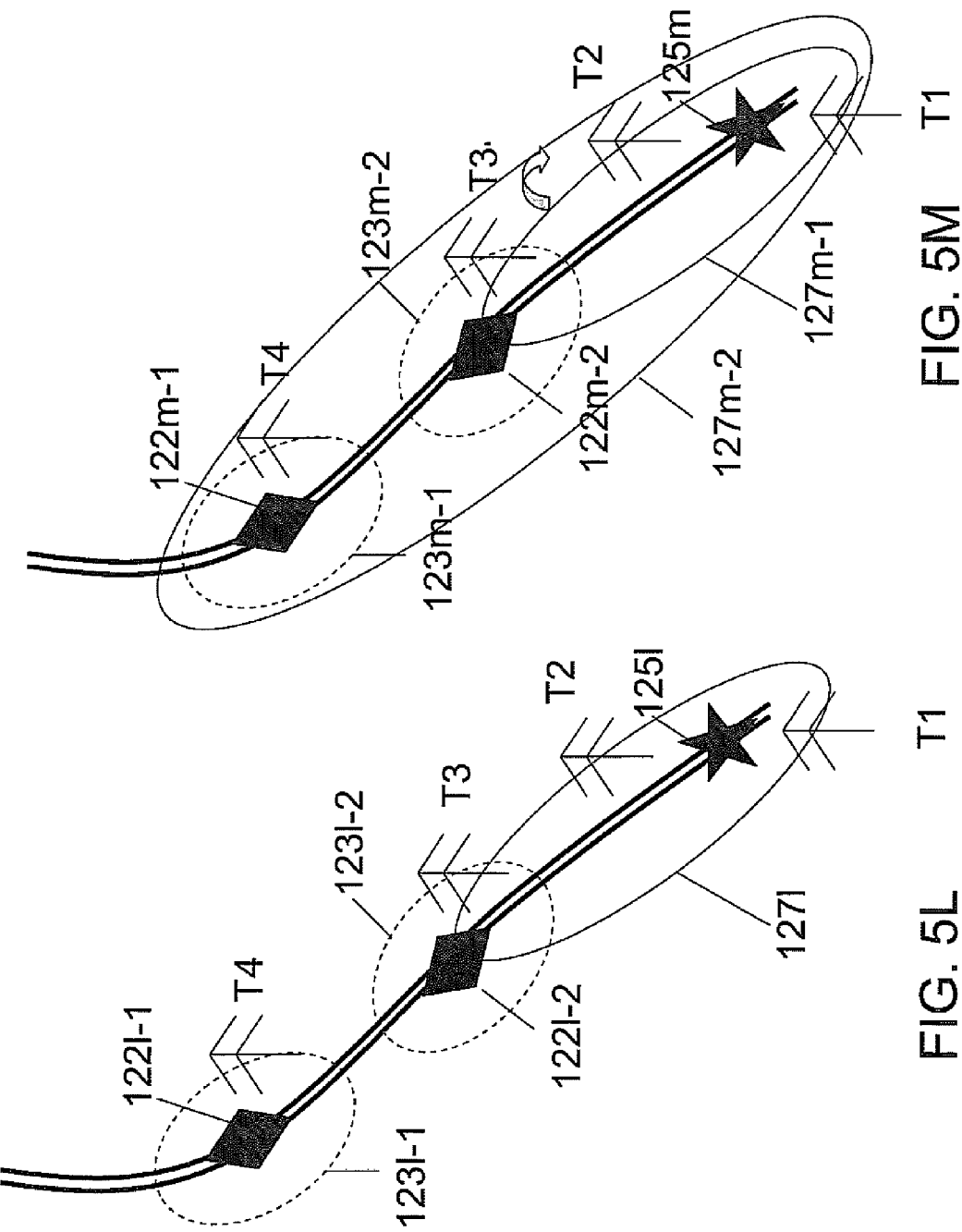

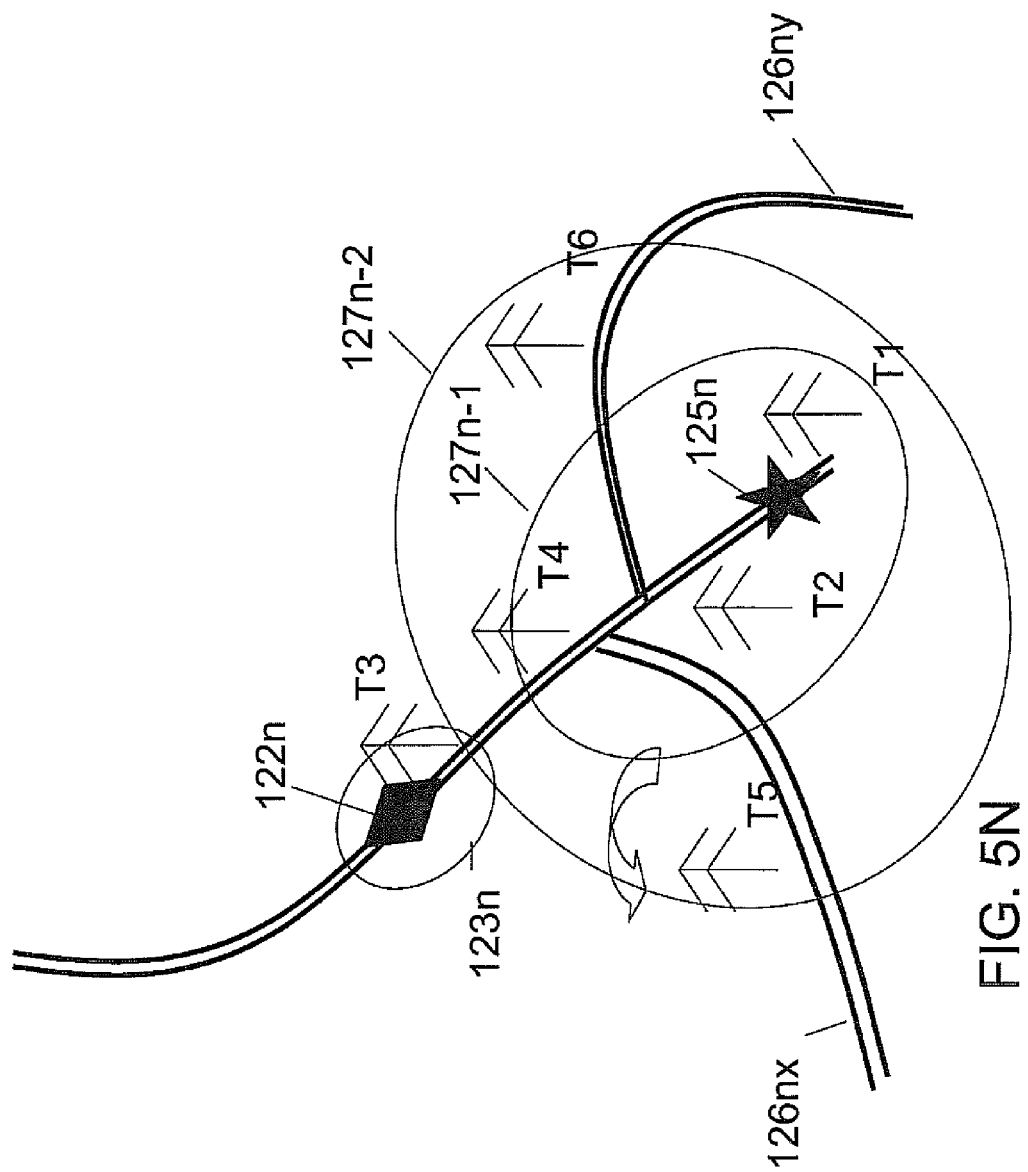

137 — passively alerting the mobile communicator regarding the selected traffic event 138 — open application: basic broadcast in response to mobile communicator requesting more information 139 — premium application: offering sponsored information

```
                            ┌─────────────────────────────┐
                   210 ─────│ identifying traffic events  │
                            │ from analyzing traffic      │
                            │ information                 │
                            └─────────────┬───────────────┘
                                          │
                            ┌─────────────┴───────────────┐
                   220 ─────│ selecting a user-zone based │
                            │ on a location related to a  │
                            │ mobile communicator         │
                            └─────────────┬───────────────┘
                                          │
                            ┌─────────────┴───────────────┐
                   230 ─────│ selecting an identified     │
                            │ traffic event based on a    │
                            │ relation of identified      │
                            │ traffic events and the      │
                            │ user-zone                   │
                            └─────────────┬───────────────┘
                                          │
                            ┌─────────────┴───────────────┐
                   240 ─────│ alerting the mobile         │
                            │ communicator with a passive │
                            │ message regarding the       │
                            │ selected traffic event      │
                            └─────────────────────────────┘
```

FIG. 9

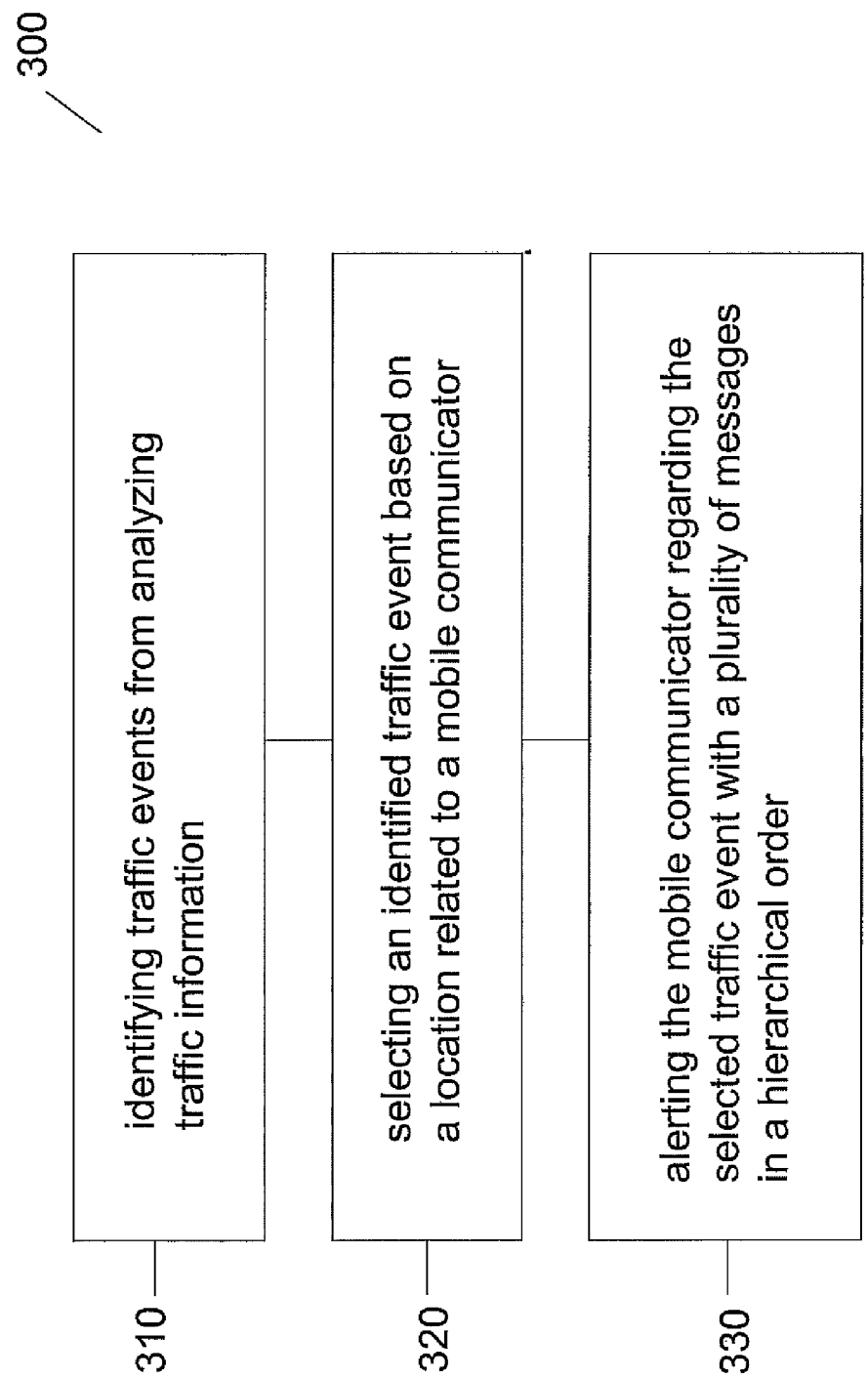

| Campaign Interface 1800 | Type of Alert 1810 | Promotional Offer 1820 |
|---|---|---|
| | Store/Vendor Location 1830 | Duration, Time period 1840 |
| | Billing Arrangements 1850 | |
| | Reporting 1860 | |

FIG. 23

MOBILE ALERTING NETWORK

RELATED APPLICATIONS

The present application is a continuation-in-part of application Ser. No. 12/251,155, filed Oct. 14, 2008, entitled MOBILE ALERTING NETWORK, which is a continuation-in-part of application Ser. No. 11/970,922 filed Jan. 8, 2008, entitled PASSIVE TRAFFIC ALERT AND COMMUNICATION SYSTEM, both of which are hereby incorporated by reference in their entirety.

BACKGROUND

1. Field of Invention

The present invention relates to mobile alerting systems, more precisely to location based alerting systems related to traffic and promotional content.

2. Description of Related Art

With great progress on every front of telecommunications, many new types of uses of these technologies emerge. One thrust of evolution involves providing traffic information more efficiently. At this time, traffic information is gathered in a somewhat disorganized manner. It is also relayed through inefficient channels.

Presently, the traffic information is often gathered from police reports, or the traffic helicopters of news channels, or road-side sensors. However, after an initial announcement of an overturned truck blocking traffic, the police may fail to inform the news channels that the overturned truck has been removed. Or the road side sensors may not appreciate that a lack of "slow car speed" signals does not necessarily indicate an "all clear" traffic condition. Famously, when the 35W bridge collapsed in Minneapolis in 2007, the roadside sensors signaled "normal traffic" several hours after the bridge collapse and total paralysis of the Minneapolis traffic. Thus, presently used traffic information may be outdated or incorrectly interpreted in some systems. Therefore, current methods of reporting traffic information are not necessarily reliable and leave room for improvements.

Further, the present methods of broadcasting traffic information are quite ineffective as well. In a larger metropolitan area news channels typically broadcast a long traffic report, which may list many traffic delays, accident and other problems all over the metropolitan area. However, most of these reports are not relevant for any particular driver on a particular road, forcing most users of this service to be exposed to unnecessarily long announcements. Worse yet, drivers inundated with a long report of traffic problems may get numbed and miss the one report which was relevant for their commute.

Various electronic service providers now offer devices which deliver more personalized traffic information. However, in many cases the driver has to enter e.g. on a webpage or into the device itself the specific route he or she is going to take, or store in a memory his/her typical commute route. In return, the service provides the road conditions only for the entered or stored roads. Thus, if e.g. a driver takes a less customary road on a given day and forgot to enter his choice, the provided traffic information is less useful. Further, the service provides the overall traffic information, not the one relevant for the particular location of the driver on the road, such as a convenient exit to take, or what is the expected time delay given the driver's location.

Also, many of these services require the driver to actively manipulate the device, e.g. launch an application on a cell phone. This requirement is problematic, as an increasing number of states and countries now require that the driver shall not divert his or her attention from driving by e.g. banning manual handling of cell phones. And even if a driver is prepared to launch an application, this interrupts the function presently carried out by the cell phone, such as the conversation the driver was having. Finally, many of these services are fee based—another inconvenience.

All of the aspects of present traffic delivery systems, described above, define areas where improvements are called for.

SUMMARY

Briefly and generally, a new passive traffic alerting method may include the steps of: identifying traffic events from analyzing traffic information; selecting an identified traffic event based on a location related to a mobile communicator; and alerting the mobile communicator with a passive message regarding the selected traffic event without prompting the mobile communicator to launch an application on a mobile communication device.

Some embodiments include the steps of: identifying traffic events from analyzing traffic information; selecting an identified traffic event based on a location related to a mobile communicator; and alerting the mobile communicator with a passive message regarding the selected traffic event without prompting the mobile communicator to launch an application on a mobile communication device.

Some embodiments include the steps of: identifying traffic events from analyzing traffic information; selecting a user-zone based on a location related to a mobile communicator; selecting an identified traffic event based on a relation of identified traffic events and the user-zone; and alerting the mobile communicator with a passive message regarding the selected traffic event.

Some embodiments include the steps of: identifying traffic events from analyzing traffic information; selecting an identified traffic event based on a location related to a mobile communicator; and alerting the mobile communicator regarding the selected traffic event with a plurality of messages in a hierarchical manner.

Some embodiments include the steps of: determining an alert zone by rating a traffic incident and overlaying a map of the incident, a map of cell-phone towers, and a map of a corresponding road network; acquiring user identification of cell phone users from data from cell-phone towers in the alert-zone; identifying subscribers from acquired cell-phone tower data; matching subscribers with appropriate alerts; sending appropriate alert messages to cell phones of identified subscribers.

Some embodiments include the steps of: receiving traffic alert information and start composing an alert message in response; composing alert message; compiling alert message in different formats; routing differently formatted alert messages to subscribers expecting that format; sending the routed alert messages to the corresponding subscribers through matching gateways of a service provider and a cell-phone carrier.

Some embodiments include a Mobile Alert Network service and system. The Mobile Alert Network (MAN) service can include identifying an Alert Area related to an Event Location, identifying a group of subscribers in the Alert Area, and broadcasting an Alert Message to the identified subscribers in a push-to-talk-equivalent (PTTE) environment.

The event can be any one of a wide variety of events, including a traffic accident, a weather alert, a recreational or sports event, or an E911 emergency situation, e.g. a chemical or hazardous material spill, possibly threatening with a health hazard.

The subscribers can be identified by their subscriber mobile ID, or by their International Mobile Equipment Identity (IMEI), or by any other handset identification information, such as an IMSI or MIN number, or by their phone number.

An Alert Message can be prepared and broadcast to the identified subscribers by a master broadcaster. The master broadcaster can be a Broadcast Module of a server of the MAN Service. The Alert Message can include a Short Message System (SMS) message. The MAN Service can be provided instead of, or in parallel to the regular SMS Aggregators.

The Alert Messages can contain three parts. Part 1 can alert the subscribers and inform them about the cause of alert, such as an accident or any other event. Part 2 can offer Alert Message related choices, such as receiving the Alert Message in audio. Part 3 may offer event related choices, such as receiving promotional information or offers in relation to the event, such as in the proximity of the event.

The MAN Service may include an Alert Information Service, generating an Alert Information in relation to the Event. The MAN Service can also include a Subscriber Selector, locating and identifying subscribers of the MAN service, in relation to the identified Event, such as subscribers in the proximity of a traffic accident.

The Subscriber Selector may contact a Broadcast Module with the Alert Information and the list of Identified Subscribers. The Broadcast Module may generate and assemble an Alert Message in response to the communication from the Alert Information Service and the Subscriber Selector.

The Event related choices in Part 3 of the Alert Message may be generated based on campaigns by Promotional Agents, who could be of interest for the mobile communicator.

The Alert Message can be then broadcast by the Broadcast Module to Alert Clients which have been downloaded onto the subscriber's handsets. The Alert Message can be broadcast through one or more Carrier Networks.

The Alert Message can contain an SMS with the following components: date, time, message ID, size, and hot key number.

In some implementations a Wrapper is downloaded on the handsets as a part of the Alert Client. The functions of the Wrapper may include: managing Alert Messages, managing a mailbox function, including prioritizing messages, downloading and updating applications, managing subscriptions, storing data, related to messages and promotions, and personalizing.

The Wrapper can update the on-board application to a level required by the operation of the handset, such as by the requirement of downloading and properly displaying of a multimedia message Some implementations include a Logger application to provide a detailed account of the operation of the handset and its user. The Logger may record and report that the transmission of the Alert Message has been completed, the time when the transmission of the Alert Message was completed, whether the subscriber actually requested, or pulled the available promotional material, and whether the subscriber placed an actual order in response to the promotional message.

Some implementations can include a web-based Campaign Interface. A Participating Vendor may use such a Campaign Interface to publish various campaign items.

Using the Campaign Interface, the Participating Vendor may specify the type of Alert Messages, the details of the Promotional Offer, the location aspects of the Promotional Offer, and other logistics of the campaign, such as the duration of the Offer.

The Campaign Interface may also include a module for the Billing Arrangements and a Reporting Module to provide feedback to the Promotion Agents and Vendors about the progress of the campaign.

The above functions can be facilitated and managed by the MAN System Manager, deployed on MAN servers. The MAN System Manager may include: an Alert Information Manager, a Subscriber Manager, a Broadcast Manager, a Promotion Agent Manager, a Carrier Manager, an SMS Aggregator Manager, an Alert Client Manager, and a Billing Manager.

Implementations also include a Sensor Array-based Mobile Broadcast Alert (SAMBA) Service and corresponding SAMBA System. The SAMBA System and Managers can operate analogously to the MAN System and Managers. Some of the differences between the SAMBA and the MAN systems include that the Subscriber Manager in the SAMBA System may locate and identify subscribers using a specialized Sensor Array. The Sensor Array may contain a large number of sensors, whose functionalities include receiving self-identification information, broadcast by the cell phones; determining the location of the cell phones using e.g. triangulation of these self-identification signals; and correlating the location and the identification information.

In some implementations, establishing the identity of the cell phone and the corresponding user may require cooperation between the Sensor Array and the SAMBA Central Servers.

Cell phones relay some of their identification information regularly, so that the Carrier Networks can locate them when an incoming call is trying to reach the phone. This identification information may include the mobile ID, the International Mobile Equipment Identity (IMEI), or any other handset identification information, such as an IMSI or MIN. In some cases this identification information can be a GPS information, which can then be used to establish the MIN Mobile Identification Number) of the phone number of the handset. In some cases the identification information can be any combination of the above.

In principle the triangulation or GPS information can determine the precise location of the cell phone and the broadcast identification information can determine the identity of the cell phone and its user. This information is typically sufficient for the operation of the rest of the SAMBA system, such as sending out Alert Messages and promotions to the SAMBA subscribers among the localized and identified users.

A SAMBA Operation Display can display the location of the subscribers, and possibly some of their personal identifiers, which can include the IMEI, IMSI, MIN or other handset identification information, as well as personal information.

In order to verify the identity of two phones which are closer than the resolution of the Sensor Array, implementations of the SAMBA system may include verification cycles to determine the proper identification of the handsets and their users.

An embodiment of an Identification-Verification Cycle may include: new patrons can be given invitations to subscribe/enroll to the SAMBA Service. When the patrons enroll into the SAMBA Service by e.g. texting a message, the Sensor Array can pick up this message and extract the IMEI, IMSI, MIN or other handset identification information of the enrolling patron.

Further, in response to the text message, the patron maybe invited to opt in into the SAMBA Service, having been informed about the tracking features of the SAMBA service. The patron may opt in into the SAMBA Service, e.g. by texting "yes" to an address.

Next, an Alert Client may be downloaded onto the patron's handset. The Alert Client may report to the SAMBA servers the phone number or any other identification information of the patron. This information can be used to verify the identity of a cell phone.

In some embodiments of the SAMBA Operation Display, different classes or groups of users can be indicated by different symbols.

In some implementations a system for providing a mobile application includes a Mobile Subscriber Detection Authorization and Verification System (MSDAVS), configured to request and receive confidential information from a confidential information owner relating to a user who opted-in to a mobile service application, and to communicate the received confidential information to a mobile application service provider (MASP).

In some implementations the MSDAVS includes an opt-in database, to store opt-in or registration data of the opted-in users of the mobile service application.

In some implementations the MSDAVS includes a service policy database, to store policy data regarding the mobile application service.

In some implementations the confidential information owner is one of a wireless carrier, a financial record manager, a gaming information manager, and an educational information manager.

In some implementations the mobile application service provider is one of a mobile traffic alert network, a location based service, a mobile application, a mobile financial application, a mobile educational application and a mobile gaming application.

In some implementations the mobile application service is a mobile traffic alerting service, the confidential information owner is a telephone number database of one of a wireless carrier or a telephone number database operator, and the requested confidential information is a list telephone numbers of opted-in users in an alert area, defined by the mobile traffic alerting service.

In some implementations the alert area is defined by the mobile service provider by identifying the corresponding alert area cell towers, and the list of phone numbers is generated by compiling the list of all phone numbers, registered at the alert area cell towers.

In some implementations the MSDAVS is configured to acquire a list of cell towers in the alert area from a cell tower database, to forward the list of alert area cell towers to a telephone number database, and to receive a list of telephone numbers registered at the cell towers from the telephone number database.

In some implementations the MSDAVS is configured to communicate the received list of telephone numbers in the alert area to an opt-in database, to cause the opt-in database to cross reference the list of telephone numbers with a list of opted-in users to create a list of telephone numbers of the opted-in users in the alert area, to receive from the opt-in database the list of telephone numbers of the opted-in users in the alert area.

In some implementations the MSDAVS is configured to receive a list of virtual telephone numbers registered at alert area cell towers, to forward the received list to a telephone number database, and to receive a list of mobile equipment identifiers and corresponding virtual telephone numbers from the telephone number database, created by the telephone number database based on the list of virtual telephone numbers.

In some implementations the MSDAVS is configured to communicate the list of mobile equipment identifiers and corresponding virtual telephone numbers to the opt-in database for cross-referencing, to receive a list of virtual telephone numbers of opted-in users in the alert area, created through cross-referencing by the opt-in database, and to communicate the list of virtual telephone numbers of opted-in users in the alert area to the provider of the mobile traffic alerting service.

In some implementations the mobile application service is a sensor array-based mobile broadcast alerting (SAMBA) service, the confidential information owner is a telephone number database of one of a wireless carrier or a telephone number database operator, and the requested confidential information is a list telephone numbers of opted-in users in a SAMBA operation area.

In some implementations the list of phone numbers is generated by compiling the list of phone numbers, sensed by sensors in the SAMBA operation area.

In some implementations the MSDAVS is configured to communicate the received list of telephone numbers to an opt-in database, to cause the opt-in database to cross reference the list of telephone numbers with a list of opted-in users to create a list of the telephone number of the opted-in users in the SAMBA operation area, and to receive from the opt-in database the list of the telephone numbers of the opted-in users in the SAMBA operation area.

In some implementations the MSDAVS is configured to receive a list of virtual telephone numbers sensed by SAMBA sensors, to forward the received list to a telephone number database, and to receive a list of mobile equipment identifiers and corresponding virtual telephone numbers from the telephone number database, created by the telephone number database based on the list of virtual telephone numbers.

In some implementations the MSDAVS is configured to communicate the list of mobile equipment identifiers and corresponding virtual telephone numbers to the opt-in database for cross-referencing, to receive a list of virtual telephone numbers of opted-in users in the SAMA operation area, created through cross-referencing by the opt-in database, and communicating the list of virtual telephone numbers of opted-in users in the SAMBA operation area to the provider of the SAMBA service.

In some implementations a method of operating a Mobile Subscriber Detection Authorization and Verification System includes requesting confidential information from a confidential information owner in connection to providing a mobile application service to an opted-in user, receiving the requested confidential information, and relaying the confidential information to a provider of the mobile application service.

In some implementations the method includes receiving an opt-in message from a user to opt-in to the mobile application service, and storing at least a portion of the opt-in message in an opt-in database.

In some implementations the method includes requesting service policy information regarding the opted-in mobile application service from a service description database, and receiving a response regarding service policy in connection to the opted-in mobile application service from the service description database.

In some implementations the method includes forwarding at least a portion of the opt-in message to a provider of the mobile application service, and receiving a request from the provider of the mobile application service for the confidential information.

In some implementations the mobile application service is a mobile traffic alerting service, the confidential information owner is a telephone number database of one of a wireless carrier or a telephone number database operator, and the requested confidential information is a list telephone numbers of opted-in users in the alert area, defined by the mobile traffic alerting service.

In some implementations the alert area is defined by the mobile service provider by identifying the corresponding alert area cell towers, and the list of phone numbers is generated by producing the list of phone numbers, registered at the alert area cell towers.

In some implementations the method includes acquiring a list of cell towers in the alert area from a cell tower database, forwarding the list of alert area cell towers to a telephone number database, and receiving a list of all telephone numbers registered at the cell towers from the telephone number database.

In some implementations the method includes communicating the received list of telephone numbers in the alert area to an opt-in database, causing the opt-in database to cross reference the list of phone numbers with a list of opted-in users to create a list of opted-in users in the alert area, and receiving from the opt-in database the list of telephone numbers of the opted-in users in the alert area.

In some implementations the method includes receiving a list of virtual telephone numbers registered at alert area cell towers, forwarding the received list to a telephone number database, and receiving a list of mobile equipment identifiers and corresponding virtual telephone numbers from the telephone number database, created by the telephone number database based on the list of virtual telephone numbers.

In some implementations the method includes communicating the list of mobile equipment identifiers and corresponding virtual telephone numbers to the opt-in database for cross-referencing, receiving a list of virtual telephone numbers of opted-in users in the alert area, created through cross-referencing by the opt-in database, and communicating the list of virtual telephone numbers of opted-in users in the alert area to the provider of the mobile traffic alerting service.

In some implementations the mobile application service is a sensor array-based mobile broadcast alerting (SAMBA) service, the confidential information owner is a telephone number database of one of a wireless carrier or a telephone number database operator, and the requested confidential information is a list of telephone numbers of opted-in users in a SAMBA operation area.

In some implementations the list of phone numbers is generated by compiling the list of phone numbers, sensed by sensors in the SAMBA operation area.

In some implementations the method includes communicating the received list of telephone numbers to an opt-in database, causing the opt-in database to cross reference the list of phone numbers with a list of opted-in users to create a list of telephone numbers of the opted-in users in the SAMBA operation area, and receiving from the opt-in database the list of the telephone numbers of the opted-in users in the SAMBA operation area.

In some implementations the method includes receiving a list of virtual telephone numbers sensed by SAMBA sensors, forwarding the received list to a telephone number database, and receiving a list of mobile equipment identifiers and corresponding virtual telephone numbers from the telephone number database, created by the telephone number database based on the list of virtual telephone numbers.

In some implementations the method includes communicating the list of mobile equipment identifiers and corresponding virtual telephone numbers to the opt-in database for cross-referencing, receiving a list of virtual telephone numbers of opted-in users in the SAMBA operation area, created through cross-referencing by the opt-in database, and communicating the list of virtual telephone numbers of opted-in users in the SAMBA operation area to the provider of the SAMBA service.

In some implementations a system for providing a mobile application includes a mobile application service provider (ASP), configured to request a Mobile Subscriber Detection Authorization and Verification System (MSDAVS) to request and receive confidential information from a confidential information owner in connection to providing the mobile application service to opted-in users, and to provide the mobile application service to the opted-in users upon the receipt of the confidential information.

In some implementations the MSDAVS includes an opt-in database, to store opt-in or registration data of the opted-in users of the mobile application service.

In some implementations the MSDAVS includes a service policy database, to store policy data regarding the mobile application service.

In some implementations the confidential information owner is one of a wireless carrier, a financial record manager, a gaming information manager, a mobile service information manager, and an educational information manager.

In some implementations the mobile application service provider is one of a mobile traffic alert network, a location based service, a mobile information service application, a mobile financial application, a mobile educational application and a mobile gaming application.

In some implementations the mobile application service is a mobile traffic alerting service, the confidential information owner is a telephone number database of one of a wireless carrier or a telephone number database operator, and the requested confidential information is a list telephone numbers of opted-in users in an alert area, defined by the mobile traffic alerting service.

In some implementations the alert area is defined by the mobile service provider by identifying the corresponding alert area cell towers, and the list of phone numbers is generated by producing the list of phone numbers, registered at the alert area cell towers.

In some implementations the MSDAVS is configured to receive from the MSDAVS the list of telephone numbers of opted-in users in the alert area, and to provide the mobile traffic alerting service to the opted-in users in the alert area.

In some implementations the mobile application service is a sensor array-based mobile broadcast alerting (SAMBA) service, the confidential information owner is a telephone number database of one of a wireless carrier or a telephone number database operator, and the requested confidential information is a list telephone numbers of opted-in users in a SAMBA operation area.

In some implementations the list of phone numbers is generated by compiling the list of phone numbers, sensed by sensors in the SAMBA operation area.

In some implementations the SAMBA service provider is configured to receive the list of opted-in users in the SAMBA operation area from the MSDAVS, and to provide the SAMBA service to the opted-in users in the SAMBA operation area.

In some implementations a method of providing a mobile application service includes directing a Mobile Subscriber Detection Authorization and Verification System (MSDAVS) to request confidential information from a confidential information owner to assist the providing of the mobile application service to opted-in users, receiving the confidential information, acquired by the MSDAVS from the confidential information owner, and providing the mobile application service to the opted-in user.

In some implementations a mobile community notification system includes a Mobile Subscriber Detection Authorization and Verification System (MSDAVS), configured to request and receive confidential information from a confidential information owner related to a notification area, and to communicate the received confidential information to a mobile community notification service (MCNS) provider.

In some implementations the confidential information owner is a telephone number database of one of a wireless carrier or a telephone number database operator, and the requested confidential information is a list telephone numbers of users in the notification area.

In some implementations the notification area is defined by the mobile community notification service provider by identifying the corresponding notification area cell towers, and the list of phone numbers is generated by compiling the list of phone numbers, registered at the notification area cell towers.

In some implementations the MSDAVS is configured to acquire a list of cell towers in the notification area from a cell tower database, to forward the list of notification area cell towers to a telephone number database, and to receive a list of telephone numbers registered at the cell towers from the telephone number database.

In some implementations the MSDAVS is configured to receive a list of virtual telephone numbers registered at alert area cell towers, to forward the received list to a telephone number database, and to receive a list of mobile equipment identifiers and corresponding virtual telephone numbers from the telephone number database, created by the telephone number database based on the list of virtual telephone numbers.

BRIEF DESCRIPTION OF THE DRAWINGS

FIG. 2 illustrates the sub-steps 111-113 of the identifying and analyzing step 110.

FIG. 4 illustrates the sub-steps 122-123 of user-zone selecting sub-step 121.

FIG. 8 illustrates a multi-level messaging embodiment.

FIG. 9 illustrates an alternative embodiment 200.

FIG. 10 illustrates another alternative embodiment 300.

FIG. 23 illustrates a Campaign Interface 1800.

DETAILED DESCRIPTION

Figure 1:
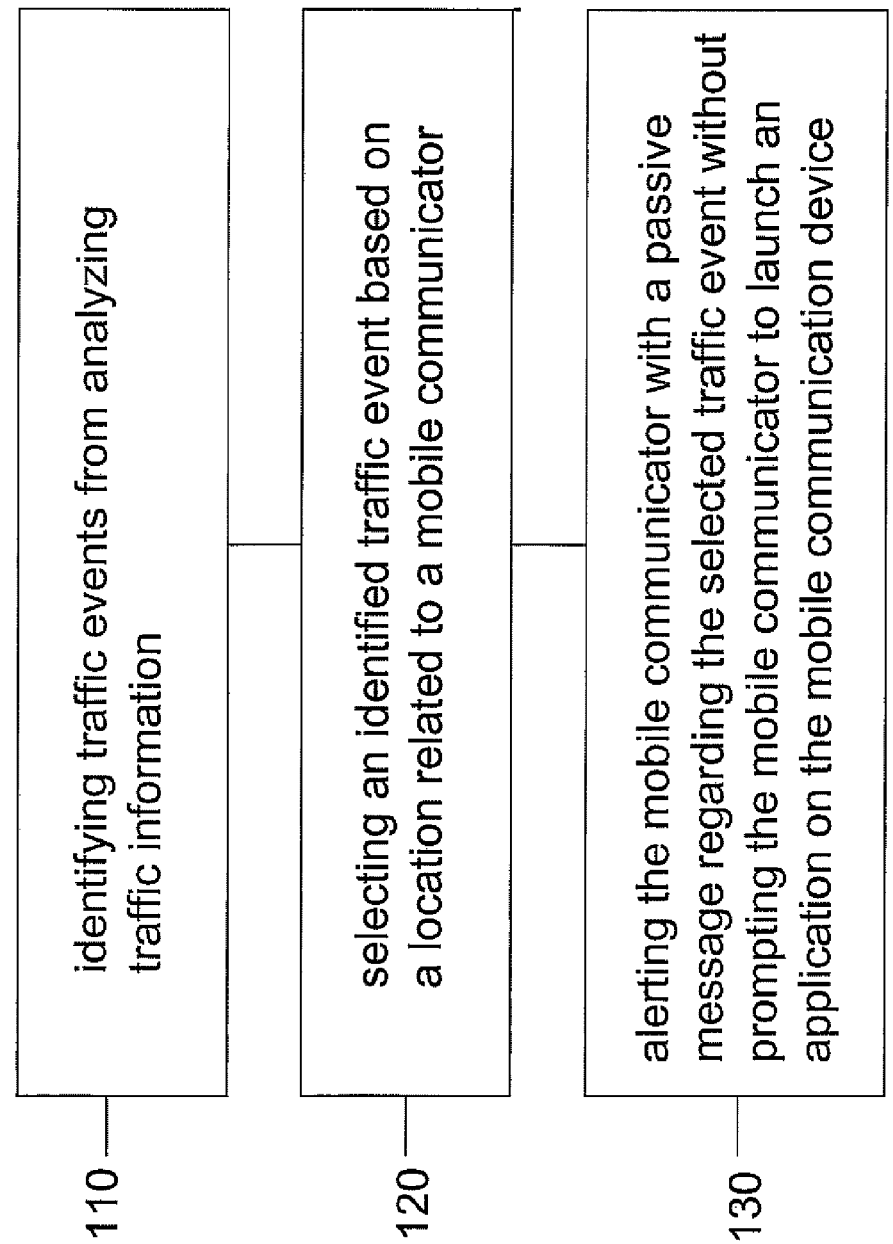
FIG. 1 illustrates the steps 110-130 of passive traffic alerting method 100.

FIG. 1 illustrates a passive traffic alerting method 100. The passive alerting method 100 can include: identifying traffic events from analyzing traffic information (step 110); selecting an identified traffic event based on a location related to a mobile communicator (step 120), and alerting the mobile communicator with a passive message regarding the selected traffic event without prompting the mobile communicator to launch an application on a mobile communication device (step 130).

FIG. 2 illustrates that step 110 may include collecting traffic information from a plurality of traffic data sources (step 111) and identifying a traffic event by integrating collected traffic information (step 113). Step 113 may include identifying an accident, a traffic slow-down, a traffic-jam, a road-construction, and a traffic condition. Besides typical accidents, such traffic events can be caused e.g. by a sporting event, an entertainment event, a weather event, or a traffic control event. Typical examples include a sudden downpour causing slippery roads, leading to an accident involving several vehicles. Such an accident can give rise to extensive delays. Other examples include a concert or a sporting event, where the large number of vehicles converging on the same location causes major delays without any accident. Note that the inverse of the above cases can also be a noteworthy traffic event: e.g. the removal of an overturned truck, or the opening of an exit which was under construction up to the opening.

A common aspect of these traffic events is the change in the speed of traffic, typically a slow-down. Traffic data providers developed different technologies to recognize, identify and track such slow-down of the traffic. Sources of such traffic data include: the police, issuing police reports on an accident; news organizations, operating helicopters and reporting over broadcast systems (e.g. a TV station operating its own traffic chopper and broadcasting its report live); mobile telephone companies, who acquire information about the speed of vehicles by tracking how quickly mobile phone signals move from cell-phone tower to cell-phone tower; various traffic reporting/controlling agencies, who e.g. deploy a large network of sensors into the road surface and collect the data generated by these sensors, or deploy a large number of traffic cameras which observe traditional traffic bottlenecks; and road construction companies, who knowingly cause traffic delays by closing a lane or an exit for repair.

Remarkably, any one of these traffic data sources can provide incomplete data. For example, a cell phone tower senses not only the vehicles passing by on the highway but also the vehicles passing by on a nearby residential road. A red light stopping vehicles on this residential road can be falsely interpreted by the tower's unsophisticated system as a signal of a traffic-jam on the highway itself creating a false alert. Or, sensors built into the road surface may misinterpret signals, as mentioned above in relation to a bridge collapse. Or the police/highway patrol may accurately announce when a truck overturned on a highway, but fail to report when the overturned truck is removed, leading to continued reporting of an accident which has been cleared up since.

FIG. 2 illustrates that such inefficiencies can be drastically reduced by collecting traffic information from a plurality of traffic data sources in step 111, and integrating the collected traffic information in step 113. In an example of step 111, if a mobile phone operator reports a slowdown of traffic from its cell-tower data, a traffic reporting organization (TRO), or a traffic service provider (TSP) may acquire additional traffic information from a second source of traffic data such as a live-feed from a video camera, which is pointed at the corresponding segment of the highway. Then in step 113, the TRO may integrate the traffic information from the two sources by cross referencing the cell tower data with the video camera feed to verify that indeed an accident occurred. The integrating step 113 may involve checking that the video camera feed corresponds to the same segment of the highway as the cell tower data. Or if the police do not issue an "all-clear" after an initial report of an overturned truck, a TRO may perform step 111 by directing a news chopper to the impacted section of the highway and ask for additional information. Then, in step 113, the TRO may instruct the chopper to check whether the overturned truck has been removed, describing in detail which segment of the highway the police report referred to.

Often the traffic information is complex and unusual situations and correlations occur. In many embodiments of the integrating step 113 the complex information is integrated by human intervention: an employee of the TRO summarizes the cell-tower data and cross references it with the video feed from a traffic helicopter.

In embodiments of step 111, which collect traffic information from cell-tower data, issues of privacy may be involved. To alleviate any potential problems, embodiments of the present method make sure that only anonymous information is used. For example, the actual ID of the cell phone users is not recorded or reported, only the average speed of the cell phone users, inferred e.g. from how quickly they move from cell-tower to cell-tower.

In some embodiments the analysis step 110 also involves step 112: a modeling of the traffic. For example, "neural network" models, or "real-time traffic" models can be used for modeling traffic in step 112. These models can be used to generate a traffic assessment. These assessments include predicting what kind of traffic delays will be caused by a freshly overturned truck in 10, 20, or 30 minutes, on what time scale will the traffic-jam dissipate, and how will the changing traffic patterns (such as motorists taking alternate routes) impact these predictions. There are a vast number of such traffic models and using any one of these models is understood to be within the scope of the step 112. In multi-level modeling embodiments, more than one method can be employed to generate traffic predictions and then a second level evaluator may chose which model's prediction should be accepted as the traffic assessment. In such embodiments the step 113 may involve integrating traffic data acquired in step 111 with the traffic assessments, generated during the modeling step 112.

An example can be that in a step 111 a TSP is informed about a lane closure and the TSP comes to the idea to suggest an alternate route to avoid delays. Then, a modeling step 112 is carried out to estimate whether the idea of a no-delay alternate route is verified by modeling. The modeling instead comes to the conclusion that a 10 minute delay will be likely caused by the excess traffic. In an additional step 111 the TSP acquires further traffic information in the form of road-embedded sensor data to check whether the vehicle speed on the alternate route is indeed consistent with the 10 minutes delay prediction of the modeling. The acquired road sensor data, however, indicates only a 5 minutes delay. Finally, in an embodiment of step 113, the original lane closure information, the modeling prediction of 10 minutes delay, and the road sensor data, indicating only 5 minutes delay, are integrated, enabling the TSP to identify a traffic event of the lane closure and the accompanying 5-10 minutes delay on the alternate route. The sequence of these steps can be reordered, and some steps can be carried out more than once, as in the just described embodiment.

Figure 3:
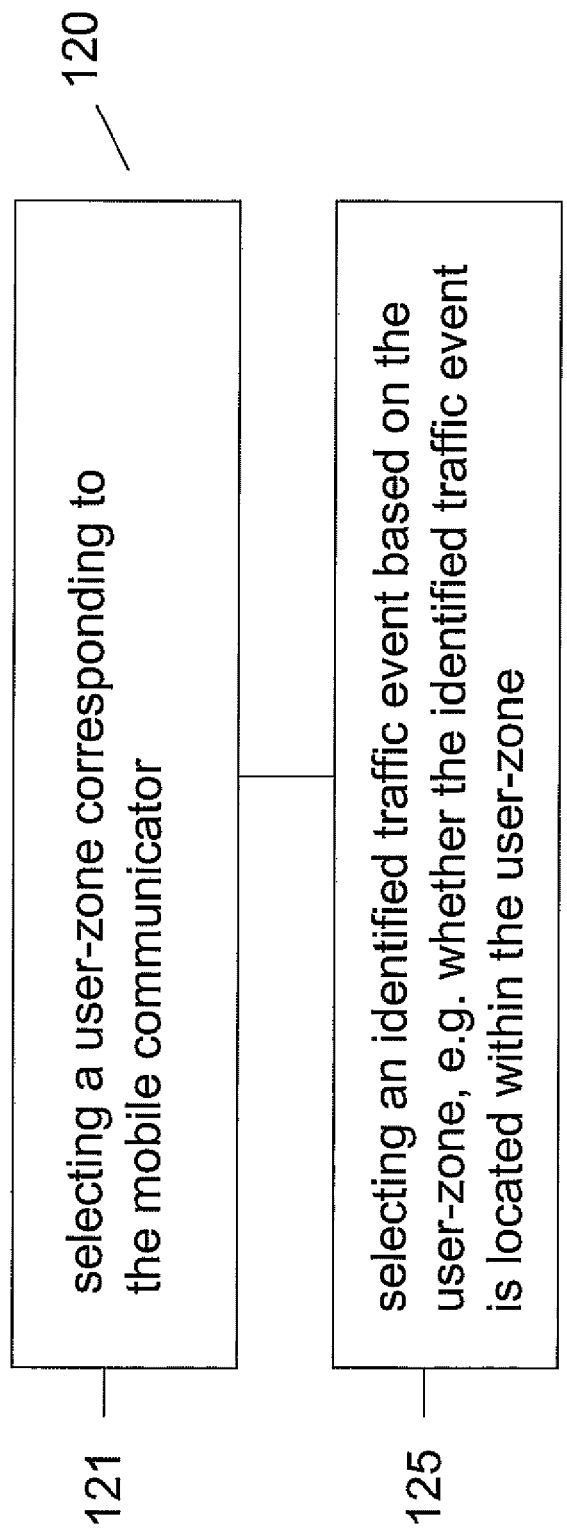
FIG. 3 illustrates the sub-steps 121-125 of the selecting a traffic event step 120.

FIG. 3 illustrates step 120, which involves selecting one of the identified traffic events. Step 120 may start with step 121: selecting a user-zone corresponding to the mobile communicator. The user-zone can be selected for various reasons. One of these reasons is to provide personalized traffic information. Selecting a user-zone around the mobile communicator identifies which road's traffic information is needed or requested by the mobile communicator. The user-zone can be selected by the TSP, e.g. as a default, or to represent a choice of the mobile communicator. In the latter embodiment, the mobile communicator may be prompted to choose a user-zone and then relay the choice to the TSP.

FIG. 4 illustrates that step 121 may include step 122: determining a location of the mobile communicator from location data provided by mobile communication stations of a mobile communication network or from data provided by a global positioning system. Step 122 can be followed by step 123: selecting the user-zone as an area centered at the location of the mobile communicator with a shape and extent. In some applications, the user-zone can be a "bubble" around the mobile communicator: e.g. 10 mile ahead the vehicle and a half mile wide on each side of the highway. Any other shape and extent can be specified as well. The extent and shape of the user-zone corresponding to each cell phone can have default values. These default values can be reset on a webpage or through a setup process during a telephone-call. It can be also specified whether the center of the user-zones, or any other distinguishing coordinate, e.g. the focal point of an elliptic user-zone, should be chosen to track the location of the mobile communicator. The shape and extent and any other characteristic of the user-zone can be updated by the mobile communicator during regular operations. In other embodiments, the shape and extent is programmed to vary according to identified traffic events by various service providers.

In an example, if a mobile communicator is alerted in step 130 that a selected traffic event is ahead of him, then the mobile communicator may wish to decide which alternate route to take. For making the right decision the mobile communicator may desire information on whether any of the possible alternate routes has a traffic jam on it. To deliver an answer, the TRO or TSP may alter the user-zone to become much wider, once a traffic event in the original user-zone has been reported, since wider user-zones prompt receiving alerts about traffic events potentially blocking some of the alternate routes. In another embodiment, the extent of the user-zones is increased as a traffic jam increases, in order to allow the driver to take alternate routes before getting caught in the traffic jam. More generally, the user-zone may be increased by the TSP so as to enable the mobile communicator to make informed choices in a timely manner, typically to take alternate routes or to pull over for shopping until the traffic jam dissolves.

Step 122 may include determining the location of the mobile communicator from location data provided by mobile communication stations of a mobile communication network. The location of the mobile communicator can be extracted e.g. by a triangulation method on the data, collected from the cell phone towers. In other embodiments, the location of the mobile communicator can be extracted from data provided by a global positioning system or a related cell-phone GPS system.

The user-zone is typically moving with the vehicle of the mobile communicator and thus it is constantly updated. In some embodiments, the location of the mobile communicator is determined by at least partially relying on the speed of the mobile communicator. The speed can be inferred e.g. from cell phone tower data. In some embodiments, the user-zones of cell phone users within a section of a metropolitan area can be tracked by a cell phone service provider in regular intervals, collecting data from cell phone towers.

In some embodiments the data about the user-zones are forwarded by the cell phone service provider to a traffic reporting organization (TRO), or to a traffic service provider (TSP), who specializes in practicing the presently described passive alerting method 100. In these embodiments the TRO or TSP tracks the moving user-zones. In other embodiments, the operators of the cell phone towers or the cell phone service providers, or the GPS service provider tracks and updates the user-zones.

In step 125 in FIG. 3 the TRO or TSP, or any other of the listed operators, may select one of the identified traffic events by updating the moving tracked user-zones of moving mobile communicators and evaluate whether any one of the identified traffic events fall within the updated user-zones. Once an identified traffic event is found to fall within the user-zone of a mobile communicator, step 130 can be carried out e.g. by alerting the mobile communicator with a passive message about the selected traffic event.

As an example, a driver on her way home from the office may switch on her cell phone. The cell phone sends identifying signals to the cell towers. The cell phone service provider transmits information about the driver to a traffic service provider (TSP), including her location (step 122) and user-zone (step 123), which were either transmitted in the identifying phase or stored based on previous communications. The TSP processes the identifying signals and extracts the location of the driver and recalls her preprogrammed user-zone which is 8 miles ahead of the vehicle and half mile wide. As the driver drives on highway US 101, the TSP continuously updates the user-zone and evaluates whether there is a traffic event within her user-zone. At some time a new traffic accident occurs 20 miles ahead of the driver on US 101. Corresponding traffic data is received by the TSP and is identified as an accident, causing a 20 minutes delay following the steps 111-113. This brings the presently active traffic accidents in the greater metropolitan area to 12. However, the TSP does not burden the driver with information regarding all 12 accidents. Instead, only when the driver arrives within 8 miles of the newly identified traffic accident, the TSP selects the accident on US 101 out of the 12 active accidents. The TSP then sends a passive alert signal only to the driver whose user-zone just overlapped with the identified traffic event that a traffic accident lies ahead, causing a 20 minutes delay. Since the driver knows that the size of her user-zone was set to 8 miles, this alert signal lets the driver know not only the existence of the traffic accident but its approximate distance from the vehicle and the probable delay caused by it.

In other embodiments, the user-zone can be selected differently. For example, the user-zone can be selected based on any kind of mobile communicator information. Embodiments include selecting a user-zone based on an address, such as the home of the mobile communicator. This choice lets the mobile communicator know whether there are traffic problems around her home, to assist her in planning the fastest route home.

In yet other embodiments, the user-zone can be based on another person. For example, the user-zone can be defined according to the location of the cell phone of the mobile communicator's spouse, family member, co-worker or business partner. These embodiments allow the mobile communicators to be informed e.g. whether a spouse or a business partner will be late for a meeting because of traffic delays.

In yet another embodiment, the TSP can modify the size of the user-zone based on the traffic event. For example, even if a driver selected only a 5 miles user-zone, but if the accident caused a 7 miles traffic jam, the TSP may override the user selection and reset the extent of the user-zone to 7 or even 8 miles. This allows the driver to become informed about the traffic jam before actually reaching it.

FIGS. 5A-E illustrate certain features of the above method 100.

FIG. 5A illustrates that the location of the driver (the diamond label) is determined in step 122*a*, e.g. from cell-tower data or GPS information. A user-zone is selected in step 123*a*, either defined during the initialization or recalled from stored data. As the driver moves, her location and the user zone are updated in regular intervals. The TSP received traffic information about various locations in the area. By practicing steps 111-113 the TSP identified two traffic accidents in the area, 125*a* and 125*ax*. These traffic events were identified through steps 111-113 by employees of the TSP integrating chopper data and cell tower data. However, the driver is not burdened and her radio program is not interrupted by information about these identified traffic events, as neither of these identified traffic events is selected, as they are both outside the driver's user-zone.

FIG. 5B illustrates the changed situation, when the most recent update of the driver's location 122*b* and her user zone 123*b* makes the identified traffic event 125*b* to fall within the updated user zone 123*b*. In an embodiment of step 120, the TSP selects the identified traffic event 125*b* based on the updated user-zone of the mobile communicator. With little or no delay the TSP carries out step 130 and alerts this specific driver to the traffic event 125*b* ahead of her. The alert is passive and does not require the driver to launch an application on her mobile communication device. In the same alert the TSP does not inform the driver about the identified traffic event 125*bx*, as that does not fall within the user's updated user-zone 123*b*.

FIG. 5C illustrates that in relation to the identified traffic event 125*c* either the TSP or the driver changed the shape and extent of the user-zone in step 123*c*. Motivations to enlarge the user-zone include exploring the status of alternate routes.

Since enlarging the user-zone made the identified traffic event 125cx also fall into the user-zone, the TSP also selects identified traffic event 125cx. Then, in a step 130, the TSP alerts the driver to selected traffic event 125c and 125cx. The alert may indicate that not only the main highway 101 has a traffic accident, but the first choice alternate route 126cx also has an accident 125cx. This alert may allow the driver to choose secondary alternate route 126cy, where accidents do not slow down traffic.

Figure 5E:
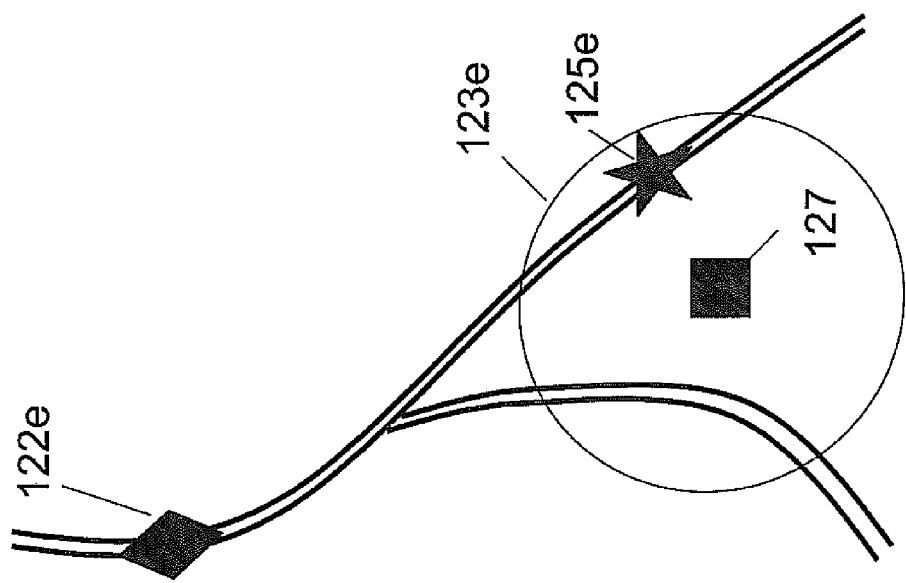
FIGS. 5A-N and 5P illustrate various situations and embodiments involving the user-zone, the event-zone and the traffic-event.
Figure 5D:
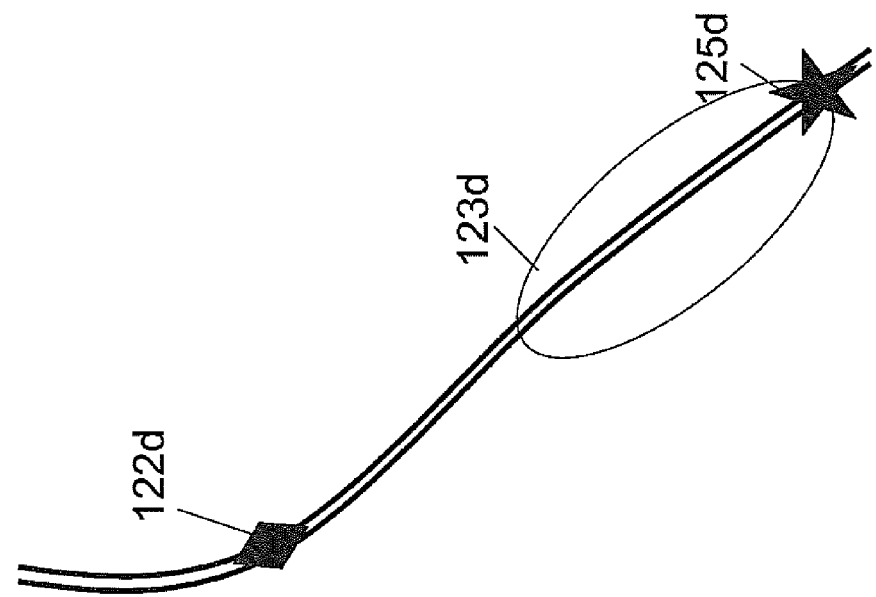

FIG. 5D illustrates another embodiment, where in the step 123d the user-zone is selected based not on the location of the driver but based on the location of the traffic event 125d.

FIG. 5E illustrates an embodiment where the user-zone is selected in step 123e based on the location of a selected house, such as the driver's home, or the school of the driver's children.

FIG. 5F illustrates an embodiment, where the TSP defines not only a user-zone 123f, but also an event-zone 127f. In these embodiments, the identified traffic event is selected for a particular mobile communicator, when the user-zone 123g of the mobile communicator overlaps with the event-zone 127g of the identified traffic event, as shown in FIG. 5G.

FIG. 5H illustrates that the user zone 123h can have a hierarchical structure, including hierarchical layers 123h-1, 123h-2, and 123h-3. In embodiments described below, different type of services can be provided to the mobile communicator as the identified traffic event 125h falls within different hierarchical layers 123i.

FIG. 5I illustrates that in some embodiments the event-zone may have a hierarchical structure, including hierarchical zones 127i-1, 127i-2, and 127i-3. In these embodiments, the mobile communicator may be offered different services as the user-zone 123i overlaps with different hierarchical zones 127i as will be described below.

Figure 5K:
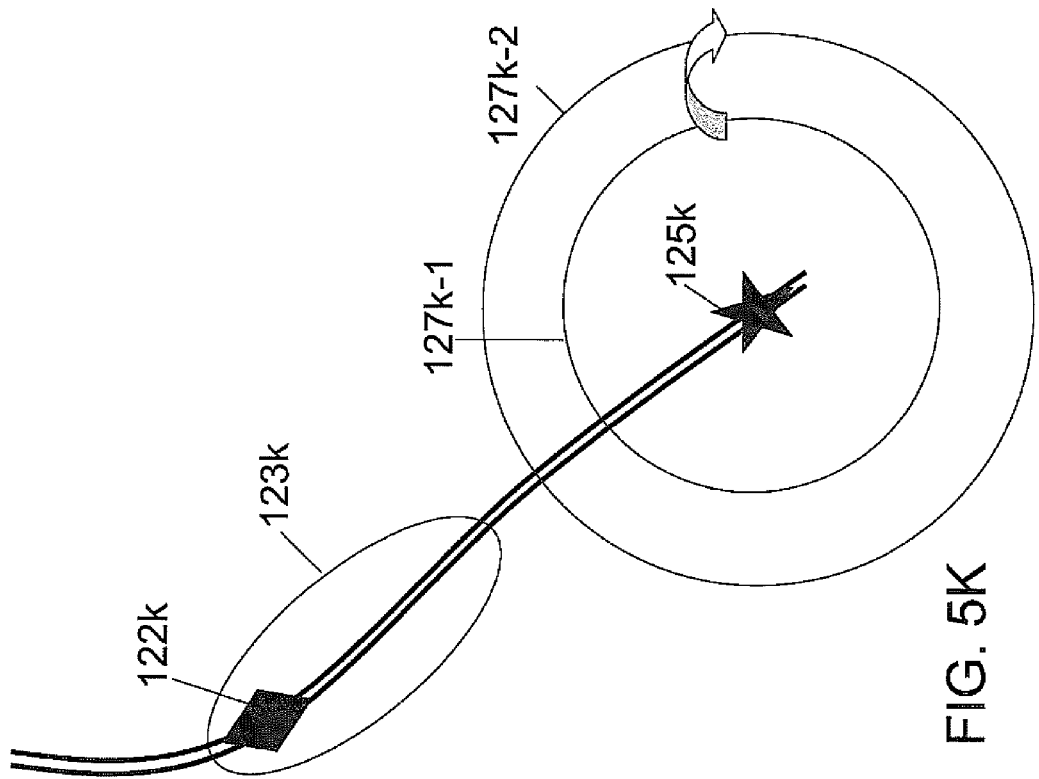
Figure 5J:
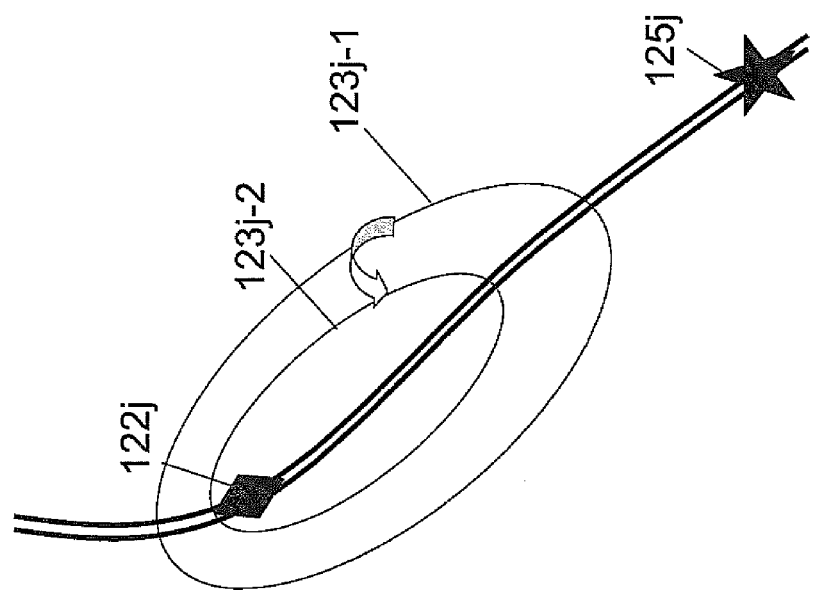

FIG. 5J illustrates that in some embodiments the extent and shape of the user zone can be varied in time, depending on changing traffic conditions. For example, the user-zone can be shrunk from 123j-1 to 123j-2 when an overturned truck is removed and thus the TSP expects that the delays will be reduced.

FIG. 5K illustrates that in some embodiments the extent and shape of the event zone can be varied in time, depending on changing traffic conditions. For example, the event-zone 127k-1 can be extended to 127k-2, when the original accident is followed up by a chemical substance spill and thus the TSP expects that the delays will be increased.

FIG. 5L illustrates that in some embodiments the user and event zones can be defined in terms of stations of a communication system. A particular embodiment defines the zones in terms of the towers of a cell-phone network: T1, T2, .... In particular, the user zones 123l-1 and 123l-2 can be determined in terms of the communication towers keeping track the identification numbers (ID's) of the mobile communicators, such as cell phone users. In FIG. 5L the mobile communicator communicates with tower T4, thus the user-zone 123l-1 of the mobile communicator 122l-1 gets defined as an area corresponding to tower T4, and the user zone 123l-2 of the mobile communicator 122l-2 gets defined as an area corresponding to the tower this mobile communicator is communicating with: T3.

The traffic event, or incident, 125l happened between towers T1 and T2. The event-zone 127l is defined as an area corresponding to towers T1 and T2. Visibly, in the illustrated situation the user-zone 123l-1 of mobile communicator 122l-1 does not overlap with the event-zone 127l, and thus mobile communicator 122l-1 does not get alerted in step 130. In contrast, the user-zone 123l-2 of mobile communicator 122l-2 does overlap with the event zone 127l and therefore mobile communicator 122l-2 gets alerted in a step 130.

In some cases, the event-zone is elongated along the highway itself. The event zone 127l can be asymmetric, i.e. longer for the direction of mobile communicators approaching the traffic incident 125l and shorter for mobile communicators leaving the area of the traffic incident 125l.

The direction of motion of mobile communicators can be determined from acquiring tower data repeatedly. For example, at a time t the TSP, or any other agent, may acquire the data that on a north-south oriented road, a mobile communicator contacted a tower Tn. Then, at a subsequent time t', the TSP/agent may record that the same mobile communicator contacted a second tower Tm, which is located south from tower Tn. From these data the TSP/agent may infer that the mobile communicator is moving southward along the road. As explained above, the TSP may use this directional information to define the event zone 127l.

FIG. 5M illustrates an embodiment when the event-zone 127m-1 gets extended from 127m-1 to 127m-2. Visibly, the tower-defined user-zone 123m-1 does not overlap with event-zone 127m-1 and thus mobile communicator 122m-1 does not get alerted when the event-zone is the original smaller size 127m-1. In this case only mobile communicator 122m-2 gets alerted.

However, it the TSP, or any other agent, re-evaluates the severity of the traffic incident, or the traffic jam builds up, then the TSP may decide to increase the tower-defined event zone from 127m-1 to 127m-2. In this case the mobile communicator 122m-1 also gets alerted in an alerting step 130.

FIG. 5N illustrates another embodiment of enlarging the event-zone 127n-1 to 127n-2. Mobile communicator 122n has a tower-defined user-zone 123n, defined essentially as an area belonging to tower T3. A traffic event or incident 125n was identified between towers T1 and T2. At the early stages of the incident, there was only a limited buildup of traffic jam, thus the event-zone was defined as 127n-1, which impacted only towers T1, T2 and T4. At this stage only mobile communicators, whose user-zones 123n overlap with the event-zone 127n-1, will receive alerts. In embodiments, where the user-zone is defined by towers, the mobile communicators who are communicating through towers T1, T2 and T4, will be alerted. Accordingly, mobile communicator 122n is not alerted at this stage.

However, at a subsequent time the traffic service provider TSP may integrate updated traffic information, e.g. by carrying out steps 111-113, and conclude that the size of the traffic jam expanded onto subsidiary routes 126nx and 126ny. In order to alert mobile communicators on those roads, as well as helping approaching mobile communicators, who maybe contemplating taking these subsidiary routes, the service provider may decide to extend the event-zone into 127n-2. As the FIG. 5N illustrates, the enlarged event-zone 127n-2 may include towers T3, T5 and T6. In tower-defined user-zones this means that the mobile communicators who are communicating through these towers, will be alerted. According to FIG. 5N, user 122n will be alerted after the enlargement of the event-zone to 127n-2.

In various embodiments this enlargement procedure may take forms. E.g. the event zone may be constructed not as a single ellipse, but as a collection of elongated areas, formed along the main route and the subsidiary routes. These elongated areas can be updated, modified and varied independently from each other.

Also, the enlargement step can be repeated more than once, involving more and more towers. Further, as the traffic jam gets resolved, e.g. the overturned truck gets removed at 125n, the event-zone maybe reduced as well. Again, this can be done as an overall reduction, or piece-wise. Also, different towers may send out different alerts, as motorists may face different traffic conditions ahead on the main road and on the subsidiary roads.

Figure 5P:
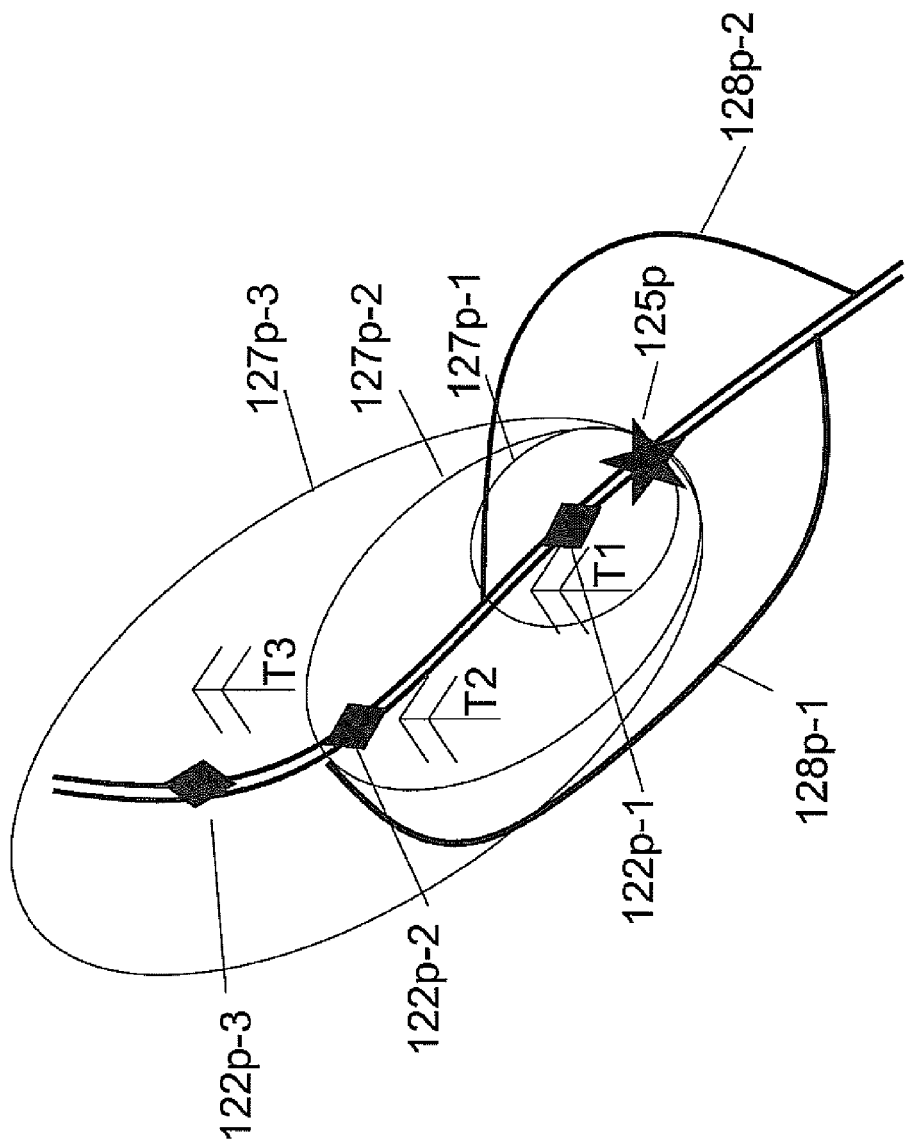

FIG. 5P illustrates another embodiment, where alert messages are sent out to mobile communicators according to an estimate of the time the mobile communicators will spend in the area of the traffic event.

In detail, the location of a traffic event 125p can be entered on a map by an operator of the traffic service provider TSP or by an automated system. Additional information can be entered as well, such as a predicted clean-up time of the traffic event 125p. Subsequently, a path resolution algorithm can be applied to estimate the time which will be spent by different mobile communicators 122p in the area of a traffic event 125p. This path resolution algorithm can compute the time for a mobile communicator 122p remaining on the main highway, and the times for taking alternate routes 128p-1 or 128p-2. For each path a time can be computed and the alert messages can be sent out according to the computed times.

In some embodiments the longest travel times can be computed, e.g. by assuming that the mobile communicator 122p gets red lights all along the main and the alternate routes 128p. The routes could be evaluated for the longest travel time, not longest distance as these two criteria may not coincide.

In some cases the algorithm may use a single recursive graph traversal to determine the corresponding travel times.

Some embodiments then proceed and create zones according to the estimated travel times. In some implementations a short, a medium and a long travel time zone can be created. The zones can be determined in relation to the tower locations, starting with the towers closest to the travel event and include more and more towers as the radius of the path search is enlarged. In the next step the TSP can interrogate the cell towers in the identified zones and generate lists containing the mobile communicators who are in the different zones. These zones can be stored and reused as the mobile communicators enter or exit the different zones.

FIG. 5P illustrates this process, as the graph traversal algorithm identifies zones 127p-1 to 127p-3 around travel event 125p according to whether the estimated travels time is "short", "medium" or "long". A wide variety of definitions can be used to define what constitutes a short/medium/long travel time. Next, cell towers T1-T3 are identified which track cell phones in zones 127p-1 to 127p-3, respectively. Subsequently, the identified cell towers T1-T3 are interrogated for the mobile communicators 122p-1-122p-3 tracked by them. In this example, mobile communicator 122p-1 will be entered into a "short time" list, mobile communicator 122p-2 will be entered into a "medium time" list and mobile communicator 122p-3 will be entered into a "long time" list because they are tracked by cell towers T1, T2, and T3, respectively. As mobile communicators move e.g. on the highway, they can be moved from a farther list to a closer list. E.g. mobile communicator 122p-3 can be moved from the long time to the medium time list when she crosses from zone 127p-3 to 127p-2, or analogously, from being tracked by tower T3 to being tracked by tower T2. Of course, in various embodiments the number of zones and lists can vary widely.

In a next step, different messages can be generated for mobile communicators on the different lists—corresponding to the different zones, as implementations of step 130. For example, advertisements can be selected based on the position, speed and direction of the movement of the mobile communicators in the zones.

For example, for mobile communicators on the short time list, the TSP may send out a short time list alert/notification, for mobile communicators on the medium time list, a medium time list alert/notification, and for mobile communicators on the long time list, a long time list alert/notification, The cell towers can be polled in appropriate time intervals, such as periodically. The path evaluating algorithm can be either rerun, or use the previously determined path-evaluation. Mobile communicators can be added or removed based on a wide range of criteria, such as whether they moved past the accident, or taken alternate routes or stopped at a gas station or restaurant or other place.

In step 122, the location of the mobile communicator can be determined passively, i.e. without running an application on the mobile communication device.

In step 120, the traffic event can be selected without requiring the mobile communicator to specify or program a traffic route. This is in contrast to some systems, which pair drivers and traffic accidents based on the drivers entering their daily commute (or any other route of interest) onto a web-based system.

In step 130 the alert message is sent out passively. Embodiments of this step include alerting the mobile communicator without requiring the mobile communicator to respond by using hands, e.g. to terminate or interrupt an active application. This embodiment may be appreciated in countries or states where operating mobile phones with hand during driving is prohibited. Also, some systems require the driver to launch an application either to indicate their location to the TSP, or to respond to or process the traffic information, such as displaying a map, which shows the blocked highways. This requires interrupting e.g. ongoing telephone conversations: a disadvantageous feature.

The mobile communication device can be any known mobile communication device, including a mobile telephone, a mobile computer, any communication device capable of sending a wifi or wimax signal, any combination of these devices, e.g. a computer equipped with any sort of device making it capable of communicating over any wifi, wimax or other wireless network. In general, any electronic device configured to operate in conjunction with any kind of mobile communication networks is within the scope of the term "mobile communication device".

In step 130 the alerting may take place on a separate telephone line, if the mobile phone is configured to operate two or more phone lines.

The alerting step 130 may include alerting the mobile communicator with an alert-message, which includes at least one of an audio component, a text component, an SMS, a video component, a radio broadcast component, a television broadcast component, a multimedia component, and a multimedia messaging service component.

An example for an alert message is an audio component, which includes a ring-tone, an instruction to tune to a traffic radio and a video component including a live traffic camera broadcast.

In some embodiments, in step 130 the alert-message component can be selected based on a location of the mobile communicator relative to the selected traffic event, followed by alerting the mobile communicator with the alert-message component. Examples include providing more detailed information as the driver gets closer to the accident. Embodiments include providing first just a statement of the traffic accident, then, upon the driver getting closer to the accident site: the total time delay, then on further approach: which alternate routes to take to avoid the traffic jam, or which frequency to tune the car-radio for additional information.

In this sense, the user-zone can be viewed as having a hierarchical structure itself: more detailed information is delivered to the mobile communicator when the identified traffic event moves from an outer layer of the user-zone to an inner layer of the user-zone. As mentioned before, in some embodiments the extent and shape of the user-zone may be updated by the TSP, e.g. motivated by the increasing extent of the traffic jam. In these embodiments, if the user-zone is enlarged by the TSP, the identified traffic event can move into an inner-layer of the user-zone from an outer layer even if the mobile communicator is sitting in a traffic jam.

Alternatively, the TSP may define an increasing event-zone around the traffic event. In these embodiments These examples were specific realizations of "traffic utility information" regarding the selected traffic event. Other embodiments of the traffic utility information include information regarding an alternative route related to the traffic event, an expected duration of the traffic event, predicted times of arrival to points of interest, such as to a concert or to an airport, a parking information, an event information, and a suitable exit near the mobile communicator's location.

The parking information can include the location of a parking garage and whether that garage has empty slots or is it full. Combined exit and parking information can be especially useful near airports, concerts, or sporting events, where different auxiliary parking lots can be approached through different exits, and the parking lots can fill up, inconveniencing drivers.

In some embodiments, the traffic information is updated in a regular manner, e.g. when a prediction of a traffic delay is changed, or an overturned truck has been moved to the side. This provides the mobile communicator with valuable information for making decisions.

The traffic utility information can be offered in response to the mobile communicator requesting more information, or can be offered by automatically launching an application on the mobile communication device.

The traffic utility information can be offered as part of an advertisement-based non-paying service, or as part of a paying service. The paying service may include a monthly fee based service, a per-use service, and a service, billed in relation to the bill of the mobile communication service.

Providing a traffic alert and traffic utility information in relation to the location of a driver is a specific example of "location based services", sometimes referred to as LBS.

Embodiments of the present alerting method can be viewed as "pushing" information to the drivers: a distinction from some existing methods, where the drivers have to "pull" information from a service provider. As such, the present method offers commercial opportunities to interested sponsors.

Figure 6:
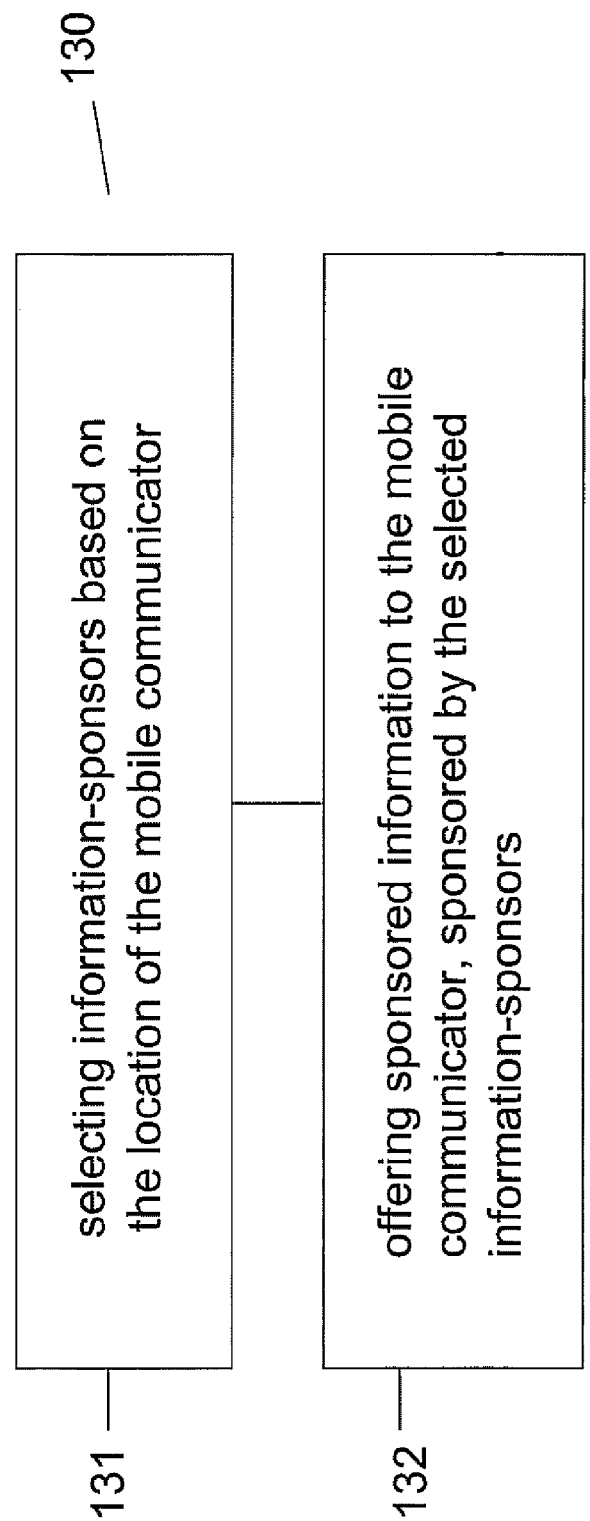
FIG. 6. illustrates the steps 131-132 of generating sponsored alert messages step 130.

FIG. 6 illustrates that the alert message in step 130 may contain sponsored information from interested sponsors. Within step 130, in step 131 information-sponsors can be selected based on the location of the mobile communicator, and in step 132, sponsored information can be offered to the mobile communicator, sponsored by the selected sponsors. Notably, the sponsored information may include advertisements.

For example, when the TSP determined that the mobile communicator, whose location was tracked in step 122, is facing substantial traffic delays in the vicinity of exit 42, the TSP may carry out a search in an internal database of ad-sponsors in a vicinity of exit 42, and then offer advertisements and promotions by these sponsors on the cell phone of the mobile communicator, as described in more detail below.

Figure 7:
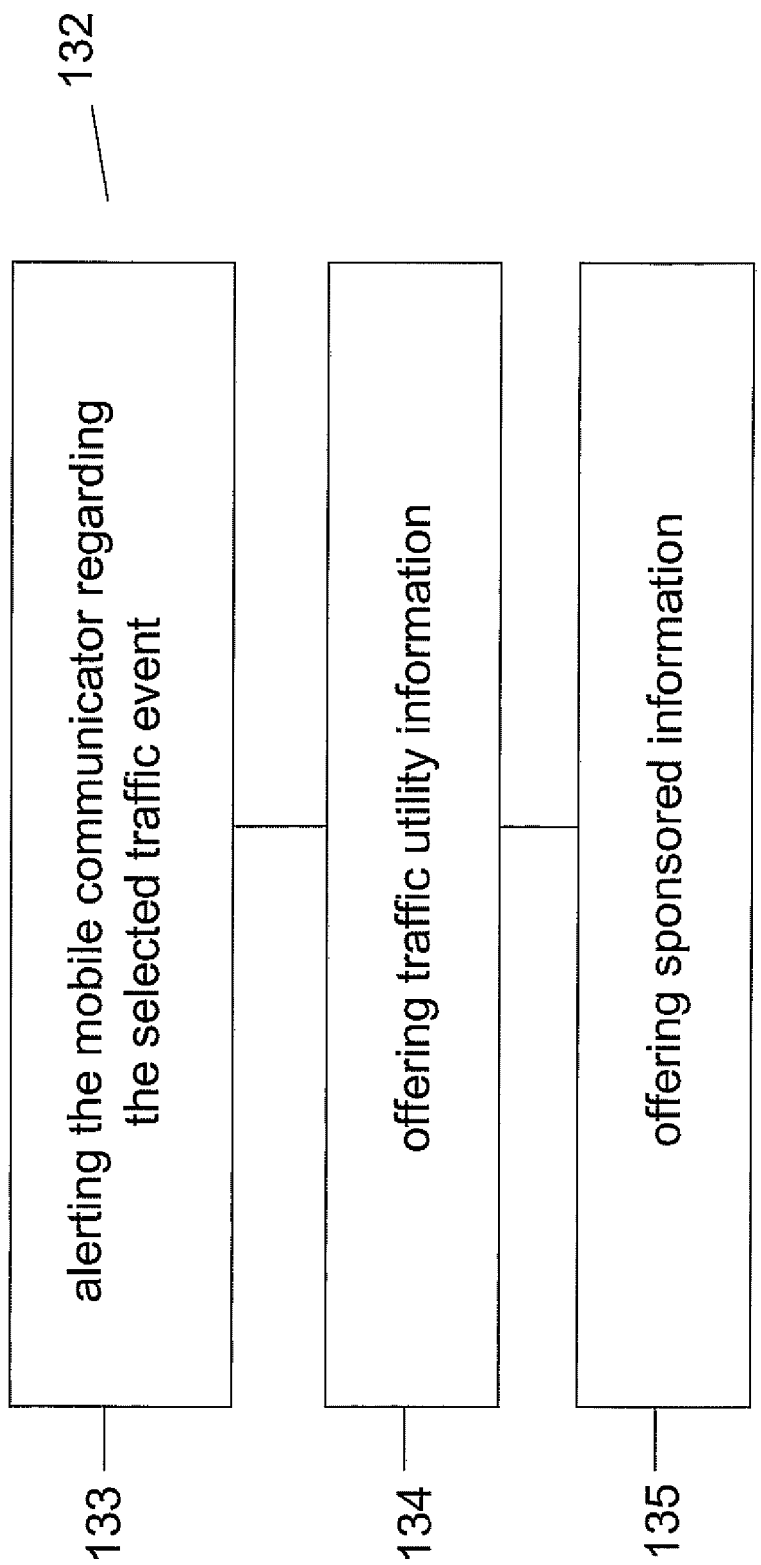
FIG. 7 illustrates a hierarchy of alert messages 133-135.

FIG. 7 illustrates that sponsored information can be offered in a hierarchical manner within step 132. Embodiments include: (step 133) alerting the mobile communicator regarding the selected traffic event, (step 134) offering traffic utility information, and (135) offering sponsored information, such as an advertisement.

The hierarchical information may be offered in hierarchical formats, or hierarchical components. These hierarchical components may include: an audio component, a text component an SMS, a video component, a radio broadcast component, a television broadcast component, a multimedia component, and a multimedia messaging service component.

The hierarchical information may be offered in conjunction with the hierarchical structure of the user-zone or the event-zone embodiments of FIGS. 5H-I. In some embodiments, a simple ring-tone is sent when the mobile communicator enters the outermost hierarchical event-layer 127i-1. Subsequently, when the mobile communicator enters the next hierarchical event-layer 127i-2, a text message is sent to the mobile communicator's cell phone. Finally, when the mobile communicator enters hierarchical event-layer 127i-3, an application is launched automatically on the cell phone to rely more in-depth traffic information.

The video/television/media information in general, and the advertisements in particular, may be offered in streaming format, in download-and-play format, and in any other kind of audio-visual format.

Embodiments include the TSP generating a passive audio alert message for the driver by generating a modified ring tone on the driver's cell phone with an announcement that an accident lies ahead, and advising to take near-located exit 100. Alternatively, the modified ring tone may only alert the driver to the selected traffic event ahead, and a text message sent to the phone of the driver may display the expected delay or other relevant traffic information.

Once the driver takes exit 100 and opens the cell phone for further information, an application may launch automatically, or the driver may be invited to launch the application (step 133). Once the application is launched, it may present additional traffic utility information, such as a live video feed from a traffic helicopter, showing the accident site, or a web-based map, highlighting the delayed routes, including the actual estimated delay times for the main route and the primary alternative routes, and possibly identifying non-delayed alternative routes (step 134). This can be followed by step 135, where sponsored information is offered as e.g. web-based advertisements, or direct single-cast of an advertisement to the cell phone of the driver. The ads can also be placed on the screen simultaneously with the traffic utility information.

Examples of sponsored information include the ads of the restaurant, located near exit 100. Or the announcement of ongoing sales at the neighboring department store. Or a promotion (such as a price reduction) announced by a nearby gas station. The knowledge of the time delay will assist the driver to decide which promotional offer to accept at the nearest exit 100. The driver may prefer utilizing the service to avoid sitting in traffic for an inordinate amount of time, and instead using the time of the traffic jam for some overdue shopping.

In some embodiments, once the mobile communicator launches an application on his or her cell phone, the TSP may make part of this application to relay individual location information back to the TSP. In these embodiments, the TSP receives one more type of traffic information: the individual speed of the mobile communicator, beyond the average speed information, available from the cell-towers. This individual information can then be one of the collected traffic information used in step 111.

Some embodiments of the passive traffic alerting method 100 can be supported by the sponsors of the advertisements.

As such, some embodiments can be offered without charge, in contrast to many present, fee-based services.

Mixed embodiments are also possible. In some cases the basic passive traffic alert may be offered free of charge, but additional components of the hierarchical messages may be fee based. For example, the more detailed traffic utility information may be provided for a fee, when the driver launches an application on his cell phone. Or, if the driver accepts an invitation for a promotional event, such as a sale in a nearby department store, then the traffic utility information may be offered free of charge.

Many forms of invitations can be implemented within the method 100. For example, a sponsor may offer a coupon to the driver in an electronic format. A particular implementation is that the coupon contains a bar coded portion attached to the invitation. Thus, the driver can take advantage of the invitation by driving to the offering department store, purchase the offered item, and during check-out swipe her cell phone with the stored bar code on its display over the laser scanner of the checkout counter.

Many other promotional items can be offered electronically, e.g. the tickets of a nearby sports game or of an entertainment event. In some embodiments, the ticket itself, possibly with a bar code or with any other identifying mark, can be sent electronically to the cell phone of the driver. Any one of these electronic promotional items, such as barcodes, can offer free products or services, or partial credit toward a full price.

In some other embodiments the promotional items may offer delayed access, e.g. the sponsoring department store may offer a coupon, which is valid for a multi-day period. Or, if a department store learns that at a future time there will be a traffic jam nearby, e.g. because of a construction of an overpass, then the department store may transmit to the driver coupons and barcodes which are valid at the future time of the traffic jam.

Some embodiments include "location-awareness" components. For example, on a highway leading from California to Nevada, a traffic accident occurs. The TSP determines the location of the mobile communicator e.g. from the data provided by the cell-phone service provider. If it is determined that the mobile communicator crossed the state-line and is in Nevada already, then not only promotional messages of local stores can be forwarded to her cell phone, but also gaming offers, e.g. bets which can be placed through the cell phone.

Some embodiments include various control mechanisms regarding the ring-tone overriding function. To avoid enabling or even allowing the creation of undesirable ring-tone overrides, various oversight functions can be implemented.

FIG. 8 illustrates an embodiment of messaging the mobile communicator. The TSP can alert the mobile communicator with a passive alert message regarding the selected traffic event in step 137.

Then, in an open application, the TSP can provide basic broadcast information in response to the mobile communicator requesting more information in step 138.

Finally, in a premium application, sponsored information can be provided to the mobile communicator in step 139. The sponsored information can be of any variety described within this application, including in-depth traffic information, location based services, such as parking information, sales-related information, event information, promotional offers.

In some embodiments mobile communicators can program their interests through their cell phones, or through any other electronic communication device, such as their computer, specifying the type of promotional offers they more interested in receiving, or whether they are interested in getting alerted about other routes, such as their family member commute routes.

In some embodiments the delayed mobile communicator may be invited to specify third party alerts, e.g. the TSP may offer alerting a family member or a co-worker of the delayed mobile communicator.

In some embodiments, the mobile communicator is enabled to interact with the mobile communication device via voice commands. Embodiments include ordering the mobile phone to launch a traffic-related application, or to modify the user-zone, or to notify a third party about the delay the mobile communicator is experiencing.

In some embodiments the TSP responds to the mobile communicator's requests by an Interactive Voice Response (IVR) system. For example, the ring tone may alert a driver of a traffic event ahead. In response, the driver may call a pre-programmed number, preferably by a single click on the phone. From this number, the driver may be provided further information regarding the traffic event.

FIG. 9 illustrates a related traffic alerting method 200, including the steps identifying traffic events from analyzing traffic information (step 210), selecting a user-zone based on a location related to a mobile communicator (step 220), selecting an identified traffic event based on a relation of identified traffic events and the user-zone (step 230), and alerting the mobile communicator with a passive message regarding the selected event (step 240).

FIG. 10 illustrates a related traffic alerting method 300. Method 300 includes identifying traffic events from analyzing traffic information (step 310), selecting an identified traffic event based on a location related to a mobile communicator (step 320), and alerting the mobile communicator regarding the selected traffic event with a plurality of messages in a hierarchical order (step 330).

Figure 11:
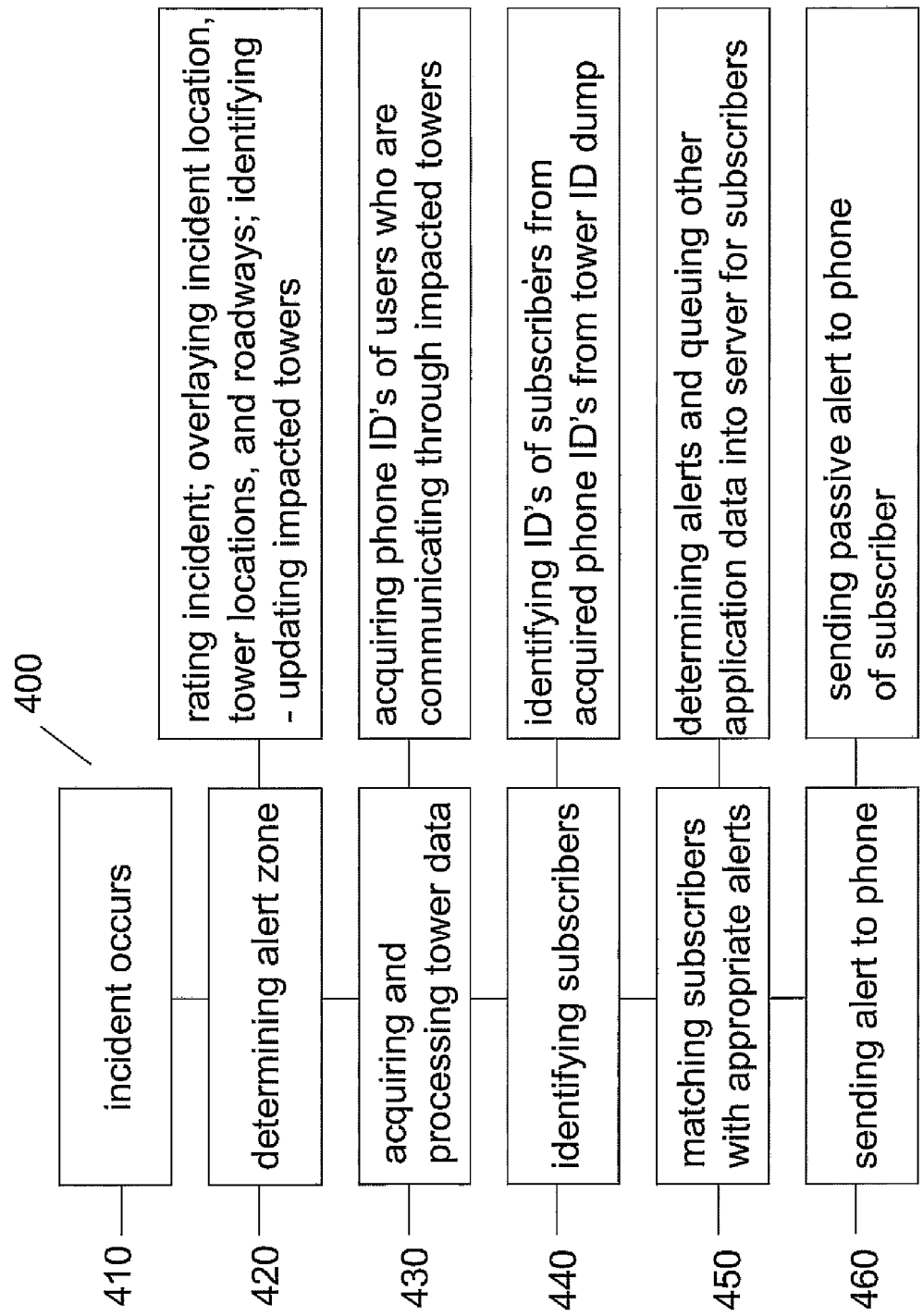
FIG. 11 illustrates an alert message generation method 400.

FIG. 11 illustrates embodiment 400 of a traffic alerting method. In particular, FIG. 11 shows the generating of the alert message in detail. In this embodiment, once the traffic event or incident occurs (410), in step 420 a determining of the alert zone gets carried out. An operator, agent, or traffic service provider, may first rate the incident data: how serious is the incident, how long delays can be expected. The ratings can be based on multiple factors, including video, helicopter, police, sensor, remote camera and other types of data. The rating of the traffic incident can be identified by carrying out earlier-described step 110.

Then the operator or agent can overlay three types of maps: a location of the incident, the map of cell phone towers, and the roadmap. From the overlaying of these three maps the operator or agent can identify the alert zone, or event zone. In this embodiment the alert/event zone can be identified in terms of mobile communication stations, such as cell phone towers. The towers which are within the alert zone will be referred to as impacted cell phone towers. They include the towers in whose vicinity the traffic incident occurred, plus the towers along which a buildup of a traffic jam is either expected, or already observed. The extent of the alert/event zone can be updated repeatedly: it can be expanded or contracted as events on the ground evolve: expanded as the traffic jam builds up and contracted as the traffic obstacle gets removed.

In the same step 420 the service provider may determine the alert which corresponds to the incident. E.g. the nature of the traffic event/incident can be determined. Examples include: the alert may specify the duration of the delay, or the type of the accident (e.g. how many cars are involved, etc.)

In step 430, cell phone tower data can be acquired and processed. For example, the identification numbers, or IDs, of mobile communicators can be collected from the impacted cell phone towers. This will identify for the service provider all cell phone users within the alert zone. This acquisition may be referred to as tower ID dump.

In step 440, the subscribers can be filtered out from the ID'd cell phone users, whose ID was acquired from the impacted towers. This will enable the service provider with a list of users, or mobile communicators, who should be provided with service from the dumped IDs.

In step 450, matching of appropriate alert can be performed. In some cases this involves determining an appropriate alert. Embodiments can maintain control over applications which generate the alert message. These embodiments can avoid the generation of inappropriate messages, which can be an important consideration. This control function is sometimes referred to as a gateway function, or "gatewaying".

In the same 450 step, other application data may be queued on the servers of the service provider. These data may include making further data available, as well as video, audio and other type of information, regarding e.g. the traffic incident. This step readies other information to provide full information application to the cell phone of the user.

In step 460 the composed appropriate message can be sent to the phone of the subscriber of the service. This message is typically a passive alert message.

Figure 12:
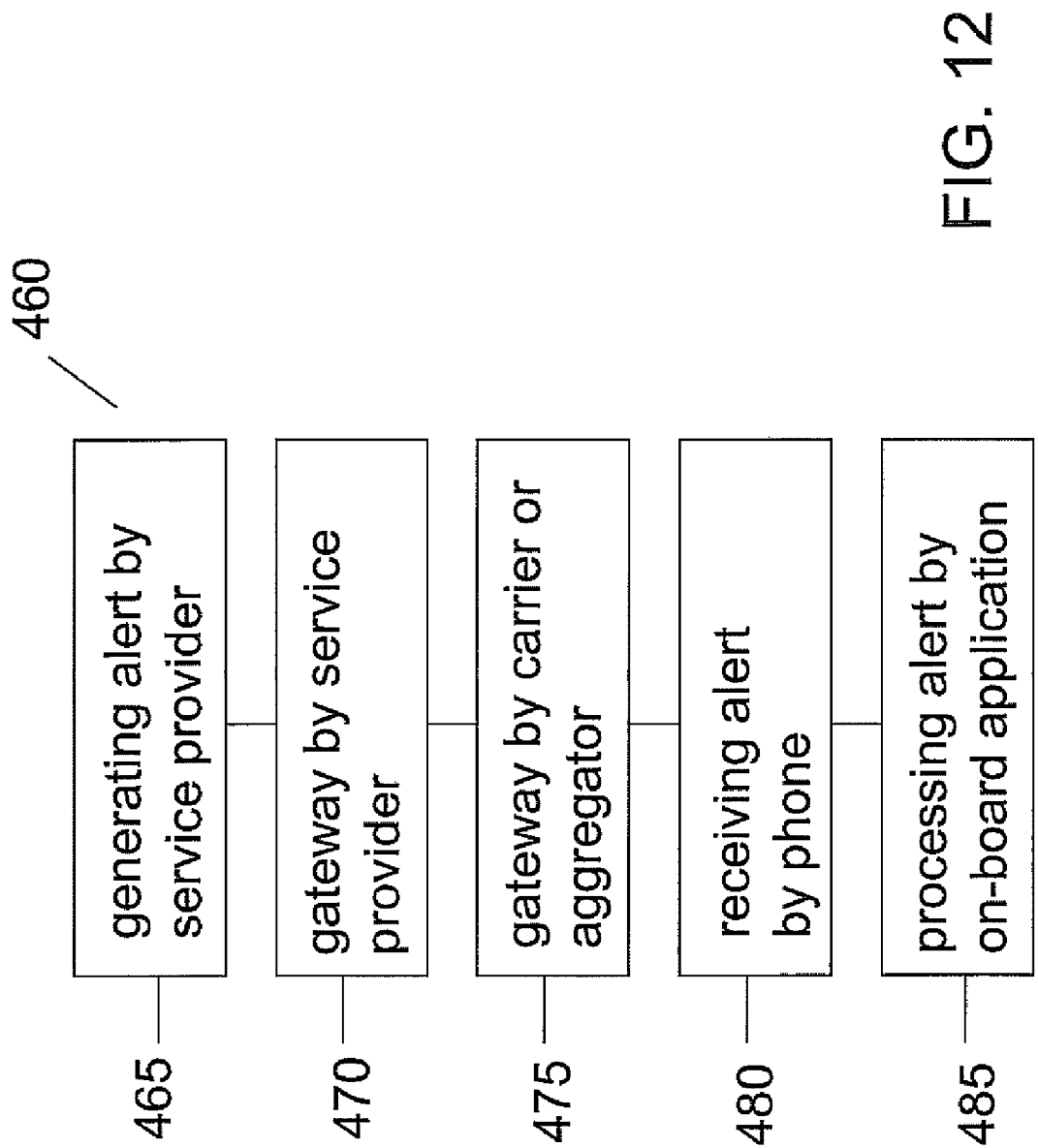
FIG. 12 illustrates an embodiment of the alert message transfer protocol.

FIG. 12 illustrates in more detail the path 460 of the alert message once it has been generated by the service provider.

In step 465 the alert message is generated, as described e.g. in steps 410-450 above and in steps 510-550 below.

In step 470 the service provider provides a gateway service. As indicated above, a purpose of this service is to prevent unauthorized users to generate inappropriate messages. In some embodiments the gateway service provides an authentication code associated with the alert message.

In step 475 the carrier, or aggregator also operates a gateway service. In some cases this carrier/aggregator gateway can search for the authentication sign from the service provider's gateway, and keep or discard the alert message depending on whether proper authentication has been identified.

In step 480 the mobile or cell phone of the individual subscriber or user may receive the alert message from the carrier.

In step 485 the alert message is actually processed by a client or application running on board of the cell phone of the subscriber or user.

Figure 13:
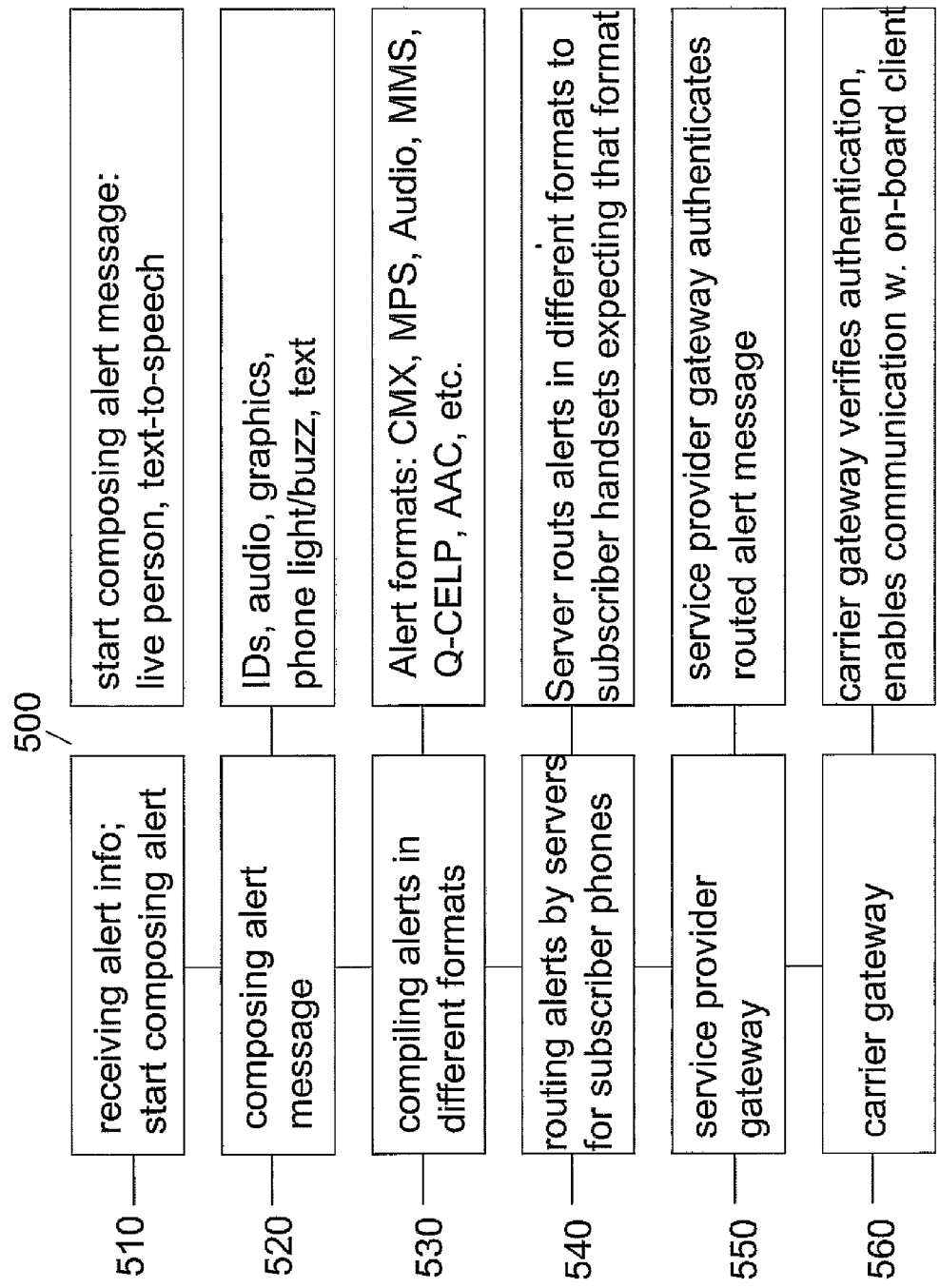
FIG. 13 illustrates an embodiment of the alert message generation method 500.

FIG. 13 illustrates another embodiment 500 of the method. Embodiment 500 shows in detail the generation of the content and format of the alert message.

In step 510, alert information is received by the system provider. In response, the system or service provider may start composing an alert message. In this first step, the alert message could be composed by a live person. This step can be performed in parallel to step 420, where the incident is rated. The live person may integrate information from various sources, including police reports, video feeds, cell tower data about the speed of passing motorists, sensors, cameras, etc. Then the live person may construct the alert message. This may involve composing a live message, or may involve text-to-speech conversion.

In step 520 the alert message can be composed. The alert message can involve an audio component, graphics, and various alert methods by the phone, such as buzzing, lighting up, vibrating, blinking, displaying text, or any other triggering. In some embodiments the phone may have a "talking telephone" application present, which makes the phone "talk" to the subscriber.

In step 530 the alert may be compiled. This may involve alert formats, including Qualcomm-CMX, MPS, Audio, Q-CELP, AAC and any other codecs for cell phones. It can also involve Multi Media Services (MMS), which can include audio, video, and text components. In some cases proprietary formats can be also utilized. This step maybe carried out in parallel with step 450 above.

In step 540 the server formats the alert message for the phones. In some embodiments the acquired and filtered IDs carry the handset profiles. These handset profiles carry information concerning the format the handset expects to receive its messages. Today about 2800 types of handsets are in use, and they require a wide variety of formats. These include the universal $3^{rd}$ generation standard 3gpp, Apple's AAC, MP3, png, jpeg formats and many other types of restrictions, such as maximum number of characters etc.

To accommodate this expectation, the servers may establish a large sorting mechanism. This includes a sorting table, which lists all the subscribers and their handset profiles. In step 530 the alert message has been compiled in all known formats. In sorting step 540 the server may rout the message in a particular format to all those handsets, whose profile indicates that they expect the message in this particular format. In simple terms, the server assigns the alert message in a specific format to those handsets which expect the message in that specific format.

In some embodiments, the subscriber may also specify additional preferences, such as at a given time he prefers to receive the alert only as a vibration but not as a voice alert. The handset profile may carry this information as well. In response, the server may rout an alert message to the subscriber, which is formatted accordingly, e.g. without the voice component.

This system is different from the system often used today, when the sorting system includes a large number of stacked dedicated servers, each specialized for formatting messages into a single format.

Step 550 illustrates the gateway function by the service provider, where the alert messages can be authenticated by a gateway.

Step 560 illustrates the gateway function by the carrier, which checks the authentication by the service gateway.

When finally the alert message reaches the phone, it will be processed by the on-board application, as e.g. in step 485 in FIG. 12. These mirroring gateways 550-560 allow for a safe communication between the service provider and the handset, and in particular the client on the handset, of the individual subscriber.

Other embodiments of the above method include a broadcast-based Mobile Alerting Network (MAN) Platform and service 1000, implemented in a push-to-talk-equivalent (PTTE) environment.

Figure 14:
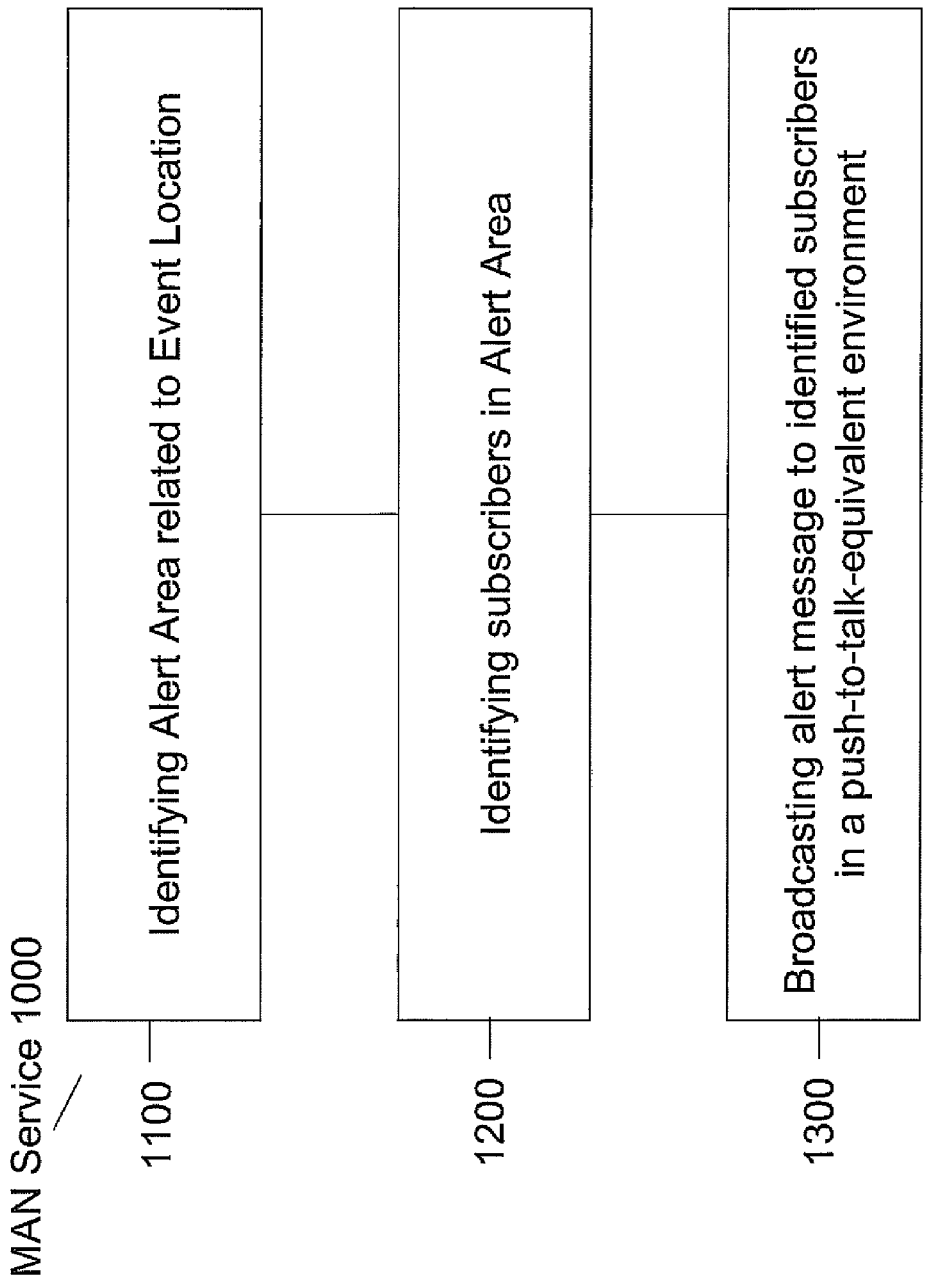
FIG. 14 illustrates an embodiment of a MAN Service 1000.

FIG. 14 illustrates the operation of the MAN service 1000.

Step 1100 may include identifying an Alert Area corresponding to an event location.

Step 1200 may include identifying subscribers in the Alert Area.

Step 1300 may include broadcasting an Alert Message to the identified subscribers in a push-to-talk-equivalent environment.

An example of MAN service 1000 can be practiced as follows.

In step 1100, a traffic event can be identified, e.g. by a "Sky Platform": "Accident occurred at exit 39 on highway 80".

There can be many ways to identify the accident as described earlier in relation to steps 110, 210 and 310. These include: from traffic camera information, from Cell Tower data, signaling slow car speed, from roadside sensors, or from traffic helicopters, as described earlier. The traffic event can be identified by using a single information source, or by integrating information from more than one of the above sources, as described earlier in this application.

The event can be any one of a wide variety of events, including a traffic accident, a weather alert, a recreational or sports event, or an E911 emergency situation, e.g. a chemical or hazardous material spill, possibly threatening with a health hazard.

The Sky Platform can then determine an Alert Area passively i.e. without requiring communication with a central system of the Carrier Network. The Alert Area can be defined in terms of cell towers: the Sky Platform identifies which cell towers belong to the Alert Area. In the above example, the Alert Area includes the Cell Towers which manage the cell phone traffic in a suitably defined vicinity of exit 39 on highway 80. The Alert Area is an embodiment of the event zone 127, described earlier.

In step 1200, a group of subscribers of the Broadcasting Alert system can be identified in relation to the Alert Area, e.g. by a Sky Tracker Module. The Sky Tracker Module can acquire the list of users who are presently registered with or are in communication with the Cell Towers in the Alert Area. Then the Sky Tracker Module can cross reference this user list with a list of subscribers of the MAN service. The subscribers may be identified e.g. by overlaying the event zones 127*a-p* of the Alert Area with the above described user-zones 123*a-p*, preset by the subscribers.

Other methods include identifying subscribers by operating a Sensor Array, as described below in relation to Sensor Array-based Mobile Broadcasting Alert (SAMBA) service 2000 below.

The subscribers can be identified by their subscriber mobile ID, or by their International Mobile Equipment Identity (IMEI), or by any other handset identification information, such as an IMSI or MIN number, or by their phone number.

In cases of extreme emergency, such as a radioactive or chemical spill, a rapidly advancing fire, or a mudslide, all users will be selected, not just subscribers.

In step 1300, an Alert Message 1301 can be prepared and broadcast to the identified subscribers by a master broadcaster. The master broadcaster can be a Broadcast Module of a server of the MAN service 1000.

In prior systems, such as user-to-user push-to-talk systems, the communication was only point-to-point type. Master broadcasters were not used in push-to-talk environments.

In contrast, the MAN service 1000 may broadcast the Alert Message 1301 in a Push-To-Talk (PTT) network or Integrated Digital Enhanced Network (IDEN). PTT and IDEN are mobile telecommunications technologies, which provide their users the benefits of a trunked radio and a cellular telephone. Since in these systems the traffic is unidirectional (when the user signals the desire to talk by pushing a button, the traffic in the incoming direction is stopped), the required frequency widths of the channels are narrower. Thus, these PTT and IDEN systems are capable of managing more users in a given spectral space, compared to analog cellular and two-way radio systems. Some of the techniques used by PTT and IDEN systems use speech compression and time division multiple access (TDMA). The MAN service 1000 may also be integrated into a GSM system.

The Alert Message 1301 can include a Short Message System (SMS) message.

Figure 15B:
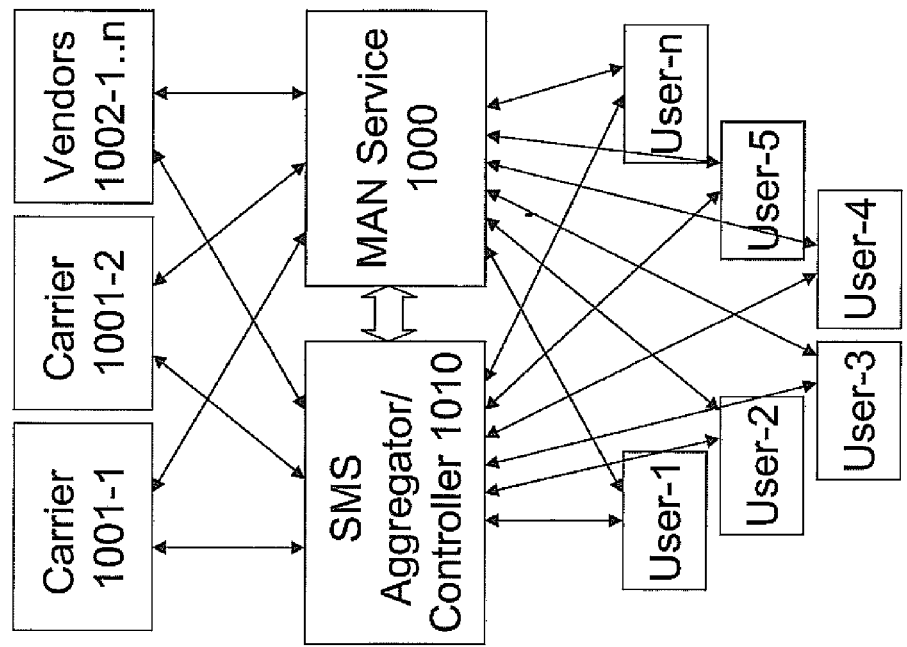
FIGS. 15A-B illustrate embodiments of a MAN System.
Figure 15A:
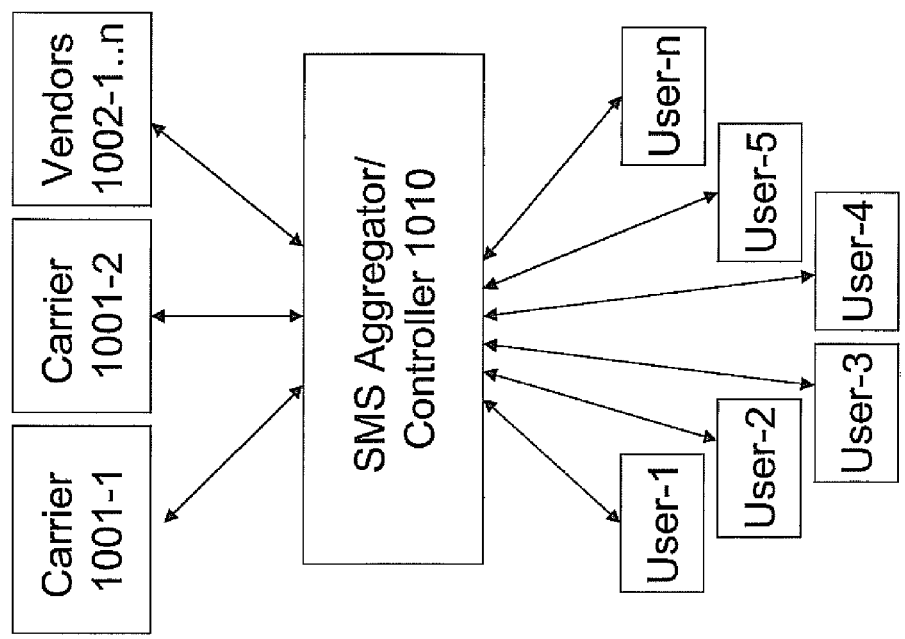

FIGS. 15A-B illustrate a network architecture of the MAN service 1000, using SMS messages.

FIG. 15A illustrates that in existing carrier networks the short messaging system (SMS) allows users to send short messages to other cell phones. These messages are typically sent to the full (typically ten digits) phone numbers of the targeted single users. In commercial applications, short codes can be utilized as target "phone numbers".

In an example a TV or radio broadcast invites listeners to send a purchase order in the form of a predefined SMS message addressed to a short code of only five digits, where the short code is linked to a full regular phone number. E.g. a disc jockey can prompt her listeners to purchase and download a ring tone composed by a band called "Band" onto their phone by announcing: "Text 'Band' to 12345 to get your new ringtone composed by the Band". Texting "Band" to 12345 by a user may prompt a commercial transaction: the downloading of the band's ring-tone to the user's phone, possibly associated with a payment for the download. Other examples include a purchase of a band-related memorabilia or a placing a vote in a contest. The payment for this commercial transaction is sometimes linked to the phone bill of the user, or to a previously set up account.

Managing these commercial transactions is a considerable task. The actual commercial transaction is carried out by prompting a vendor to deliver the purchased item e.g. through a download or through regular channels such as by mail. In turn, the user's account is reached and billed. The manager of these transactions communicates with the Carrier to get authorization for the transactions and to pay for the services provided, among others. If the user has an account with one Carrier but the transaction is taking place through another Carrier, then a Carrier-to-Carrier communication also takes place.

To manage these complex tasks, presently cell phone Carrier Networks 1001 typically utilize SMS Aggregators, or SMS Controllers 1010. These SMS Aggregators, or SMS Controllers 1010 manage the SMS-based transactions in large volumes, in bulk. E.g. an SMS Aggregator 1010 may enter into a contract with a Carrier 1001 for managing a million SMS messages per month. These SMS Aggregators/Controllers 1010 can be set up physically at or near the high level national or regional centers of the Carrier Networks.

The network topology can have different forms. In same cases the SMS Aggregators 1010 have direct connection to the Users-1 . . . n, in others the primary connection is between the Users-1 . . . n and the Carrier Networks 1001.

An even smaller number of service providers, sometimes a single national level entity, may manage the assignment of the short codes. The assignment of a particular short code to a particular full phone number can be purchased for specific periods, e.g. the run of a promotion campaign, or a TV program. Or, it can be purchased for a long period, on an ongoing basis.

FIG. 15A illustrates certain existing SMS-based systems. Users-1 . . . n can be in communication with the SMS Aggregator/Controller 1010, e.g. sending a text message to a short code, requesting a commercial transaction. The SMS Aggregator/Controller 1010 can be in communication with a Vendor 1002 and facilitate the commercial transaction, such as the mailing of a T-shirt of a band to a User. The SMS Aggregator/Controller 1010 can also communicate with Carrier 1001-1, on whose network (towers, servers, switches, etc) the actual transaction is taking place, e.g. on a "fee per message" basis. The fee can be a fixed sum or a "revenue-split" percentage of the transaction. If some of the users, such as User 1 and User 2 have their phone account with a different Carrier 1001-2, then the SMS Aggregator 1010 may locate the accounts of User 1 and User 2 at Carrier 1001-2 and bill these accounts in relation to the transaction on Carrier 1001-1.

The SMS Aggregators 1010 often use the TCP/IP, such as the short-message-peer-to-peer-protocol (SMPP) to place their messages in bulk. The commercial aspects, such as the actual payments, can be carried out in the framework of premium SMS, or PSMS systems.

FIG. 15B illustrates embodiments of the present MAN Service 1000. The MAN Service 1000 can be provided instead of, or in parallel to the regular SMS Aggregators 1010. In some cases, there can be a communication link between the MAN Service 1000 and the SMS Aggregator 1010. The MAN Service and Platform 1000 can be connected between Users-1 . . . n and Carrier 1001-1 and Carrier 1001-2. The MAN Service and Platform 1000 can also directly communicate with the Vendors 1002-1 . . . n.

In some embodiments, the MAN Service 1000 can communicate by broadcasting promotional offers to the Users-1 . . . n in relation to the Alert Messages 1301, in a Push-To-Talk-equivalent environment, as described next.

Figures 16A, 16B:
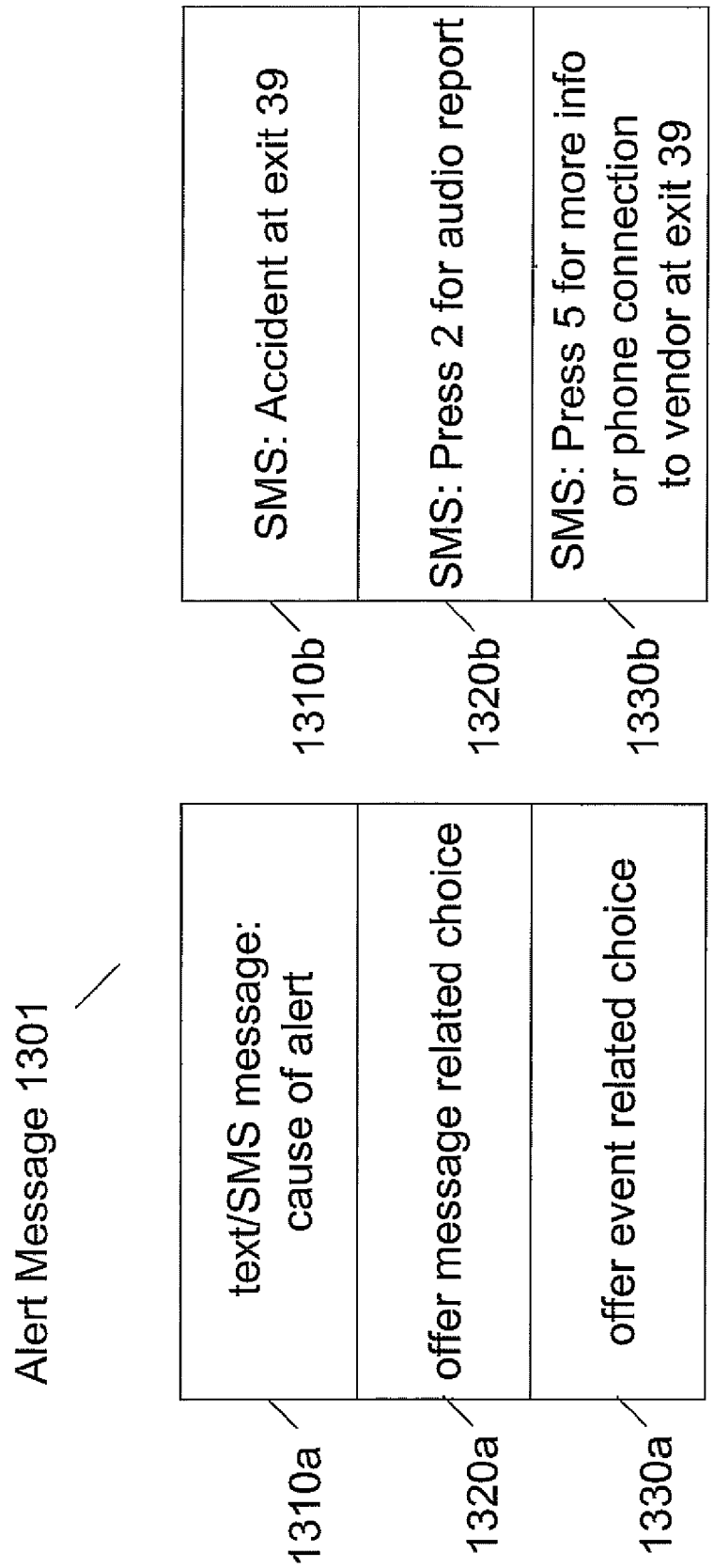
FIGS. 16A-B illustrate an Alert Message 1301.

FIGS. 16A-B illustrate embodiments of some of the Alert Messages 1301 which can be sent by the MAN Service 1000. These Alert Messages 1301 can have more than one part. In some cases the Alert Message 1301 can contain three parts.

FIGS. 16A-B illustrate a general case of a three part Alert Message 1301. Part 1310a can alert the subscribers and inform them about the cause of alert, such as an event or an accident. FIG. 16B shows an example 1310b: the Alert Message "accident at exit 39" is displayed on the phone's display as an SMS message.

Part 1320a can offer Alert Message related choices in general. An example is 1320b: the phone displays the SMS: "Press key 2 for audio report", or "Press 2 to receive the Alert Message in audio format". In a rapidly increasing number of countries, manual operation of mobile phone handsets is prohibited while driving. In such countries opting to receive the message in audio format may be preferred by many user/subscribers. If the user/subscriber pressed "2" to receive the Alert Message 1301 in audio format, then portions of the Alert Message, such as the cause of the alert and subsequent event-related information can be delivered in audio format.

The Alert Message 1301 can be implemented in a "Push-To-Talk" environment. In such implementations the lead part 1310 of the Alert Message 1301 can already be an audio message. Implementations on Carrier Networks, which provide real Push-to-Talk services can include sending to and playing on the handset a direct audio announcement, without any action required from the subscriber, announcing that an accident happened at exit 39. This is an implementation of step 130 above, where the mobile communicator is alerted with a passive message, which does not require the launching of an application or client. In fact, it does not require any initial manual operation from the subscriber—an advantage in traffic-related applications, for example.

In "Push-To-Talk-Equivalent" (PTTE) implementations, the incoming SMS message may wake up the Alert Client, which has been downloaded onto the handset previously, to announce that "An accident happened ahead. For more information, press 2". In the rest of the application the PTT and PTTE implementations will be generally referred to as PTTE implementations.

Part 1330a may offer event related choices. Part 1330b is an example: the phone displays the SMS offering a "hot key" which translates to a phone number: "Press key 5 for more information or for a phone connection to a vendor at exit 39". Or, the phone speaker may state the same, if key 2 was pressed in 1320b. By pressing the hot key 5, the individual subscriber/user can retrieve further information. In some embodiments, pressing such a "hot key" can activate a client, which is capable of connecting to an internet web address of a vendor describing a promotion through an Internet protocol. In other embodiments, pressing the hot key can connect the user to a vendor who placed the promotional Alert Message.

An example of 1330b is an SMS message being displayed: "At exit 38, all pizzas are 20% off at Domino's. For more information, press 5". Pressing 5 can activate a client on the handset, which proceeds to download a Multi Media message, such as an internet based web page, an audio, a video or a message in any other media format, which provides information about the offer at Domino's.

Several different types of multimedia messages can be downloaded on the phone, including coupons and bar-codes related to promotions, and more announcements. Such coupons or barcodes can be stored on board. When the subscriber walks up to the counter at Domino's to pay for his pizza, the subscriber may pull up the stored bar code on the screen of the cell phone and hand the phone over to the check-out clerk. The clerk may swipe the display over a sensor, which recognizes the bar code and give the customer the 20% discount.

Another example of 1330b is displaying offering an option: "To be connected to Domino's by phone, press 5".

Figure 17:
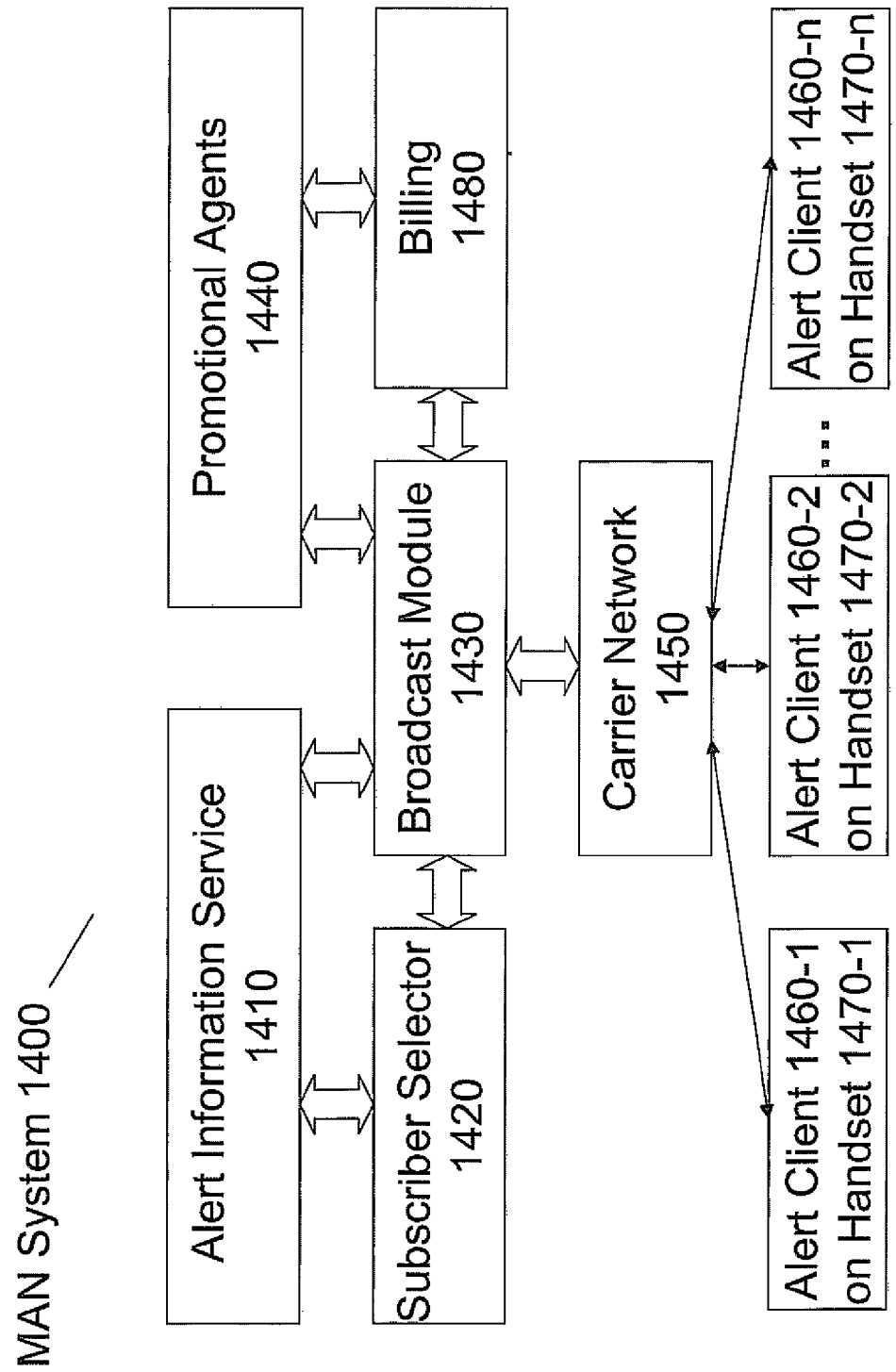
FIG. 17 illustrates a MAN system 1400.

FIG. 17 illustrates the modules and their interaction of a MAN system 1400, associated with the above MAN service 1000.

An Alert Information Service 1410 can provide the information subscribers are interested in and subscribed for.

Figure 18:
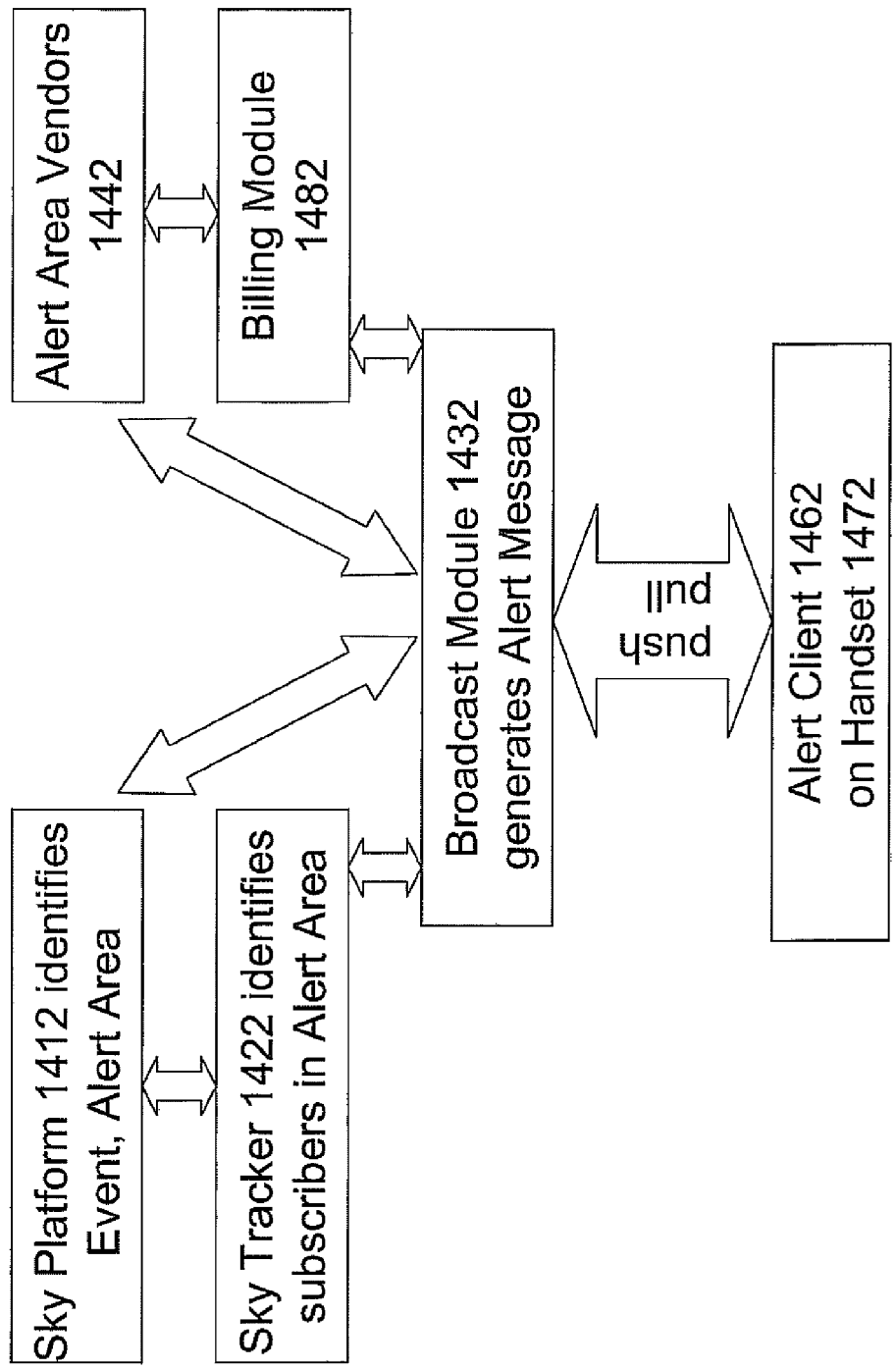
FIG. 18 illustrates a MAN system.

FIG. 18 illustrates a specific example of a MAN system 1400, where the Alert Information Service 1410 includes a Sky Platform 1412, as described above, which identifies traffic events of interest, such as traffic jams or hazard conditions, as described in relation to steps 110, 210, 310, and 1100 in previous embodiments. The Sky Platform 1412 may then determine the Event Location and a corresponding Alert Area in relation to the identified Event Location.

In the above traffic example, the Identified Event may be a traffic jam at exit 39. In this case the Sky Platform 1412 may identify the section of highway 80 between exits 35 and 39 as the Alert Area.

Returning to FIG. 17, the Alert Information Service 1410 may be coupled to a Subscriber Selector 1420. The Alert Information Service 1410 can provide information to the Subscriber Selector 1420, which identifies subscribers who should be contacted related to this information.

FIG. 18 illustrates that the Sky Platform 1412 can be coupled to a Subscriber Selector such as a Sky Tracker Module 1422 and can forward the Identified Event and Alert Area to it. The Sky Tracker Module 1422 can then select subscribers who may be interested in the information related to the Identified Event. This determination can involve cross-referencing the list of users registered at Cell Towers in the Alert Area with a list of subscribers.

In embodiments using e.g. Cell Tower data, no GPS application needs to be activated on the handset to locate the subscribers. These embodiments have higher operational speed and require less battery power from the handset than GPS based applications. Nevertheless, the Subscriber selector can also utilize GPS to locate subscribers in other embodiments. Yet other embodiments can use the Sensor Array-based Mobile Broadcasting Alert (SAMBA) systems 2400, as described below in relation to FIG. 25.

In the above traffic example, the Sky Tracker Module 1422 may identify the Cell Towers which serve the drivers in the Alert Area on highway 80 between exits 35 and 39, request and receive the list of all cell phone users who are registered at these Cell Towers, and cross reference this list of registered users with a subscriber list to establish which subscribers to reach.

The Alert Information Service 1410 can be a wide variety of other service providers, who provide information related to traffic, sports, finance, news, emergency, or entertainment. In many of these cases, the information service is not necessarily location based. In some implementations, the information is event based, such as the end of a ball game, or the closing of the stock market, or tickets becoming available for a show, or hotels rooms becoming available at a reduced rate, or the end of a bidding, betting, or voting period. In these cases, the Subscriber Selector 1420 may select all, or a large fraction of the subscribers who are within the service area.

The Subscriber Selector 1420 may contact a Broadcast Module 1430 with the Alert Information and the list of Selected Subscribers. In some embodiments, there is a direct communication link between the Alert Information Service 1410 and the Broadcast Module 1430. In some of these arrangements the Alert Message can be assembled without knowledge or reference to the Subscribers.

In the Example of FIG. 18, the Broadcast Module 1432 can receive communication form either the Sky Platform 1412 or the Sky Tracker 1422, or both.

In any one of these arrangements, the Broadcast Module 1430 may generate and assemble an Alert Message in response to the communication from the Alert Information Service 1410 and the Subscriber Selector 1420.

The Alert Message can contain the message portion 1310*a-b* related to the Identified Event and may offer the event-related promotional choices 1320*a-b*.

These promotional choices may originate at Promotional Agents 1440.

As FIG. 18 illustrates, such Promotional Agents 1440 may include Alert Area Vendors 1442 in the Alert Area, or in its proximity.

In the above traffic example, the Alert Area Vendors 1442 can include those fast food vendors, who are contracted with the provider of the MAN service 1000 and are located in the proximity of exits 35 to 39, such as the Domino's pizza at exit 37. For example, the headquarters of the Domino's fast food chain may have set up a running contract with the provider of the MAN service 1000, which lists the location of all Domino's restaurants where the MAN service 1000 is available. The contract may specify that every time a traffic event occurs, the MAN system 1400 shall identify the Domino's which is located within the Alert Area, e.g. the stretch between exits 35-39, as Alert Area Vendor 1442. This step is analogous to step 131, where information sponsors were identified based on the area of the handset user. Then the Broadcast Module 1432 can generate an Alert Message related to the traffic jam at exit 39, which includes an offer of discounted pizza at the Domino's located at exit 37.

As shown in FIGS. 17 and 18, the Alert Message is then broadcast by the Broadcast Module 1430/1432 to Alert Clients 1460-1, 1460-2, . . . 1460-*n* which have been downloaded onto the subscriber's Handsets 1470-1, 2, . . . n. The Alert Message is typically broadcast through one or more Carrier Networks 1450.

As discussed above, running an application on a handset can drain the power from the handset fast. Therefore, it is advantageous that the Alert Clients 1460 can be a small client on the handset. Thus, while the Alert Client 1460 is active on the handset, it may require only minimal power to operate and poses only a limited demand on the battery of the handset. In some PTTE implementations, the handsets may have only a minimal Alert Client 1460. And, as explained earlier, for the initial step of receiving the Alert Message, some PTTE implementations may not use an Alert Client 1460 whatsoever.

The Alert Message can be structured as follows. While the length of the SMS messages in principle could vary in a wide range, presently the length of the typical SMS message is 160 characters. Thus, implementations of the above three part Alert Message 1310-1330 can be 160 characters long.

The actual SMS of the Alert Message may contain the following components:

<date, time, message ID, size, hot key#>

The date and time can provide a time stamp for the message. The "message ID" can identify a prestored message already on the phone. In a simple example "message ID=1" can wake up a client on the cell phone which then generates the audio message: "To get more information about the event, press 5" (the number of the hot key). In more complex installations, a database can be stored on the handset, containing entries for all vendors who are associated with the MAN service 1000. In the above traffic example, "message ID=223" can identify Domino's as one of these vendors, generating the display or audio message: "To be connected to Domino's by phone, press 5".

In some implementations, the MAN service 1000 may not be based solely on location or traffic. E.g. the MAN service 1000 can be based on events. An example is a service associated with a sports club, such as the Yankees. This implementation of the MAN service 1000 may send an Alert Message to a subscriber when the Yankees game is over. A "message ID=272" may launch a pre-recorded audio announcement on the phone: "The Yankees game is over. To receive the result of the bait game, press 5".

The MAN service 1000 can be associated with a wide variety of events. The events can be weather related, e.g. alerting subscribers to tornados. Or, the service can be financial, alerting the subscribers if a stock goes below a price level: "The stock GOOG dropped below $500. To get a stock update, press 5".

Figure 19:
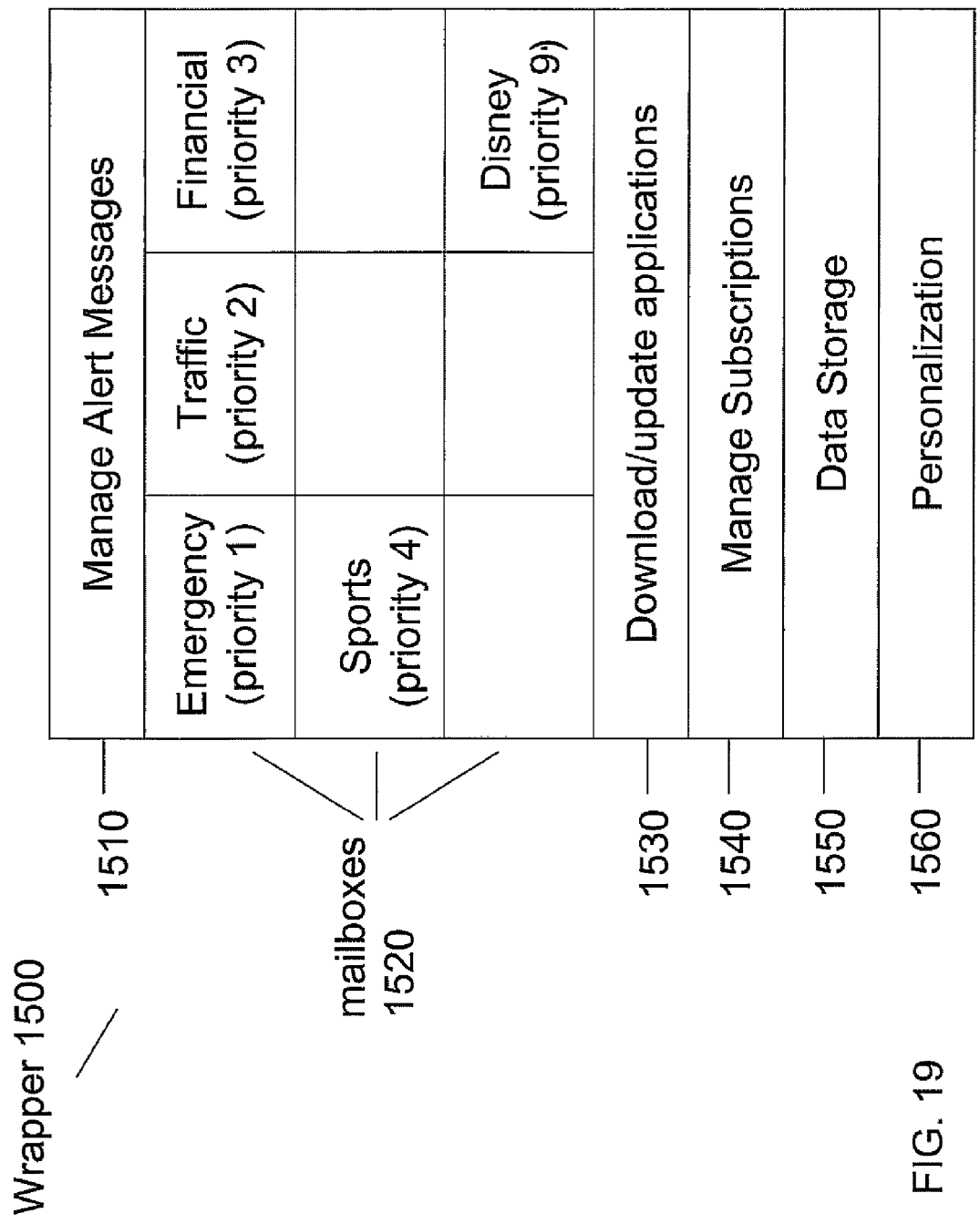
FIG. 19 illustrates a Wrapper 1500.

FIG. 19 illustrates that managing the Alert Messages in relation to the SMS queue and the various subscriptions in parallel may be a complex task. Some implementations carry out these functions with deploying a Wrapper 1500, possibly as a part of the Alert Client 1460.

The functions of the Wrapper 1500 may include:
- 1510—Managing Alert Messages;
- 1520—Managing a mailbox function, including prioritizing messages;
- 1530—Downloading and updating applications;
- 1540—Managing subscriptions;
- 1550—Storing Data, related to messages and promotions; and
- 1560—Personalizing.

In detail, the Alert Message Manager 1510 may be capable of (i) recognizing an incoming Alert Message within the SMS queue, (ii) pulling it from the queue without disrupting the active SMS sessions, and (iii) presenting the Alert Message to the subscriber.

It is often the case that the subscriber has several SMS sessions active on the handset. Some of these SMS queues can contain literally hundreds of SMS messages lined up. It typically requires manual operation (i) to move from one SMS session to another, and (ii) to scroll to the most recent SMS message.

If the Alert Message were treated as one of the regular SMS messages, it would not serve one of its central functions, alerting. The Wrapper Alert Message Manager 1510 is an application, which can review all incoming SMS traffic, and is capable of identifying the Alert Messages as non-regular SMS messages and process them accordingly. The Wrapper Alert Message Manager 1510 can pull the Alert Messages from the SMS queue and display them with the highest priority. In some implementations, the wrapper can perform these functions without breaking the queue of the regular SMS messages, e.g. without deactivating the active SMS sessions. The Wrapper Alert Message Manager 1510 is capable of performing these functions without manual operation required from the subscriber.

If a subscriber subscribes to more than one Information or Alert Information Service 1410, then the Wrapper 1500 may manage the various Alert Messages through a Mailbox Module 1520. The Mailbox Module 1520 can store alerts from different MAN services 1000.

In an example, a subscriber of several MAN services may be driving home. Her Traffic MAN service may broadcast a Traffic Alert Message regarding an accident ahead. The Wrapper Alert Message Manager 1510 may identify the Traffic Alert Message, lift it from the SMS queue, attach the highest priority "1" to it, and present it in a Push-To-Talk format to the subscriber. The subscriber may choose to respond to the Traffic Alert Message by asking for more information regarding the accident.

During this transaction, her Financial MAN service may send a Financial Alert Message regarding the closing prices of her stocks. The Wrapper Alert Message Manager 1510 may again identify the Financial Alert Message, lift it from the SMS queue, but attach to it a priority "3", e.g. based on the initial setup of the Mailbox Manager 1520 by the subscriber. Therefore, while the subscriber is processing the Traffic Alert Message, the wrapper may store the Financial Alert Message in a Financial mailbox 1520-2. The Wrapper Mailbox Manager 1520 may present the content of the Financial Mailbox 1520-2 after the traffic-related transaction has ended.

In another example, the subscriber can be making an actual phone call when a new Alert Message is received. The Wrapper Mailbox Manager 1520 may then store the Alert Message in the corresponding Mailbox and present it after the phone call is finished. Or, if some Alert Messages are given higher priority than phone calls, the Wrapper Mailbox Manager 1520 may even interrupt the phone call and present the Alert Message. This may occur e.g. if the subscriber is making a long personal call, and the phone receives an emergency type E911 Alert Message about a radioactive spill on the road ahead.

The Wrapper Applications Manager 1530 may be able to review the applications on board, communicate with the central servers of the MAN service and report the versions of the applications, and if newer versions are available, then reach out and locate the newer version, download them onto the phone, unpack the download and update the applications by installing the newer version.

In an example, if the subscriber has a game on board, the Wrapper Applications Manager 1530 may be notified by the game's provider that a newer version is available. Then the Wrapper 1500 may proceed and download the newer version of the game and install it on board.

The Wrapper Subscription Manager 1540 may be able to manage the different subscriptions associated with the applications on board and the Alert Messages. E.g. some of the applications may have a fixed time-period license, or the updates may require payments. Some of the Alert Message Information Service providers 1410, such as the Financial Alert Message Service, may also require fees, e.g. on a periodical basis. The Wrapper Subscription Manager 1540 can manage these obligations.

The Wrapper Data Storage Manager 1550 may manage all storage functions required by the various applications. E.g. some Alert Message Service Providers may wish to enhance the impact of their Alert Message, or subsequent promotion message by sound effects. The service can be accelerated if these sound effects are already stored on board. In some cases the Data Storage Manager 1550 may organize the over-writing of stored data, if that data is out of date.

In an example, an Entertainment Alert Service provider may play a theme song, which was stored on board before presenting the actual message of surplus theatre tickets being available. Or, a Financial Alert Service provider may start its message by a stock phrase announced by Donald Trump, pre-recorded and stored on board.

While in some embodiments the Alert Message maybe transmitted within an SMS protocol, in other embodiments the Simple Mail Transfer Protocol (SMTP) can be used. This can be of importance as in some countries and in some situations it is increasingly difficult or even illegal, to charge a fee for SMS transmissions. Further, in some areas in the United States, the SMS response time of the big carriers may slow down substantially e.g. in peak traffic hours, or after a sports game, in some cases to tens of seconds. Finally, the SMTP is compatible with the recently introduced 3GPP protocol, supporting extremely fast response times. The above considerations underline that systems using the SMTP protocol can be quite effective in supporting high speed communications, and thus can be used to implement the Alert Messaging system.

In implementations which use SMTP protocols instead of SMS protocols, the Wrapper 1500 may be able to pull and activate the Alert Message which arrived in an email format, and process it with highest priority. This is a departure from established mail protocol, which typically requires the email recipient to actively pull up or acknowledge the receipt of the email.

Figure 20:
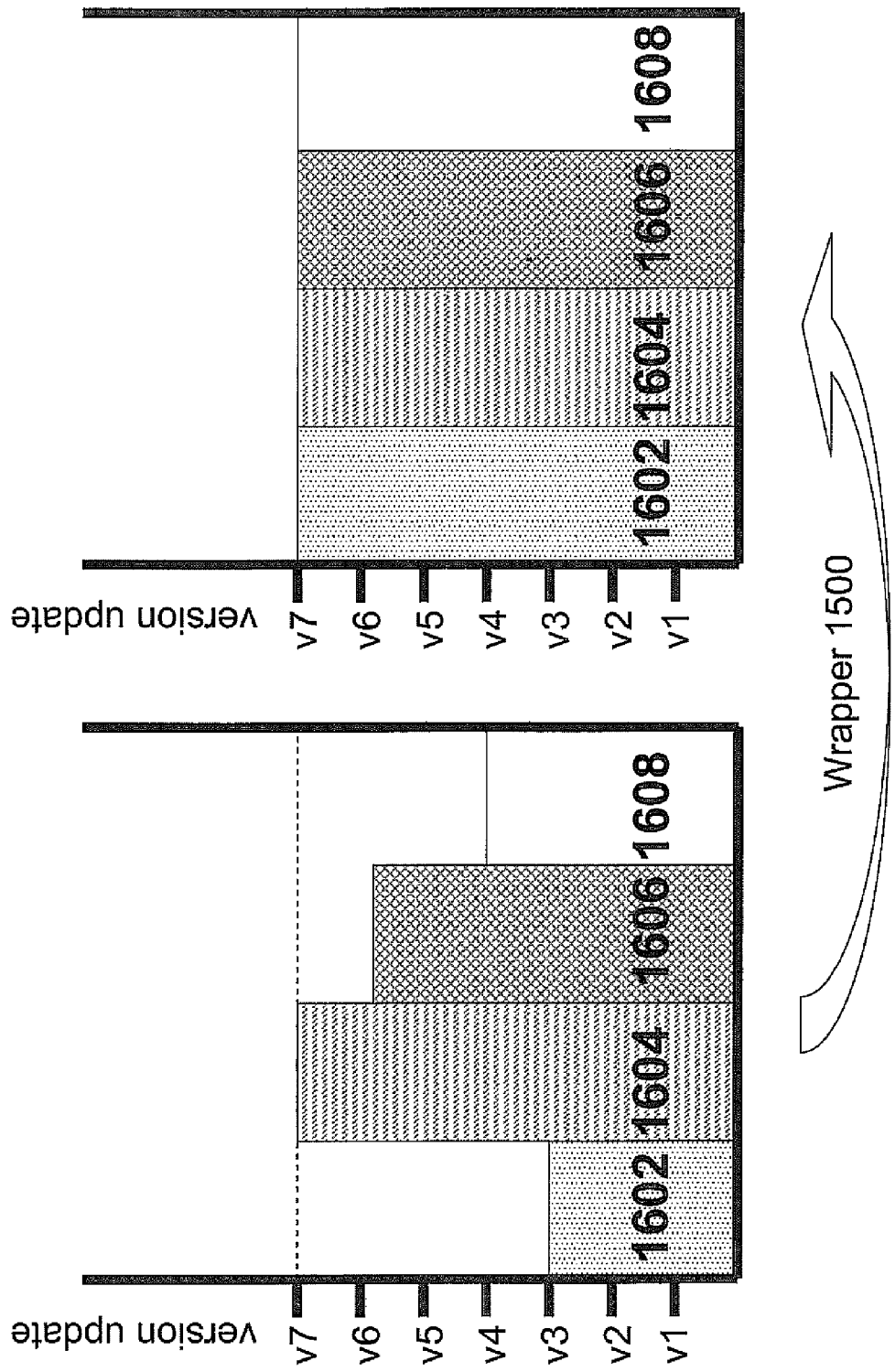
FIG. 20 illustrates an updating function of the Wrapper.

FIG. 20 illustrates the updating function of the Wrapper 1500. The columns 1602-1608 represent four applications, which are required to properly display a multimedia message (MMM), in response to the subscriber requesting more information regarding the promotion. In an example, the subscriber may wish to see a trailer or preview of a show in a MMM format for which discount tickets are being offered. Displaying this MMM message may require the most recent version of a video player, such as version 7 of the Flash or Shockwave video players. Other applications may include the Communication Protocol (CP), the Real Time Text Protocol (RTTP), or the QCP for the ring tones. In typical situations these sub-applications operate over the Operating System (OS), which itself may need updating.

The dotted line indicates the case when properly displaying a requested MMM requires that the handset has version 7 of all the applications, players, plug-ins and protocols. Of course, in many cases, the latest versions have different version numbers.

The Wrapper 1500 may profile the handset and determine which versions of the applications are installed on board. In the present example, version 3 of the application 1602, version 7 of application 1604, version 6 of application 1606 and version 4 of application 1608 is on board.

After this profiling step, Wrapper 1500 may reach out to the MAN service provider or the regular Carrier Network, locate version 7 of the applications in need of updating, i.e. 1602,

1604, and 1608, and download and install version 7 of the identified applications on the handset.

Some cell phones may not have the proper hardware for the MAN service 1000. Thus, even downloading the required software may not prepare the phone for processing the MMM properly.

In fact, many phones simply do not have a speakerphone. In these phones implementing either the PTT-based MAN service 1000, or even the PTT Equivalent (PTTE) service can be a challenge. Some implementations can solve this problem by the Wrapper 1500 profiling the hardware of the handset as well, e.g. concluding that no speakerphone is available, then locate an application on the internet which can modify the ring-tone generation of the handset. Downloading and installing the ring-tone modifying application may create a functionality with which the phone is capable of alerting its subscriber to the receipt of an Alert Message through the modified ring-tone, even if no proper speakerphone hardware is on board.

Some implementations of the Alert Client 1460 and the Wrapper 1500 may be as short as 32 kbyte. The power consumption of e.g. the Alert Client 1460 can be further reduced in some implementations. The phone may be equipped with a motion or acceleration sensor. The subscriber may spend most of the day in an office and thus may have little or no interest in traffic conditions. In such setups of the service, the power consumption may be reduced by switching off the Alert Client 1460 completely as long as the motion or acceleration sensor does not sense a (sufficiently strong) motion or acceleration.

When the subscriber starts to go home, the motion or acceleration sensor may sense a sufficiently fast movement or acceleration. In response, it may wake up the Alert Client 1460 so that it can start receiving traffic related messages. In other embodiments, the waking up of the Alert Client 1460 may be programmed according to the time of the day, e.g. waking up the Alert Client at 4:30 pm, if the subscriber typically leaves the office at 5 pm. Then the Alert Client 1460 may receive the message about a traffic jam blocking the main route homes in time so as to advise the subscriber to choose an alternate route instead.

As illustrated in FIG. 18, the interaction of the Broadcast Module 1430 and the Alert Clients 1460 can be of the "push-pull" type. The Broadcast Module 1430 sending the Alert Message is an initial push step. The Alert Client 1460 can then respond by pulling more information from the Broadcast Module 1430.

Implementations of the "pull" step can be prompted by the subscriber in response to Alert Message portion 1330*a-b*. In the traffic example, the subscriber is invited to press 5 to get a promotion. In the example of FIG. 6, this corresponds to the step 132 of "offering sponsored information". In either case, the subscriber may choose to press 5, which prompts the Alert Client 1460 to pull additional sponsored information to the handset from the Broadcast Module 1430.

The additional sponsored information can be of a wide variety. It can be a multimedia message, a webpage uploading on the handset via IP/WAP, a more detailed representation of the offer, an image of a coupon which can be redeemed, or a barcode.

Some embodiments of the system may be practiced in relation to personal digital assistants (PDAs) or other integrated mobile devices, e.g. devices which have navigational/GPS capabilities.

Once the promotional multimedia message is retrieved or downloaded on the handset, the Alert Client 1460 may play it without further intervention by the subscriber.

The downloaded additional information can be simply more information, such as providing a map to the location of the Promotional Agent 1440. However, in many implementations, the additional download can involve a commercial transaction. These implementations include urban MAN services 1000, e.g. in large metropolitan areas alerting subscribers if a show in a nearby theater has unsold tickets available at reduced prices. In such implementations, the subscriber may want to initiate a commercial transaction in response, such as buy the offered tickets.

Commercial transactions may require authorization and billing procedures. The billing procedures can be managed through Billing Module 1480, which can be in communication with Broadcast Module 1430 and Promotional Agent 1440, as shown in FIGS. 17-18.

In some existing systems, a manager of mobile commercial transactions needs to get an authorization from the Carrier Network which provides the actual network services, from another Carrier Network which manages the account of the subscriber who initiated the purchase, from the Vendor, who is offering the product for sale, and the involved SMS Aggregator. Getting the authorization of the purchase from all these parties may pose considerable challenges.

In some implementation of the MAN service 1000 the authorization may be much simpler. (i) Since in the implementation of FIG. 15 the MAN service provider can offer its service in parallel to the SMS Aggregator, the authorization of the SMS Aggregator may not be needed. (ii) Second, the subscriber may set up an account with the MAN service provider itself, and thus there may be no need to reach out to the Carrier Network supervising the account of the subscriber to get another authorization. (iii) As mentioned above, from a regulatory point of view it is increasingly difficult to charge users for SMS messages. Implementations of the MAN service can overcome this regulatory problem by using the SMTP protocol instead of the SMS protocol, for which no such regulations exist at present. All in all, implementations of the present MAN service 1000 may not be burdened with Mobile Origination fees and time consuming billing authorizations, accelerating the performance of the service.

Agents of promotional campaigns often desire to track the addressee's response to the campaign. However, tracking systems face multiple challenges. Carrier Networks do not provide "guarantee of service", i.e. the delivery of SMS messages. Instead, today's standard is referred to as "best effort", i.e. the Carrier Network makes a reasonable effort to deliver the SMS, but not more. The challenges include the following. (i) If the driver's handset started to receive an SMS message, but then the car drives into a tunnel while receiving the SMS, the Carrier Network may not even know that the SMS was never properly delivered. (ii) Some Carrier Networks will retry sending an SMS if an initial attempt to deliver it failed. However, the eventually successful delivery may take place only hours later. Since many of the promotional offers are time sensitive, such delays reduce the value of the promotional service. E.g. letting a subscriber know at 9 pm that there were reduced price tickets available for an 8 pm show is of little value. (iii) The Promotional Agents also may desire to know that even if the SMS arrived properly, did the subscriber actually request, or pull, the more detailed information. An Agent can be keenly interested to know what percent of targeted users actually pull the more detailed information, such as the photos of the new, deep-dish Domino's pizza, offered at reduced rates. (iv) The Promotional Agents also may desire to know that of those subscribers, who pulled more extensive MMM promotional information, which did place an order, such as actually buy the tickets for a show after having viewed a trailer.

Implementations include a logger application 1600, which can carry out one or more of the above reporting functions. The logger application 1600 may be deployed dominantly or exclusively on the handsets. Other embodiments of the logger 1600 may cooperate more extensively with supervisory applications sitting on the servers of the MAN service provider. In most embodiments, the MAN servers can summarize the reports coming in from the large number of logger applications, reporting the operations of the individual handsets. These MAN servers can perform a large variety of post-processing, collating, tabulating and analyzing the reports. Eventually, the MAN servers can communicate these metrics, i.e. the summary and analysis of the reports to the Promotional Agents 1440, such as the Alert Area Vendors 1442. These metrics can also be used in setting prices, revenue-splitting percentages in future contracts, and the share of Carriers etc.

Figure 21:
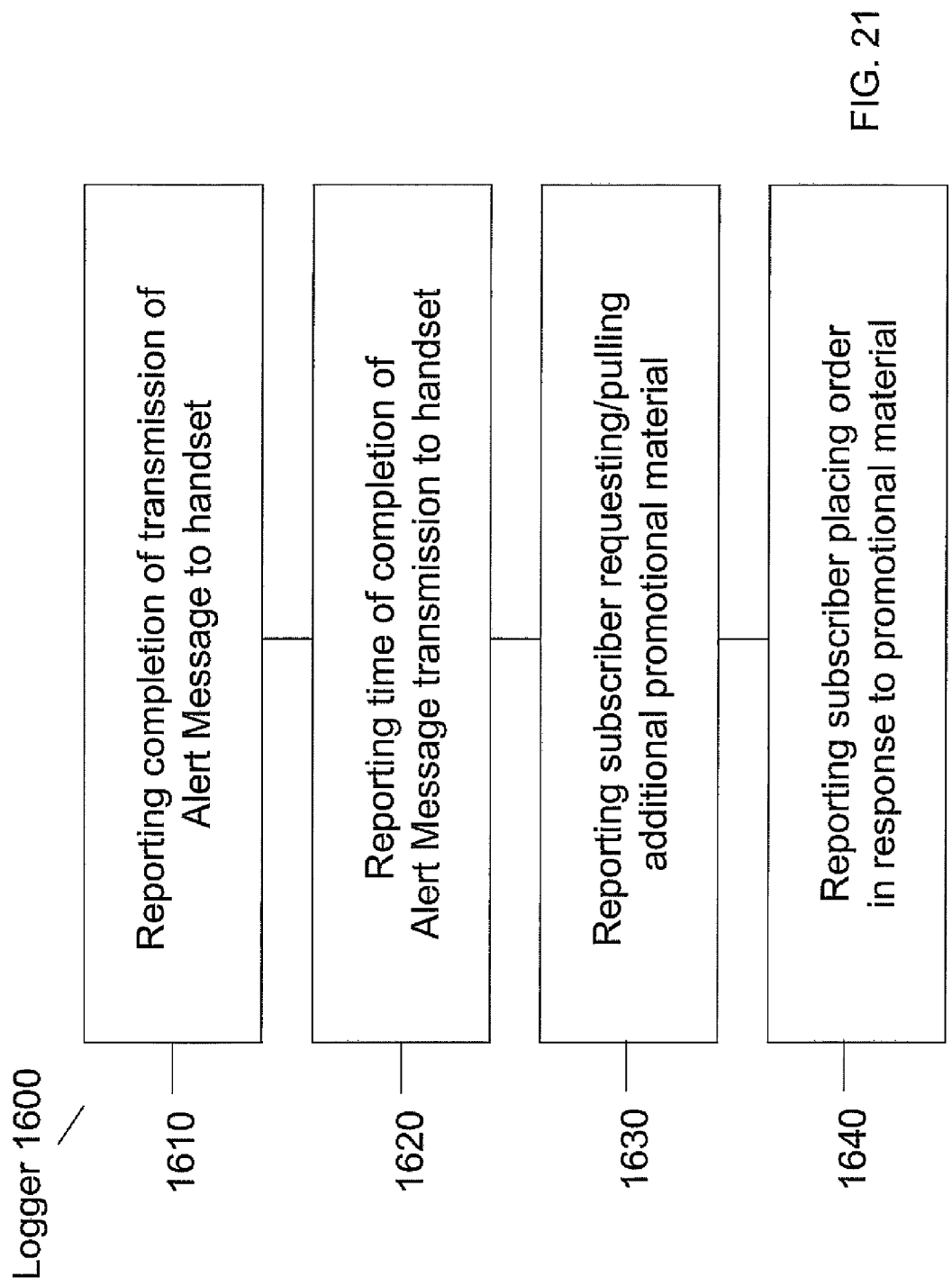
FIG. 21 illustrates a Logger 1600.

FIG. 21 illustrates that step 1610 of the Logger 1600 may record and report that the transmission of the Alert Message has been completed.

Step 1620 may include the Logger 1600 recording and reporting the time when the transmission of the Alert Message was completed.

Step 1630 may include the Logger 1600 recording and reporting that, in response to the Alert Message offering additional promotional material, the subscriber actually requested, or pulled the available promotional material.

Step 1640 may include the Logger 1600 recording and reporting that the subscriber placed an actual order in response to the promotional message.

In various embodiments different billing steps may be associated with the different reports of the Logger 1600. E.g. a Promotion Agent may be billed an increasing fee depending on whether the report regarding steps 1610-1640 was positive. In some implementations a base fee can be billed if only the Alert Message was transmitted, a higher fee if it was transmitted on time, an even higher fee if the subscriber pulled the additional information, and a premium fee, if the subscriber actually placed an order.

The Logger 1600 application can contain monitoring components to carry out these steps on board the handset. The monitored events can then be recorded either on board of the handset, or reported back to the servers of the MAN service, which record them. The reporting can be done either immediately or after some collecting and buffering. Different embodiments have different portions of the Logger applications deployed on board and in a centralized manner.

Figure 22:
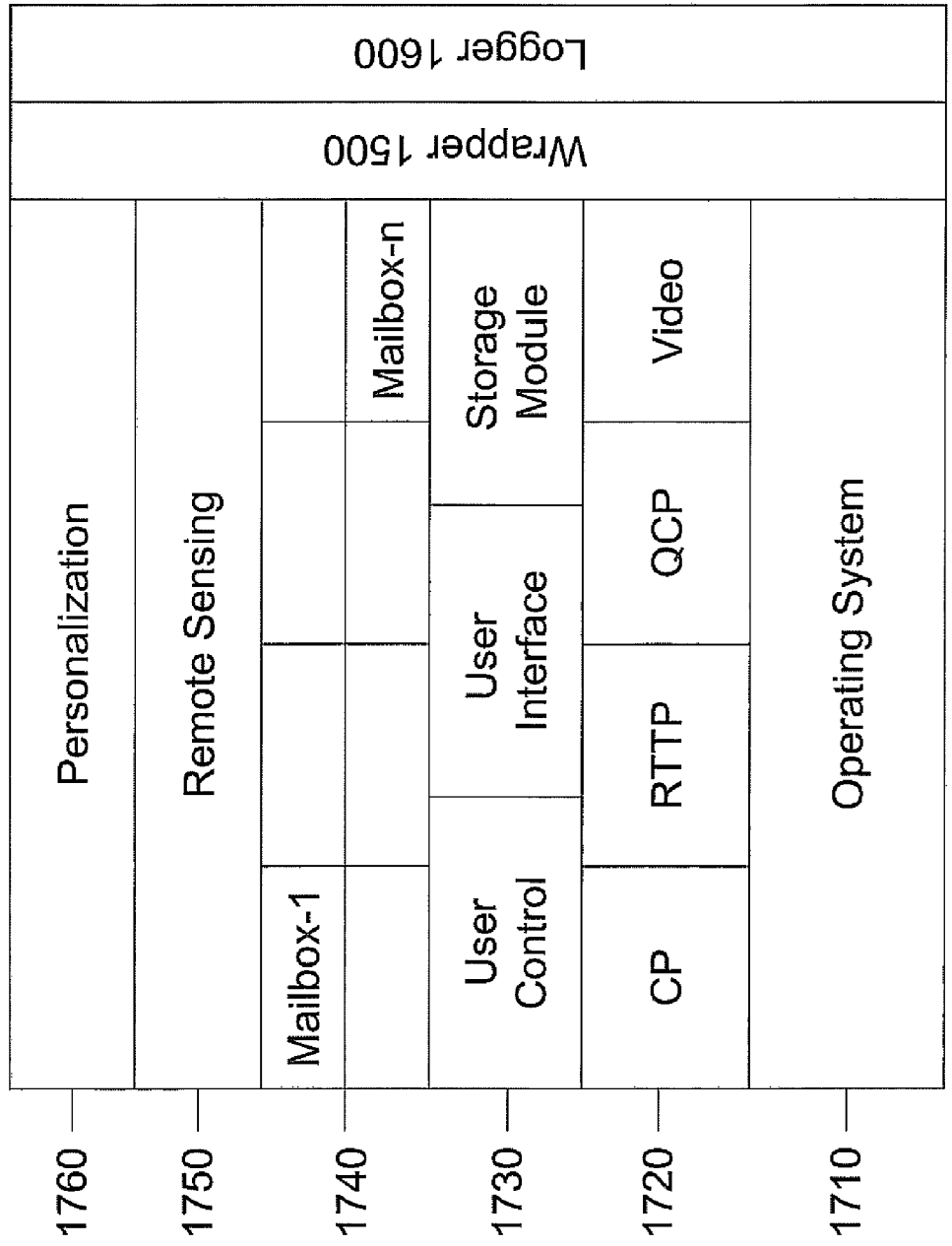
FIG. 22 illustrates an Alert Client 1700.

FIG. 22 illustrates a specific Alert Client 1700 including various modules as an example of Alert Client 1460.

An Alert Client 1700 may include an Operating System 1710, underlying most of its specific operations.

There can be numerous specific applications 1720 deployed over the Operating System 1710. Such applications were discussed in relation to FIG. 20, and may include: a Communication Protocol (CP), a Real Time Text Protocol (RTTP), a QCP for the ring tones, various Video players, among others.

Various controls and interfaces can be on board as well. These controls 1730 may include User Controls, e.g. mapping keys to request functions: such as promoting a key to a hot key linking it to a website to request MMM related to the promotions. A Storage Module may be present e.g. to store promotional materials, such as a downloaded barcode. Such storage modules may have a rolling erase function. Finally, a User Interface may facilitate e.g. the display of the downloaded bar code for swiping fore redemption.

Mailbox Module 1740 and its various functions have been described earlier. In various configurations the Mailbox Module 1740 can be part of the Wrapper 1500, as described earlier.

The Remote Sensing module 1750 offers numerous options. These include the provider of the MAN service 1000 being able to sense remotely the applications and modules on board and initiate their updating, if necessary. Such an updating may be performed on a module-by-module basis. The Remote Sensing Module 1750 may cooperate with the Wrapper 1500. Both of these modules may profile the handset, report the result of the profiling and take action, such as updating modules on board. Some of their functions can be different though. The Remote Sensing Module 1750 can be activated and controlled primarily from outside, such as under the control of the MAN service provider. For this reason, some subscribers may be reluctant to authorize such an expressly remote controlled Sensing Module. In contrast, the Wrapper 1500 may be a more sovereign module. When the subscriber wishes to download an MMM, the Wrapper 1500 may, on its own, review the level of updates, necessary for displaying the MMM, compare this level to the level available on board, and initiate the necessary module updates. These steps are performed by the Wrapper 1500 on its own control, without centralized commands.

Some Alert Clients 1700 may have room for personalized modules 1760 as well.

As described earlier, some or all of these modules 1710-1760 may be accessible to or even integrated with the Wrapper 1500 and Logger 1600 Modules. The Wrapper 1500 may perform the just described updating and managing functions on any of the modules. It can also impact or even override the applications which manage the SMS queues, such as the RTTP module, as described above.

The Logger 1600 may report to central MAN servers on the actions of any of the modules, e.g. in relation to a promotional message or commercial transaction. In an example, the Logger 1600 may record and report the actions of the SMS manager whether the reception of an Alert Message was properly completed. Or, the Logger 1600 may record and report whether the user engaged the User Interface to pull/request the additional promotional material. Or, the Logger may record and report whether the user actually purchased a promotional barcode and stored it in the Promotion Storage module.

Some of the above implementations described the handset side of the overall implementations.

Implementations of the MAN service 1000 also include web-based interfaces or platforms for the Promotional Agents 1440. Such an interface may offer a wide variety of choices for a Promotional Agent 1440, such as an Alert Area Vendor 1442.

FIG. 23 illustrates such a web-based Campaign Interface 1800. A Participating Vendor may use such a Campaign Interface 1800 to publish various campaign items.

In module 1810 the Participating Vendor may specify the Type of Alert Messages he/she wishes to associate his/her promotions. In an example, an indoor skydiving venture along highway 80 may want to broadcast promotional offers in case of a traffic jam occurring between exits 35 and 40. Or a sports-equipment manufacturer may want to broadcast a promotional offer whenever the ballgame comes to a close at the nearby ballpark.

Since different Alert Information come from different Alert Information Services 1410, the MAN service 1000 can act as a middle-man to facilitate a contract between the Participating Vendor and the Alert Information Services 1410.

In module 1820 the details of the Promotional Offer may be specified, such as the percent reduction in price of sports memorabilia after a lost game, or a barcode or coupon to be downloaded for a show in a nearby theatre, etc.

In module 1830 the Participating Vendor may specify the location aspects of the Promotional Offer, such as the location of the store to go to, the location of the theatre of the show, etc.

In module 1840 the Participating Vendor may specify other logistics of the campaign, such as the duration of the Offer. Examples include until the traffic jam lasts, until the last ticket of the theatre show is sold, etc.

In module 1850 the Billing Arrangements are worked out, possibly in an interactive manner. The Participating Vendor may publish the desired campaign items 1810-1840 on the Campaign Interface 1800. In response, the MAN service provider may relay to the Participating Vendor that e.g. the Traffic Alert Information Service Sky Platform 1412 is willing to provide the requested traffic alert information for a 30% split on all associated revenues in the requested stretch of exits 35-40, or for a fixed fee per Alert Message. Or that the local sports channel is only willing to provide Sports Alert Information Services for a Participating Sports Bar owner at a premium because the stadium did not fill up yet, etc. The MAN service provider also may report what cut the Carrier Network is asking. In response, the Participating Vendor may change some of the campaign items, such as the duration of the campaign, in order to publish a final campaign within its target budget.

The Reporting Module 1866 can provide feedback to the Vendor how the campaign is going. The Reporting Module 1860 can have graphics and statistical displays about the number of users who were reached by the Alert Message, the number of people who requested additional promotional material, and the number of people who actually realized a commercial transaction. This information is primarily assembled by the MAN service center from the reports of the individual Loggers 1600.

All of the above functions can be facilitated and managed by the MAN System Manager 1900, deployed on MAN servers.

Figure 24:
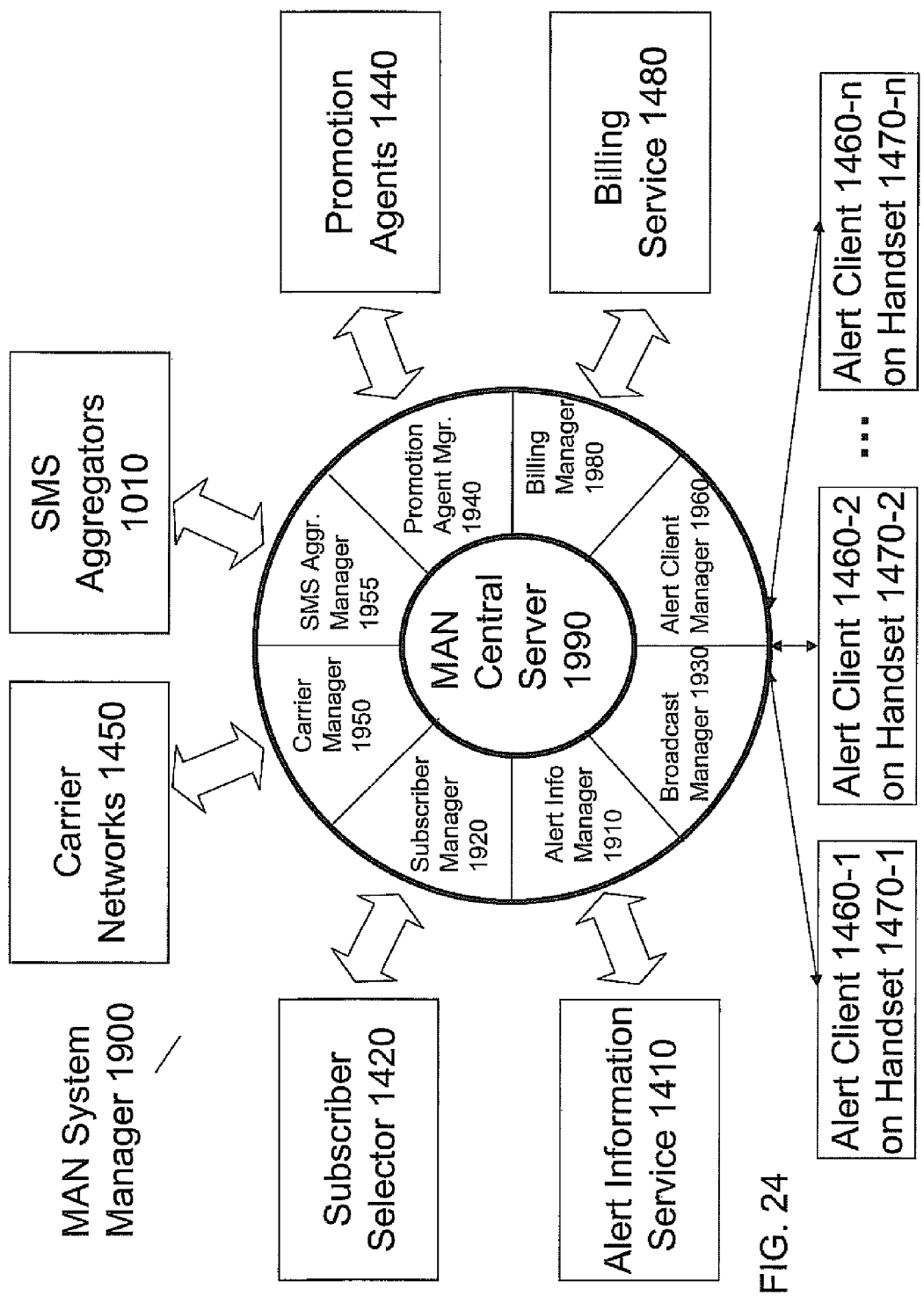
FIG. 24 illustrates a MAN System Manager 1900.

FIG. 24 illustrates that the MAN System Manager 1900 may include the following Managers:
- Alert Information Manager 1910,
- Subscriber Manager 1920,
- Broadcast Manager 1930,
- Promotion Agent Manager 1940,
- Carrier Manager 1950,
- SMS Aggregator Manager 1955,
- Alert Client Manager 1960, and
- Billing Manager 1980.

These MAN Managers 1910-1980 of the MAN System Manager 1900 can be deployed in Central Servers 1990 of the MAN System 1400. In some cases there is a single MAN Central Server 1990, in others a hierarchical or flat network of MAN Central Servers 1990-1 . . . n.

One of the functions of the MAN System Manager 1900 is to facilitate, oversee and manage the operations of the corresponding modules of the MAN System 1400, as described in FIGS. 14-23. As such, the functions and the operation of the MAN Managers 1910-1980 can be well understood from the description of the operation of the earlier-described corresponding MAN System Modules 1410-1480, in relation to FIGS. 14-23. Therefore, the above functions and operations of the modules will not be repeated here. Instead, an example will be given to illustrate the cooperation of the central MAN Managers 1910-1980 with the MAN System Modules 1410-1480, Clients, Applications and Interfaces of the MAN system.

For example, Alert Client Manager 1960 can be configured to communicate with the Alert Clients 1460-1 . . . n on board of the handsets 1470-1 . . . n. Also, the Alert Client Manager 1960 can work together with the individual Wrappers 1500-1 . . . n on board of the handsets 1470-1 . . . n to carry out their functions. These functions were described in relation to FIGS. 19-22 and include Managing Alert Messages, Managing Mailboxes, Managing On-board Application, Managing Subscriptions, Managing Storage and Personalization.

For example, the Wrapper 1500 on handset 1470-42 may profile its host handset 1470-42, and recognize that the RTTP has on old version on board. Then Wrapper 1500-42 may communicate with the Alert Client Manager 1960 to request a new version of RTTP. The Alert Client Manager 1960 may reach out and acquire the latest version of the RTTP, communicate with Wrapper 1500-42 and these two modules may cooperate to download the new version of the RTTP on the handset 1470-42.

The Alert Client Manager 1960 may also cooperate with the individual Loggers 1600-1 . . . n on board. This cooperation can include receiving and recording the reports from the Loggers 1600-1 . . . n from the handsets, including the successful completion of the reception of the Alert Messages, the subsequent pulling of promotional messages, and the completion of actual commercial transactions. The Alert Client Manager 1960 may collect these reports from the individual Loggers 1600-1 . . . n, collect, archive, process, organize, and analyze them. The result of such an analysis can be conveyed e.g. to the Promotional Agents 1440, e.g. through the Campaign Interfaces 1800.

These were only examples, to illustrate the possible cooperation between the MAN Managers 1910-1980 with the individual MAN System Modules 1410-1480. In a particular embodiment, various elements may not be installed, or may be connected differently.

Finally, a Sensor Array-based Mobile Broadcast Alert (SAMBA) service 2000 and corresponding SAMBA system 2400 will be described.

Figure 25:
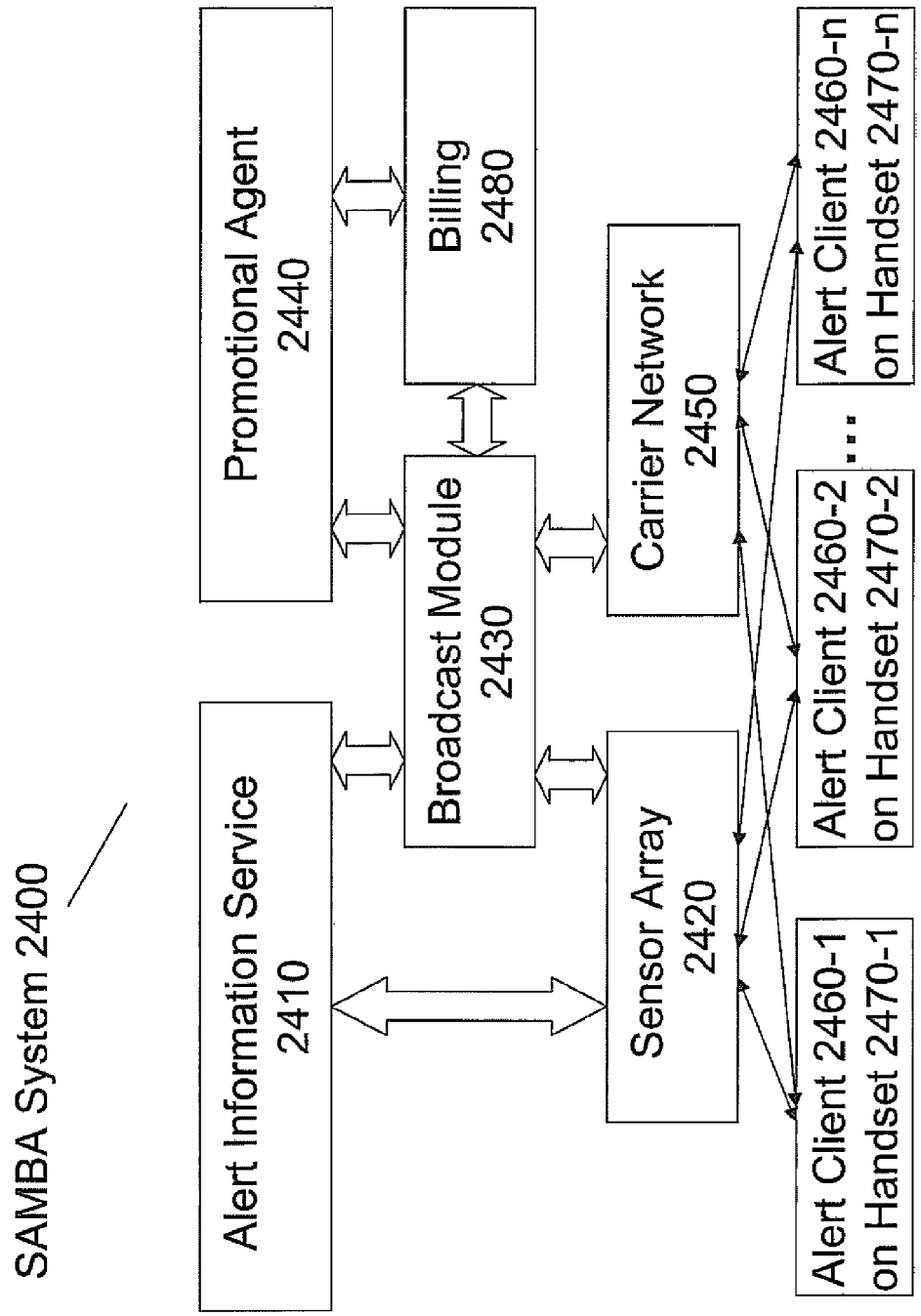
FIG. 25 illustrates a SAMBA system 2400.

FIG. 25 illustrates that the SAMBA system 2400 has many components which are analogous to those of the MAN System 1400 of FIG. 17. The SAMBA System Modules 2410-2480, which are analogously numbered as the MAN System Modules 1410-1480 of FIG. 17, have analogous functions and will not be described again. Blocks and modules, which were described in FIGS. 14-24 as analogous to those in FIG. 17 are also within the scope of the equivalently numbered SAMBA System Modules 2410-2480.

Figure 26:
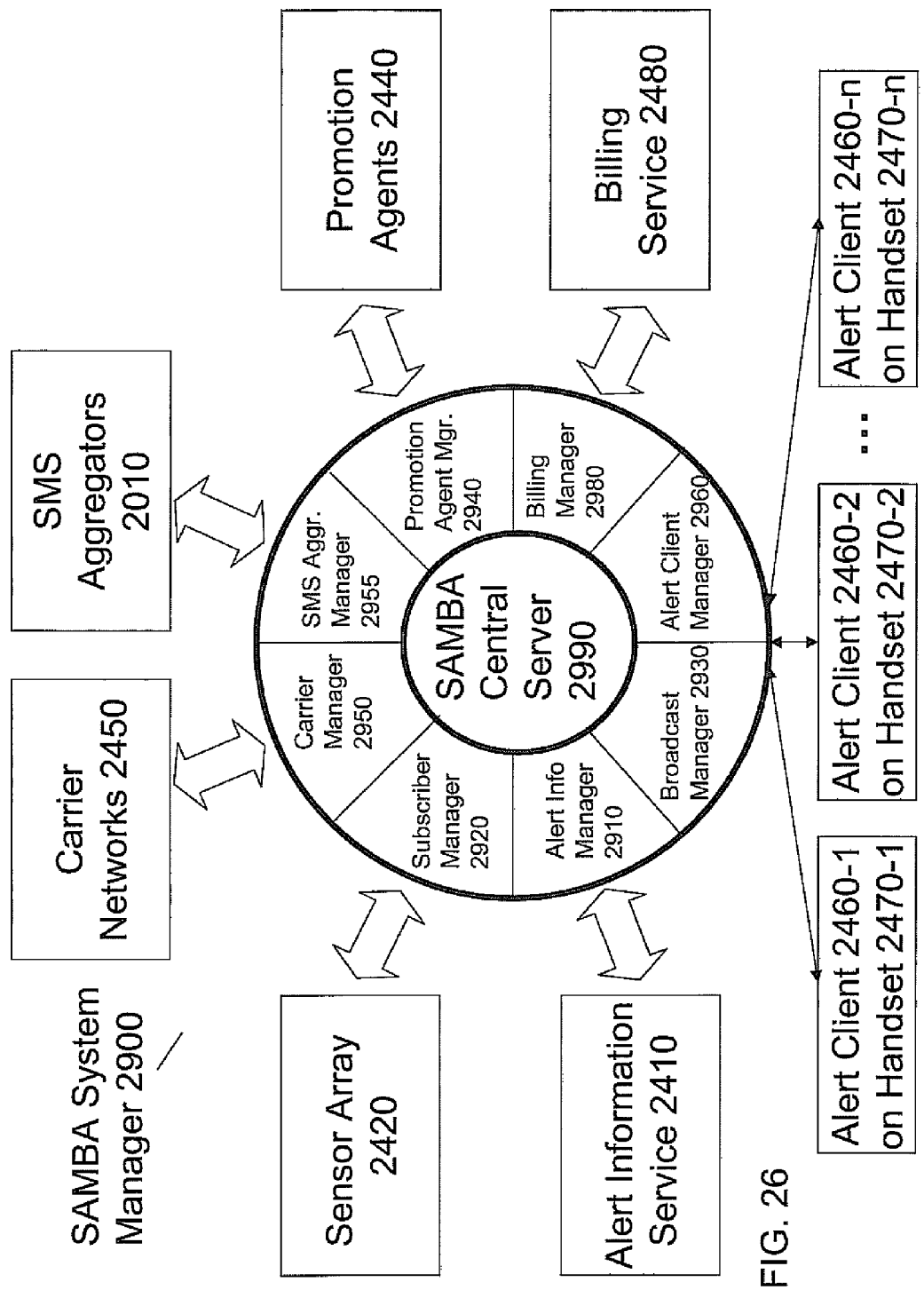
FIG. 26 illustrates a SAMBA System Manager 2900.

FIG. 26 illustrates that a SAMBA System Manager 2900 may include the following SAMBA Managers 2910-2980, deployed in a SAMBA Central Server 2990:
- Alert Information Manager 2910,
- Subscriber Manager 2920,
- Broadcast Manager 2930,
- Promotion Manager 2940,
- Carrier Manager 2950,
- SMS Aggregator Manager 2955,
- Alert Client Manager 2960, and
- Billing Manager 2980.

The functions of the SAMBA Managers 2910-2980 are analogous to those of the MAN Managers 1910-1980, described in relation to FIGS. 14-24 and will not be repeated here.

Some of the differences from the MAN system 1400 include that the SAMBA System 2400 may locate and select subscribers differently than Subscriber Selector module 1420 of the MAN system 1400. The location of the subscribers may not be determined by collecting Cell Tower data, as in some of the other implementations of the MAN System 1400.

Figure 27:
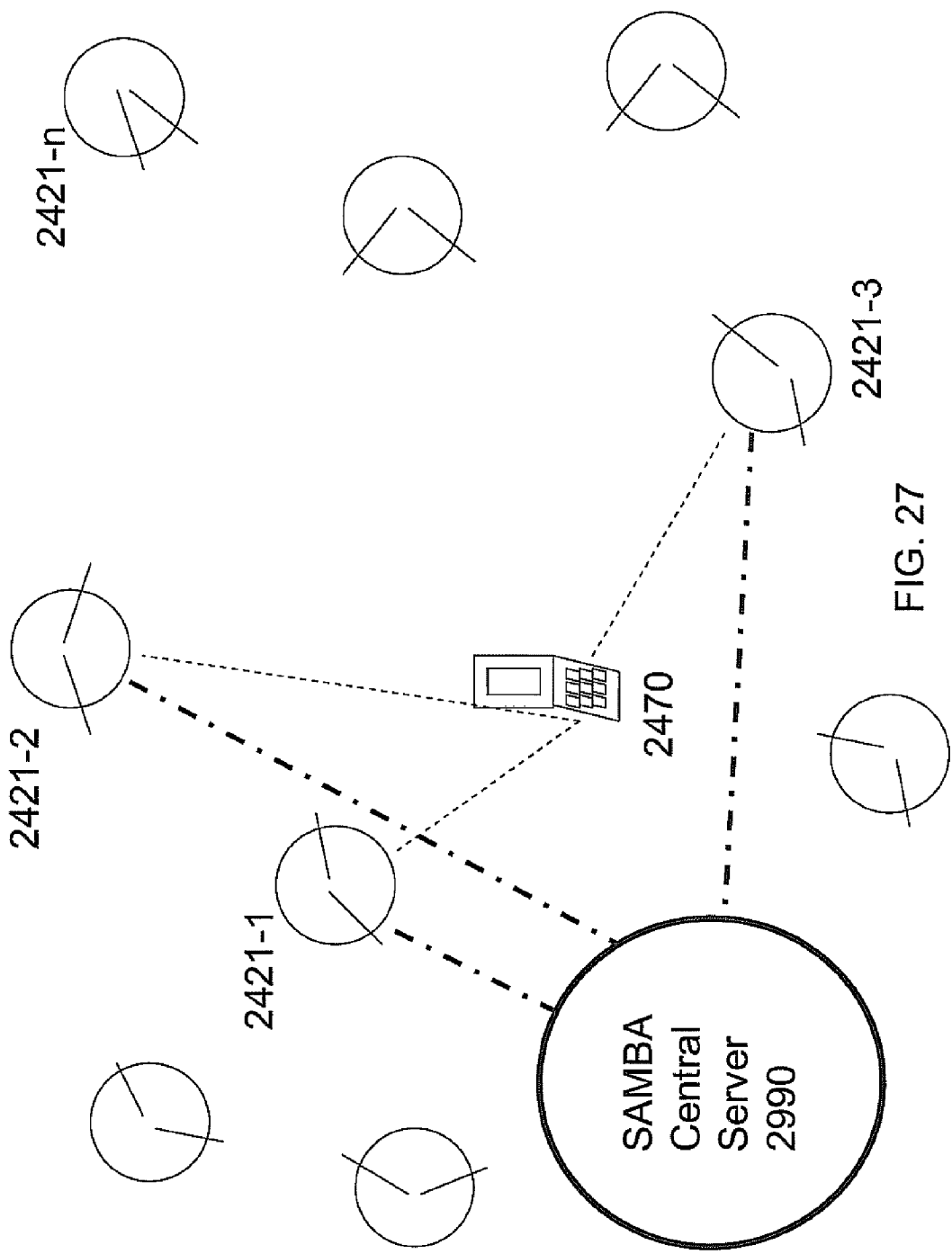
FIG. 27 illustrates a Sensor Array.

FIG. 27 illustrates that, instead of the subscriber selector 1420, the SAMBA System 2400 may acquire location information using a specialized Sensor Array 2420. The Sensor Array 2420 may contain a large number of sensors 2421-1 . . . n, whose functionalities include receiving broadcasts from cell phones and processing the received information. Such sensor arrays 2420 can be e.g. an array of the sensors manufactured by Air-Patrol Corp. The two rays on the individual sensors indicate the spatial angles or reception. These sensors, or antennae, can be configured to be able to receive signals from the full spatial angle, or from a limited spatial angle. They can be installed in areas of greater interest, which have a higher density of subscribers. Areas of installments may include: major traffic intersections, commuting routes leading in and out from metropolitan centers which are known to develop traffic jams and other problems, high density entertainment areas, such as Disneyland, the Strip in Las Vegas, the highway section at the Nevada state border line, where gaming becomes legal for drivers, the main floor of gaming operations, the theatre district in New York, the vicinity of sports venues, all kinds of educational settings such as college campuses, and airports, among others. Of course, implementations can include any other areas of interest, e.g. corporate environments, high security environments, and federal environments.

Figure 28:
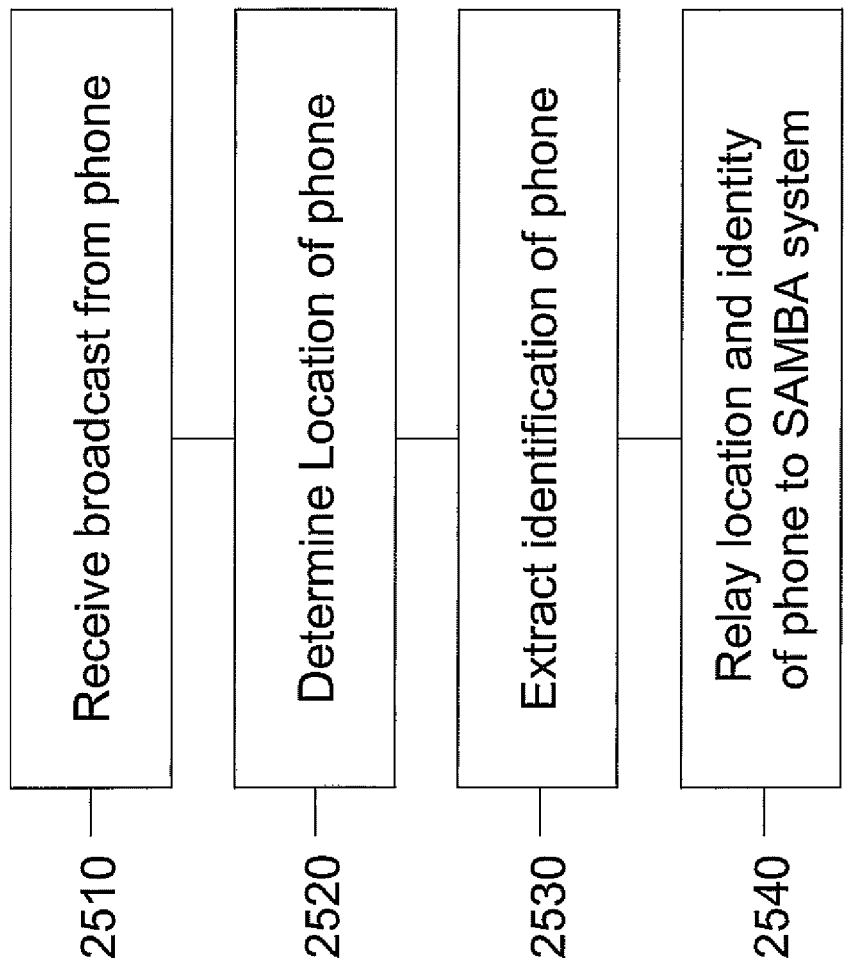
FIG. 28 illustrates a Sensor Array Operation 2500.

FIG. 28 illustrates a Sensor Array Operation 2500.

In step 2510 one or more sensors 2421 can receive a signal of a subscriber mobile phone 2470. The scope of the term "signal" is used very broadly here. It can involve signals of any sorts. Embodiments include signals associated with the phone managing an active phone call, or a data session, or processing SMS traffic. Or the signal can be an induced signal, in response to a ping or tic-tac from an outside source. The signal may even be generated when the phone is in a passive state.

In step 2520 several of the 2421 sensors can cooperate to determine the physical location of the broadcasting phone from the received signal. There are numerous ways to determine the location of the phone based on phone signals, including triangulation, GPS based methods, and more sophisticated techniques. Triangulation can be carried out by applying well known formulae based on wave propagation theory and geometrical relations, applied to the signals received by tree sensors. The spatial resolution of a Sensor or Antenna Array manufactured by the Air Patrol Corp. can be of the order of one or few feet.

The embodiments are described here in terms of cell phones. However, the scope of the embodiments is meant to be very general, as explained earlier. The mobile communication device, or handset 1470 or 2470, can be any known mobile communication device, including a mobile telephone, a mobile computer, any communication device capable of sending a wifi or wimax signal, or any combination of these devices, e.g. a computer equipped with any sort of device making it capable of communicating over any wifi, wimax or other wireless network. It can be any device configured to emit a self-identifying signal. In general, any electronic device configured to operate in conjunction with any kind of mobile communication networks is within the scope of the term "handset", "cell phone", or "mobile communication device".

In step 2530 the identity of the cell phone and the corresponding user is established. This step may require coopera-tion between the Sensor Array 2420 and the SAMBA Central Servers 2990 and will be described in detail in relation to FIG. 29.

In step 2540 the established location and the identity of the cell phone is forwarded to the SAMBA Central Servers 2990. This location and identity information can be used by the SAMBA Central Servers 2990 in a manner analogous to the MAN Central Servers 1990.

Figure 29:
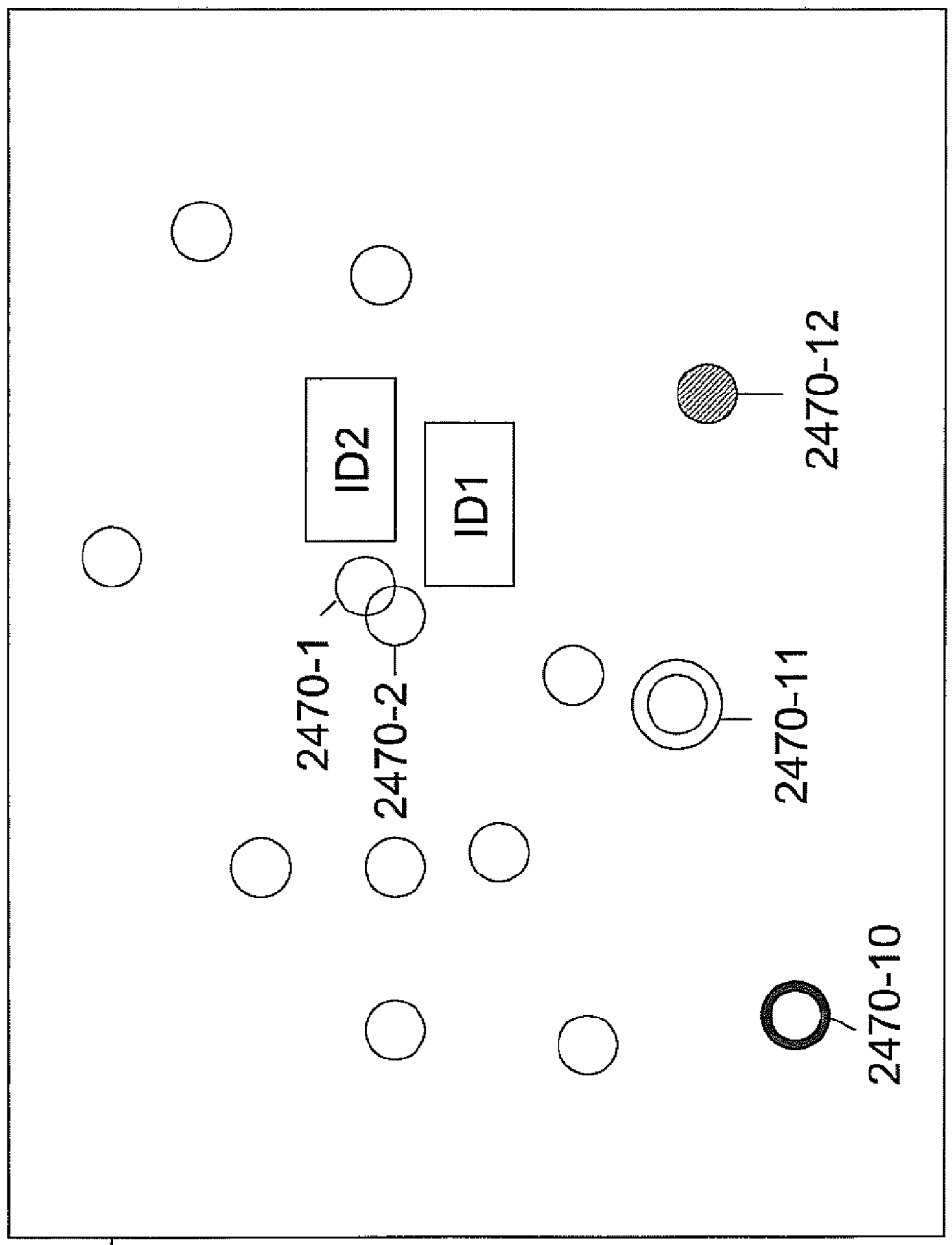
FIG. 29 illustrates a SAMBA Operation Display 2600.

FIG. 29 illustrates a SAMBA Operation Display 2600. The circles represent the locations of individual mobile phones or any other mobile communication devices within a space of operation of the SAMBA System 2400, such as an entertainment venue, a convention center, or a traffic related space, such as an area of a downtown or a busy traffic intersection. Cell phones broadcast their identification information in regular intervals to signal their locations to nearby Cell Towers and to register with these Cell Towers to receive service. In some cases the regular intervals can be in the range of a few seconds to 90 seconds. The sensors 2421 use these cell phone signals to determine the location of the broadcasting cell phone e.g. by triangulation.

In these broadcasts the cell phones relay some of their identification information, so that the Carrier Networks can locate them when an incoming call is trying to reach the phone. This identification information may include the mobile ID, the International Mobile Equipment Identity (IMEI), or any other handset identification information, such as an IMSI or MIN. In some cases this identification information can be a GPS information, which can then be used to establish the MIN mobile Identification Number of the phone number of the handset. In some cases the identification information can be any combination of the above.

In principle the triangulation or GPS information can determine the precise location of the cell phone and the broadcast identification information can determine the identity of the cell phone and its user. This information should be sufficient for the operation of the rest of the SAMBA system 2400, such as sending out Alert Messages and promotions to the SAMBA subscribers among the localized and identified users.

For example, in a gaming application, a Sensor Array 2420 can be implemented in a gaming establishment, such as a casino. Patrons may be approached to subscribe e.g. when entering a gaming venue. Once subscribed, the subscribers can be sent an Alert Message that a blackjack table at a specified location became hot or more active, or a betting limit has been raised at blackjack tables in another area of the gaming floor.

In an educational application, a Sensor Array 2420 can be set up on a college campus. The Sensor Array 2420 can track students on campus. Students can subscribe to different services, such as sports event related services, education related services etc. Alert messages can be sent to students who signed up for sport-related services, if there is e.g. a traffic jam around the football stadium. Or an alert message can be sent to students who enrolled in a class in case the class is cancelled, or the field trip starts in a different location. An emergency alert message can be sent to all students if a criminal or violent activity took place on campus, advising the students of unsafe areas, or relaying police instructions.

In yet other implementations, a Sensor Array 2420 may track cell phones without ever decrypting their identification information, only determining their location. Such implementations may be used to track movement of cell phones only. In traffic implementations embodiments may be used to determine only the speed of movement of the phones in an effort to identify traffic jams. In entertainment implementations such embodiments may be used to determine crowd movement patterns, e.g. to map out under-visited areas on a casino floor. In these implementations the identity of the users is never determined, they remain anonymous.

The identification of the users may pose challenges as well. The SAMBA system 2400 may be deployed in settings where the density of the subscribers is high. If two cell phone users walk near each other, close to the resolution limit of the Sensor Array 2420, and the Sensor Array 2420 receives broadcast from both of them, the Sensor Array 2420 may determine the location of two cell phones nearby each other and determine the identity of two cell phones broadcasting from this area, but may incorrectly assign the identities to the two cell phones.

FIG. 29 illustrates a SAMBA Operation Display 2600 of the Sensor Array 2420 displaying the above problem. The SAMBA Operation Display 2600 shows the described situation, when two cell phones 2470-1 and 2470-2 are very close to each other physically. The Sensor Array 2420 may receive their broadcast and extract the two broadcast identification numbers, such as the IMEI, IMSI, MIN or other handset identification information.

However, it remains a challenge to identify which IMEI, IMSI, MIN or other handset identification information belongs to which phone. This problem can be exacerbated by the various system delays, which may introduce as much as 4-5 seconds of delay into the processing of the IMEI, IMSI, MIN or other handset identification information, by which time the patrons and their handsets may have moved a considerable distance from the location determined by the Sensor Array 2420. To address these challenges, some implementations of the SAMBA system 2400 include verification cycles to determine the proper identification.

Figure 30:
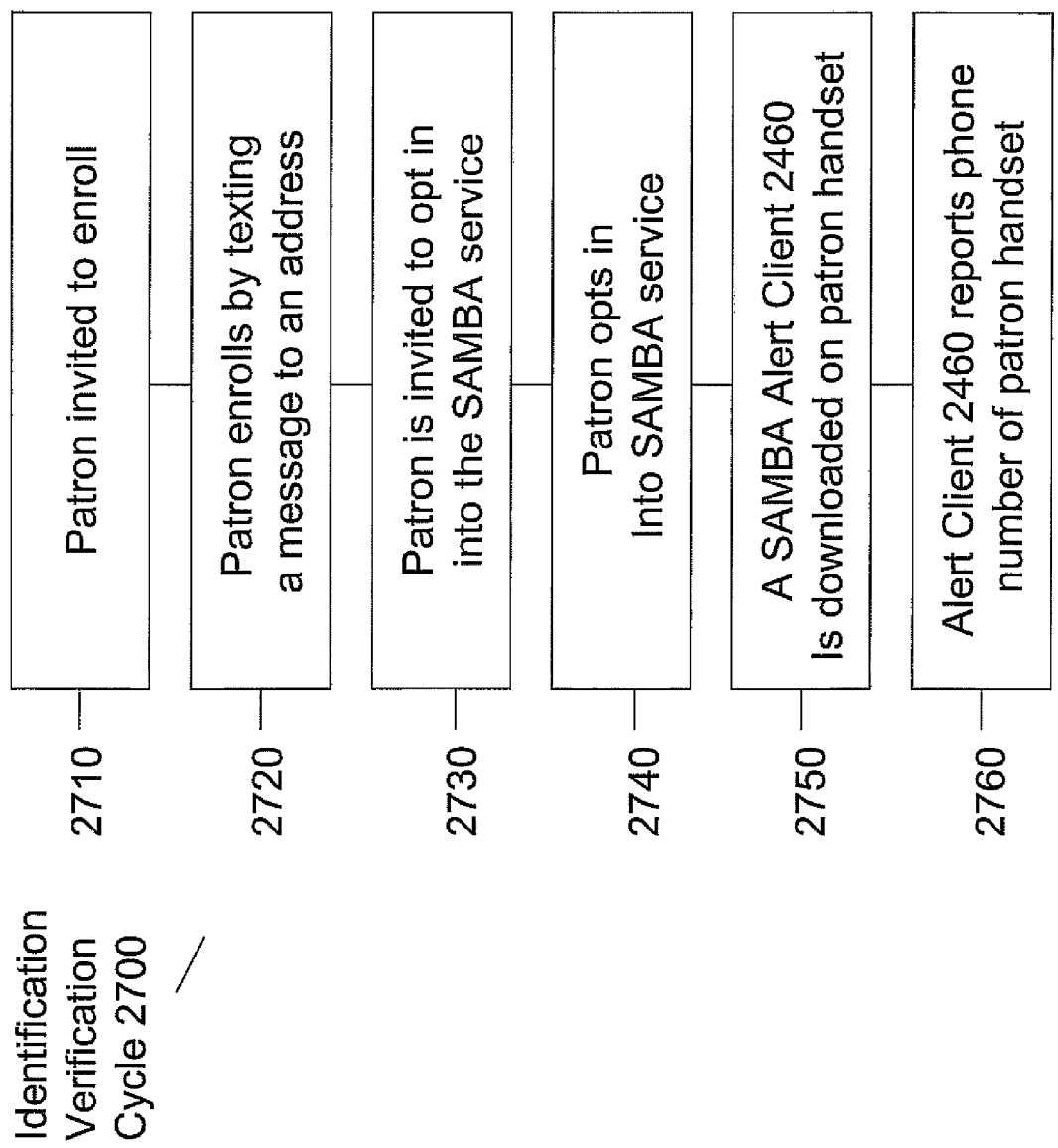
FIG. 30 illustrates an Identification and Verification Cycle 2700.

FIG. 30 illustrates an embodiment of an Identification-Verification Cycle 2700.

In step 2710 new patrons can be given invitations to subscribe/enroll to the SAMBA Service 2000, in exchange of receiving some enticements, such as a certain amount of free service. This invitation may be offered at a controlled location, such as the entrance of a gaming floor. The subscription/enrollment may require sending a text/SMS message to an address. Text/SMS messages include the IMEI, IMSI, MIN or other handset identification information of the sending phone.

In step 2720 the patron can enroll into the SAMBA Service 2000 by texting a message. The Sensor Array 2420 can pick up this message and extract the IMEI, IMSI, MIN or other handset identification information of the enrolling patron.

In step 2730, in response to the text message, the patron may be informed about the details of the SAMBA Service 2000, which lists its advantages as well as informs the patron about the tracking/locating aspect of the service. The patron maybe invited to opt in into the SAMBA Service 2000, having been informed about these tracking features.

In step 2740, the patron may opt in into the SAMBA Service 2000, e.g. by texting "yes" to the previous address.

In step 2750 an Alert Client 2460 may be downloaded onto the patron's handset. There are numerous ways to download a client, e.g. by making a key hot. The patron pressing the hot key can initiate the download without elaborate actions by the patron.

In step 2760 the Alert Client 2460 may report to the SAMBA servers 2990 the phone number or any other identification information of the patron.

In other embodiments of the Identification-Verification cycle 2700 "tic-tac"-ing can be used as well, which can involve interrupting and restarting the various communication channels to the handsets. When the cell phone attempts to restart various connections and reopen the communication channels, such as internet based connections, it repeatedly broadcasts its IMEI, IMSI, MIN or other handset identification information and/or phone number. These broadcasts can be used to verify the identification information.

During these Identification and Verification Cycles 2700 the IMEI, IMSI, MIN or other handset identification information and phone number maybe transmitted more than once. The steps after the first receipt of the phone numbers serve as verification cycles. This aspect may serve as a safeguard that indeed that patron gets enrolled who opted into the SAMBA service 2000 and not a person nearby who is not interested in benefiting from the SAMBA service 2000.

The phone numbers and IMEI, IMSI, MIN or other handset identification information can be used to develop a database regarding the patrons. Cross-linking the location and identity of the patrons, and recording their movement and commercial activities is of interest to Promotion Agents, and can be the basis of extending the above described MAN and SAMBA services to offer more specific offers to subscribers, where the Promotion Agents may expect a higher level of interest from the subscriber. These analogous and equivalent services are all within the scope of the present application.

Returning to FIG. 29, in some embodiments of the SAMBA Operation Display 2600, different classes or groups of users can be indicated by different symbols, such as symbols with different size, color or other identifier. Handsets 2470-10, -11, -12 illustrate examples of such different symbols. These symbols can correspond to a wide range of customer identifiers. Possible identifiers include any kind of demographic data or data about the purchasing habits of the user. In a gaming implementation these identifiers may reflect the playing habits or playing levels of the user, such as whether he/she is a high roller.

The SAMBA Central Server 2990 may use any kind of data bases to associate these data with the identified users in the described graphic manner. In other embodiments, actual letters, labels or texts can be displayed associated with the symbols. All of these implementations may assist a Promotion Agent 1440 or 2440 to efficiently use the campaign interface 1800 to push out advertisements to the appropriate users which is of high interest for them. Such implementations increase the likelihood of the targeted subscriber initiating a commercial transaction based on the Alert Message or Offer.

In a gaming implementation, the identification-verification cycle 2700 may identify subscribers of the SAMBA service 2000. Then the SAMBA Central Server 2990 may use a data base to identify high rollers among the subscribers. The SAMBA Operation Display 2600 may indicate regular players with a blue symbol and high rollers with a red symbol. A Promotion Agent 2440 may then choose to broadcast different promotion offers to regular players and to high rollers. E.g. the Promotion Agent 2440 may broadcast only to high rollers that a new set of tables have been opened up only for high rollers in a VIP area of a gaming floor.

In an educational implementation students enrolled in different classes may be indicated by different color symbols. In an example, a Promotion Agent 2440 may send out an offer regarding a software update only to students who are enrolled in computer science classes.

In a further aspect, various mobile services may need to utilize confidential information regarding the users of the mobile service. Examples include users of the Passive Alert System 100, the MAN system 1000, or the SAMBA system 2000, which require knowledge of the location of the service user with some precision. Since the location of a user can be used by other parties not necessarily to the advantage of the user, keeping the location of the user confidential can be a feature users expect or require from such Mobile Alerting Services.

Other examples include mobile financial mobile services, where the owners of confidential information may be unwilling to release confidential information without assurances that the records will be treated as confidential, or without verifying that the requesting party has authority to access these records. Examples include a financial institution not willing to release financial information, such as the stocks held by a user, to a mobile financial alerting service.

In response to such needs, some embodiments may incorporate a confidentiality function. These systems can be referred to as neutral party systems, third party systems, "Switzerland" systems, or Mobile Subscriber Detection Authorization and Verification System (MSDAVS) systems 3000.

Figure 31:
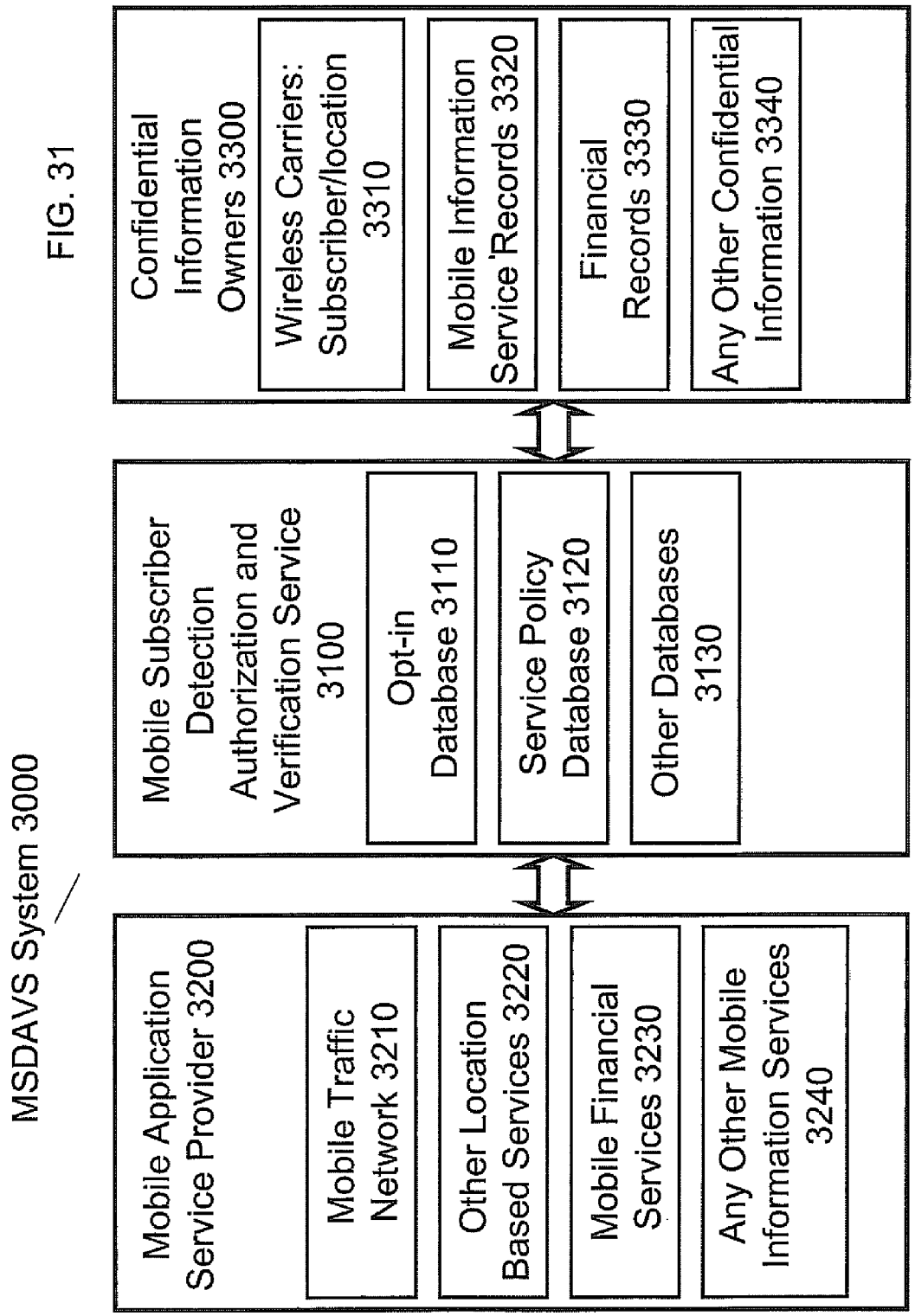
FIG. 31 illustrates a MSDAVS system.

FIG. 31 illustrates such a MSDAVS system 3000. When a mobile service user decides to opt-in to a mobile service, she/he can communicate this intention to a MSDAVS 3100 directly or with the assistance of a Mobile Application Service Provider (MASP) 3200. The MSDAVS 3100 may include an Opt-in Database 3110, a Service Policy Database 3120, and any other type of databases 3130. The mobile service user can provide an explicit permission for the MSDAVS 3100 to access confidential information from a Confidential Information Owner 3300 and can name a purpose for which the MSDAVS 3100 can use the accessed confidential information. Examples of the Confidential Information Owner 3300 can include a Wireless Carrier 3310, who can release the location or any other confidential information of a mobile phone user, or a Mobile Information Service Record Owner 3320, or a Financial Record Owner 3330, or an Owner of Any Other Confidential Information 3340.

The purpose of the release of the confidential information can include opting-in to the mobile service provided by the MASP 3200. For example, the Wireless Carrier 3310 can release the location of a subscriber to the MSDAVS 3100 for the specific purpose of participating in a location based service by a corresponding Mobile Traffic Network 3210, such as the passive alert service 100, the MAN service 1000 or the SAMBA service 2000.

Other types of Mobile Application Service Providers 3200 include Other Location Based Services 3220, Financial Services 3230, and any Other Mobile Information Services 3240.

Embodiments of the MSDAVS 3100 can enforce the permissions and authorizations of the mobile service user, and protect the confidential data in such a way that both the confidential information owners and the mobile service users are assured that no unauthorized access of the information will occur.

The MSDAVS 3100 can perform these confidentiality functions through user-friendly but secure means, such as through mobile communication devices, internet/web pages or other mechanisms. The MSDAVS 3100 can also provide similarly easy-to-use de-activation, or de-authorization mechanisms.

The MSDAVS 3100 can provide nearly real-time access to confidential subscriber information, as well as being scalable to a large number of subscribers of mobile services.

Figure 32A:
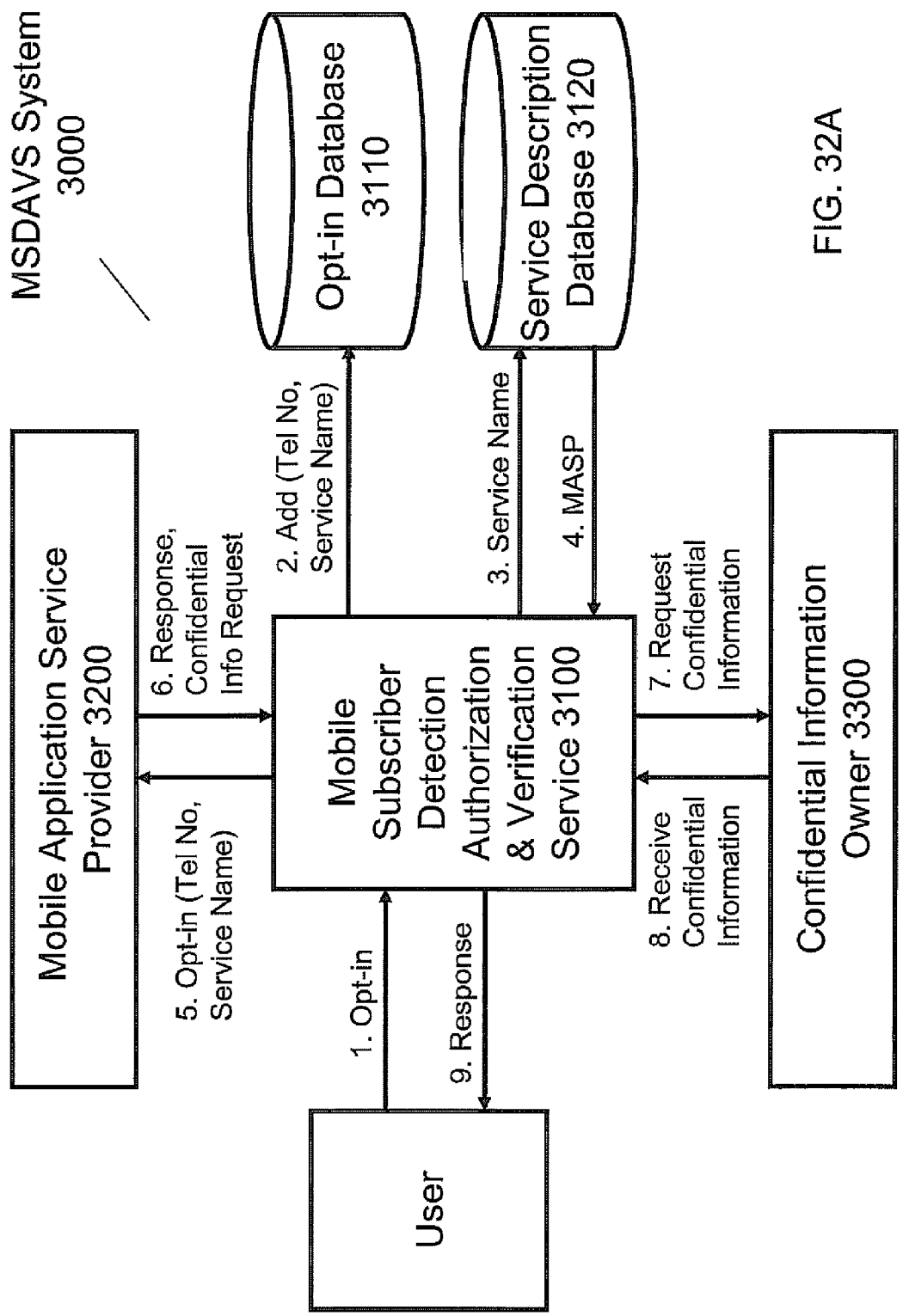
FIGS. 32A-B illustrate a MSDAVS system with different opt-in procedures.

FIG. 32A illustrates an implementation and the operation of the MSDAVS system 3000. Some implementations can be based on a hosted service that can be accessed via web services by Mobile Application Service Providers 3200. As mentioned above, the mobile service user can authorize the access of the confidential information directly through the MSDAVS 3100 or with the assistance of the MASP 3200.

The MASP 3200 can offer a potential user a mobile service and indicate that enrolling into the service is based on an opt-in procedure.

In step 32A-1, prompted by the offer, the potential user can send an opt-in authorization and possibly registration information to the MSDAVS 3100 via a text message, a web command or an interactive voice response, or IVR technology that allows a computer to detect voice and keypad inputs.

In step 32A-2 the MSDAVS 3100 can store the authorization and registration information, such as the telephone number and the name of the mobile service, in the Opt-in Database 3110.

In step 32A-3 the MSDAVS 3100 can communicate with its Service Description Database 3120 about which MAPS 3200 to interact with and notify about the opt-in and what type of authorization is required for this service.

In step 32A-4 the Service Description Database 3120 can respond by naming the appropriate MASP 3200 and the specifics of the mobile service, such as authorization levels.

In some cases, information regarding the MASP 3200 may be attached to the opt-in message, in which case steps 3 and 4 are not necessarily performed.

In step 32A-5 at least some of the opt-in and the registration information of the potential user can be transmitted to the MASP 3200.

In step 32A-6, the MASP 3200 can respond by a mobile service related message. This message can include an identification of a Confidential Information Owner 3300, and an identification of the confidential information requested, such as the location of the opted-in client, or a financial record of the opted-in client.

In step 32A-7 the MSDAVS 3100 can query the identified Confidential Information Owner 3300 about the requested confidential information, together with the authorization of the user and a "neutral party" certificate, to assure the Confidential Information Owner 3300 that the user's information will be handled confidentially and at the request of the user herself/himself.

In step 32A-8, the Confidential formation Owner 3300 may respond with the requested confidential information, possibly attaching or repeating the terms of use, or the expected level of confidentiality.

In step 32A-9 the MSDAVS 3100 can respond to the user reporting that the requested mobile service is available and a confidential handling of the corresponding confidential information has been set up by the Mobile Subscriber Detection Authorization and Verification System 3100. After these steps 32A 1-9 the user can start the regular use of the mobile service.

The opting-out process can be performed through analogous steps, except that it involves the removal of the registration information of the user from the Opt-in Database 3110.

In opt-in processes which are assisted by the MASP 3200, the MASP 3200 may manage the details of the opt-in and opt-out process partially or in its entirety. In such implementations, the MASP 3200 can send the opt-in and opt-out messages to the MSDAVS 3100.

Different levels of integrity can be associated with different services. If the opt-in process was performed directly by the MSDAVS 3100 then a high level of integrity can be associated with the opt-in or registration information. If the MASP 3200 performed the opt-in process, then a different, for example lower level of integrity can be associated with the opt-in or registration information. The level of integrity can be communicated both to the user and to the Confidential Information Owner 3300. The user can authorize the release of information on different levels corresponding to the different levels of integrity of the Opt-in process.

Figure 32B:
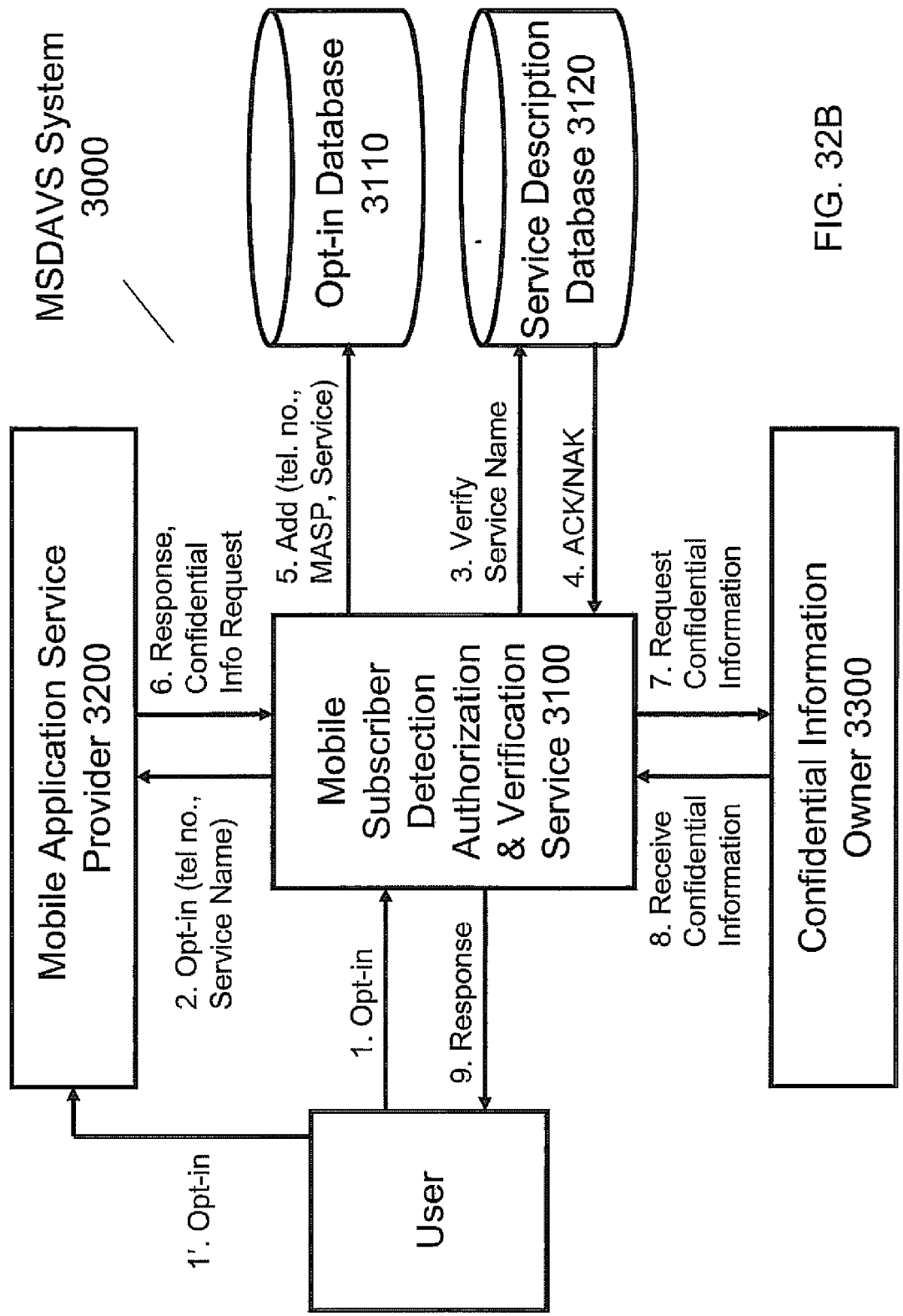

FIG. 32B illustrates an embodiment where the MASP 3200 is handling the opt-in process.

In step 32B-1, the user can opt-in either indirectly though the MSDAVS 3100 (step 32B-1), which opt-in message is then forwarded to the MASP 3200, or through the MASP 3200 directly (step 32B-1').

In step 32B-2 the MASP 3200 can register the opt-in and registration information, such as the telephone number of the user, and notify the MSDAVS-3100 about the registration.

In step 32B-3 the MSDAVS 3100 can send a verify communication to the Service Description Database 3120, which can respond by an acknowledge/not acknowledge (ACK/NAK) signal in step 32B-4.

In step 32B-5 the MSDAVS 3100 can store the registration information in its Opt-in Database 3110, which can now include not only the user's registration information but also the information regarding the MASP 3200. As in other embodiments, the registration information can contain various levels of authorization for accessing various levels of confidential information. The rest of the steps can proceed analogously to the embodiment of FIG. 32A.

Some embodiments of the MSDAVS 3100 can handle different types of mobile services in connection to different types of Confidential Information Owners 3300.

Next, specific embodiments of MSDAVS 3100 will be described.

Some embodiments include a Traffic-MSDAVS 3001, specialized for traffic related mobile alerting services. Examples include the traffic-oriented Mobile Passive Alerting service 100 and a traffic-oriented MAN service 1000. As described above in detail, some embodiments of these services can identify alert zones or Alert Areas in response to a traffic congestion or traffic alert information and then provide mobile services for the users in the Alert Areas.

Figure 33:
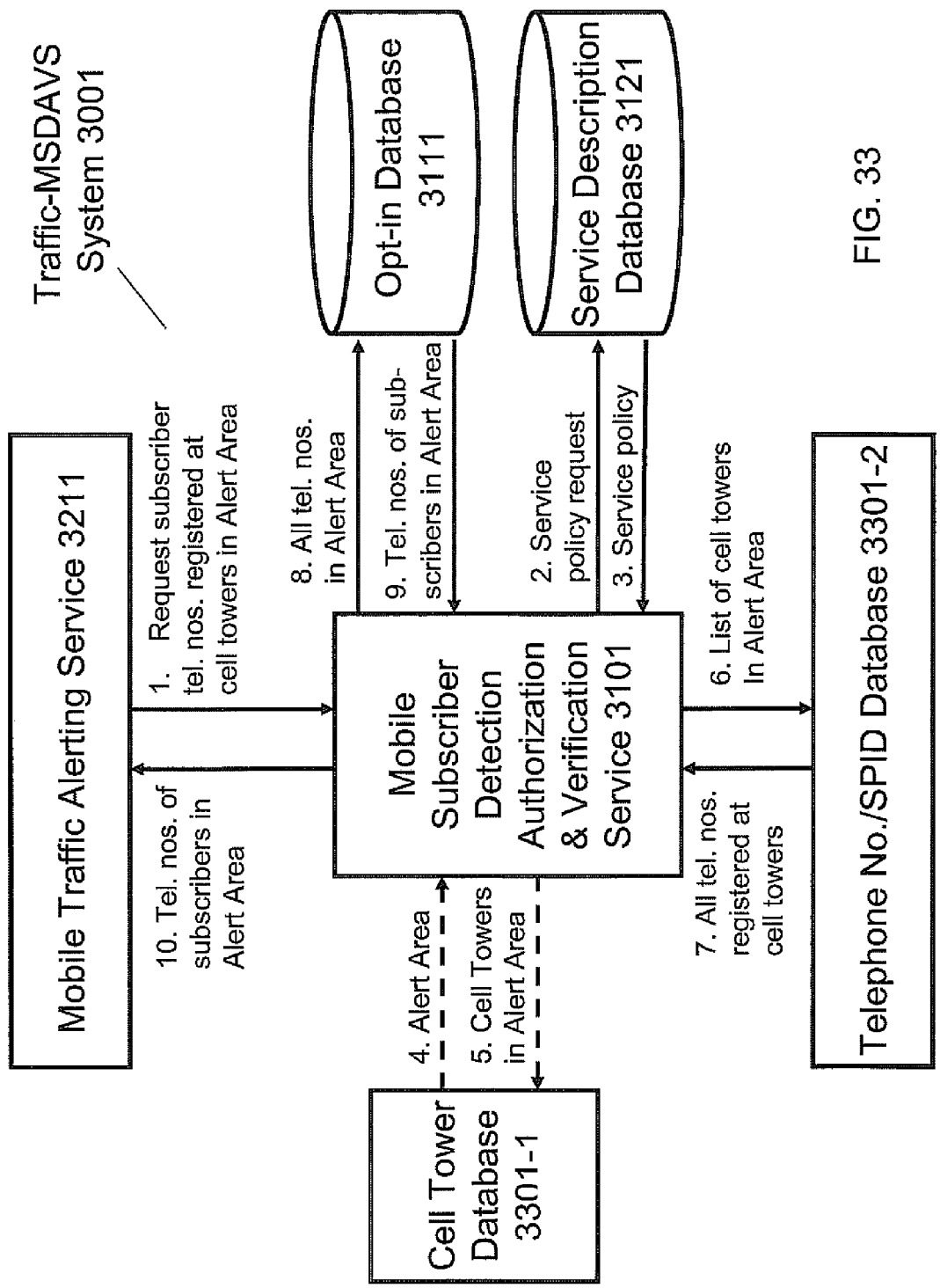
FIG. 33 illustrates die regular operation of a MSDAVS system.

FIG. 33 illustrates the operation of such a Traffic-MSDAVS System 3001, in relation to a Mobile Traffic Alerting Service 3211, after users opted into the service. Examples of this Mobile Traffic Alerting Service 3211 can include the Passive Alerting Service 100 and the Traffic-oriented MAN Service 1000.

In step 33-1, the Mobile Traffic Alerting Service 3211 can request from the MSDAVS 3101 the telephone numbers registered at the cell towers in an Alert Area. Here the Alert Area could be determined by a large variety of ways, as described above, based on traffic congestion or traffic alert information acquired from one or more sources.

In step 33-2, in response, the MSDAVS 3101 may inquire about the relevant service policies from its Service Description Database 3121.

In step 33-3, the Service Description Database 3121 may respond with the service policies, levels of confidentialities, etc.

In the optional step 33-4, the MSDAVS 3101 may contact a Cell Tower Database 3301-1 for a list of the cell towers which are in the Alert Area. It may often occur that the Alert Area extends to the region of more than one cell towers, in which case all cell towers within the Alert Area can be listed.

In the optional step 33-5, the Cell Tower Database 3301-1 may provide the list of the cell towers in the Alert Area. These cell towers may be operated by different wireless telephone operators.

In step 33-6, the MSDAVS 3101 may contact the Wireless Carriers 3311 who have the listed cell towers in the Alert Area, querying them for all the phone numbers which are registered at the listed cell towers in the Alert Area. If optional steps 4 and 5 were performed then the list of cell towers is provided by the Cell Towers Database 3301-1. If these optional steps were not performed, then the Wireless Carriers themselves can be requested to identify the cell towers in the Alert Area.

In some embodiments, the Wireless Carriers 3311 themselves operate a Global Telephone Number Database 3301-2, or a Global Service Profile Identifier (SPID) Database 3301-2. This database may also include Home Location Register (HLR) and Visitor Location Register (VLR) Databases. In other embodiments, an entity separate from the Wireless Carriers 3311 can be approached to provide the phone numbers. Such entities, somewhat analogous to (SMS) Aggregators, may manage databases which mirror the Telephone Number/SPID Database 3301-2 of the Wireless Carriers 3311. This request may be accompanied by the presentation of some level of authentication of the neutral, or third party status of the MSDAVS 3101.

In step 33-7, the Telephone Number/SPID Database 3301-2 may provide the list of all telephone numbers which are registered at the cell towers in the Alert Area back to the MSDAVS 3101.

Typically, in wireless systems the cell phones do not register their true phone numbers with the cell towers. A primary reason for this is to increase the security and confidentiality of wireless systems. Instead, cell phones have their "true phone number", such as their Mobile Identification Number (MIN) on GSM systems, or Electronic Serial Number (ESN) on CDMA systems, or Mobile Equipment Identification (MEID) in some planned future systems, fixed on the phone (e.g. on the SIM card), but not sent out after an initial registering or confirmation process. During regular operations, cell phones have a temporarily assigned virtual, or logical, phone number, often called an International Mobile Subscriber Identity (IMSI) and an International Mobile Equipment Identifier (IMEI), which indicate the virtual phone number, the maker and brand of the mobile phone, the network it is registered with and other information, respectively. These numbers can change in regular intervals, sometimes as often as a few times a day. Cell phones identify themselves to cell towers by sending out these IMSI/IMEI numbers, thus preserving a higher level of security.

There are large database operators, who manage "look-up tables", i.e. the correspondence between the virtual IMSI/IMEI phone numbers and the MIN/ESN/MEID numbers, which are needed for the actual identification of the subscribers. These Databases can include the Home Location Registry (HLR) and Visitor Location Registry (VLR) for roaming users. These look-up tables can be managed by the Wireless Carriers 3311 directly, or by some additional entities, which mirror the database maintained by the Wireless Carriers 3311. The actual identification of the subscribers and their phone numbers in steps 6-7 can include the use of these look-up databases.

Steps 4-7 may result in dumping all phone numbers, registered at cell towers in the Alert Area, for the Mobile Traffic Alerting Service 3211. This step is performed in communication with the Wireless Carriers 3311 and the Telephone Number Databases. Requesting the bulk, or complete list of telephone numbers registered at cell towers in the Alert Area typically costs a small fraction of the cost of requesting the location of each cell phone subscriber from the Wireless Carrier separately ("dipping") and then determining whether the cell phone user is in the Alert Area. This latter approach would typically require a location-identification by triangulation or a GPS or GPS-equivalent method with an unnecessarily high accuracy, such as determining the longitude-latitude of the user by the Wireless Carrier 3311.

Instead, the Mobile Traffic Alerting Service 3211 can operate based on the lower-accuracy location information of whether the cell phone is within the Alert Area. This location information can be generated by simply dumping all cell phone numbers registered at cell towers in the Alert Area, without performing any individual triangulation.

Further, the high accuracy method may require regular/continuous updates from the Wireless Carrier 3311, multiplying the cost. For all the above reasons, the described dumping of all numbers registered at the Alert Area cell towers can be much cheaper and faster than the individual triangulation approach. As such, it is an efficient gateway to higher accuracy location information based services.

In step 33-8, the MSDAVS 3101 can forward the list of all phone numbers in the Alert Area to the Opt-in Database 3111. The Opt-in Database 3311 can cross-reference or filter this list of all phone numbers against the registered users of the Mobile Traffic Alerting Service 3211 and create a list of the subscribers of the Mobile Traffic Alerting Service 3211 within the Alert Area and their phone numbers.

In step 33-9, the Opt-in Database 3311 can send this list back to the MSDAVS 3101.

In step 33-10, the MSDAVS 3101 can send the list of the subscribers of the Mobile Traffic Alerting Service 3211 within the Alert Area and their phone numbers to the Mobile Traffic Alerting Service 3211. This enables the Mobile Traffic Alerting Service 3211 to start the traffic alerting service to the subscribers in the Alert Area.

Figure 34:
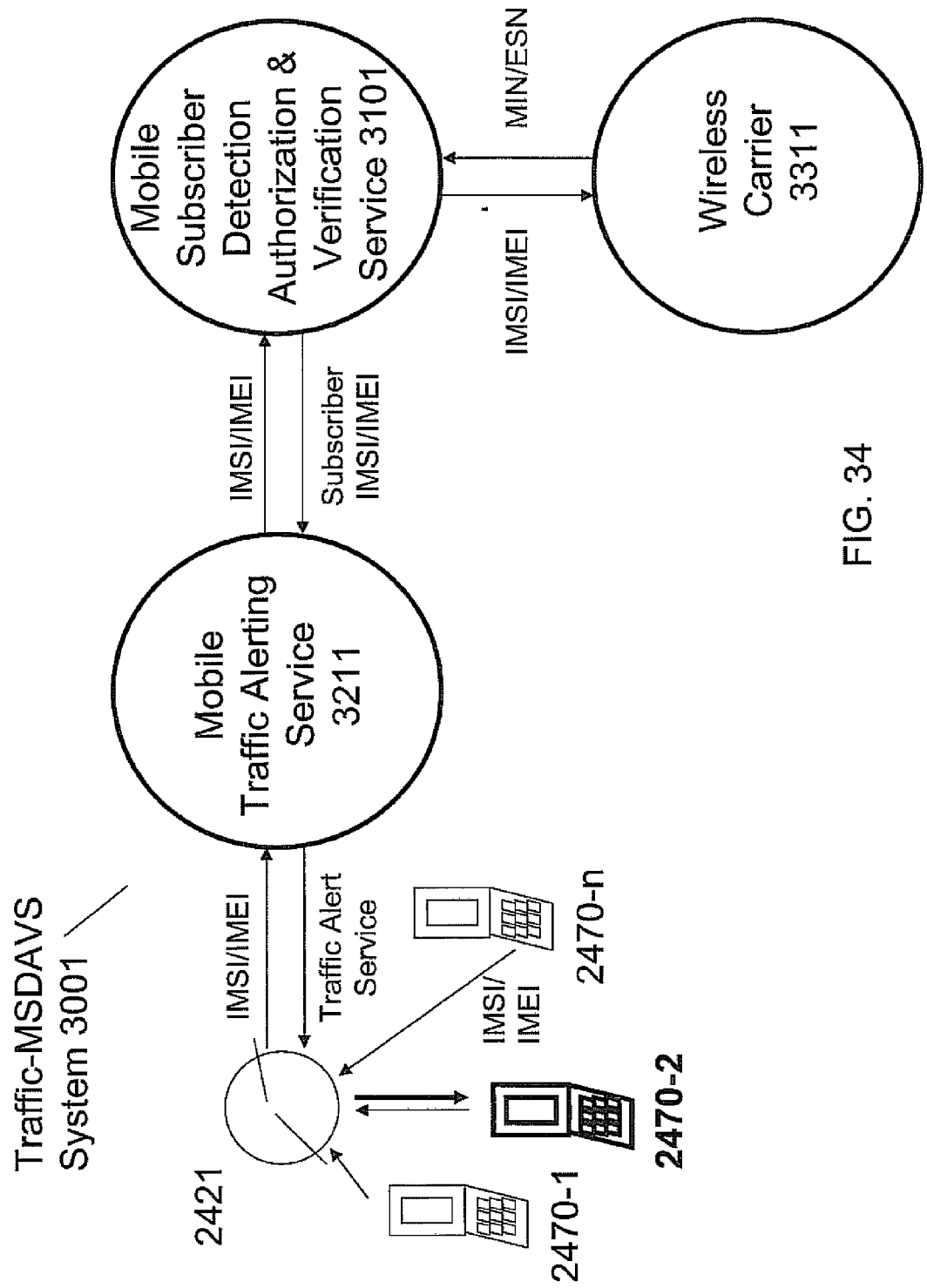
FIG. 34 illustrates the movement of the various phone numbers in an embodiment of the MSDAVS system.

FIG. 34 illustrates the implementation of the above steps regarding the flow of the IMSI/IMEI and MIN/ESN numbers in a particular embodiment of the Traffic-MSDAVS 3001. When the cell towers are identified in the Alert Area by the Mobile Traffic Alerting Service 3211 and the MSDAVS 3101, such as cell tower 2421, all the IMSI/IMEI numbers, sent by the cell phone hand sets 2470-1, . . . n to this cell tower 2421 are forwarded to the Traffic-MSDAVS 3101 either directly or indirectly through the Mobile Traffic Alerting Service 3211. The Traffic MSDAVS 3101 can then acquire the complete list of MIN/ESN corresponding to these IMSI/IMEI numbers from the Wireless Carrier 3311 or another Telephone Number Directory/SPID Database Manager, who mirrors the phone number look-up table of the Wireless Carrier.

The Traffic-MSDAVS 3101 can then cross-reference, or filter the complete list of the ESN/MIN numbers against the list of subscribers with the help of the Opt-in Database 3111 and inform the Mobile Traffic Alerting Service 3211 about the IMSIE/IMEI numbers of the subscribers of the Mobile Traffic Alerting Service in the Alert Area. With this information, the Mobile Traffic Alerting Service 3211 can start providing the Mobile Traffic Alert Service to the identified subscribers in the Alert Area, such as to handset 2470-2, indicated by bold outlines.

In some embodiments the confidentiality of the confidential information, such as the true identity of the subscribers, encoded in their ESN/MIN numbers, and their location, can remain protected. In these embodiments, the Mobile Traffic Alert Service 3211 does not acquire the true identity of the subscribers: this information remains protected at the trusted Traffic-MSDAVS 3101. Further, the Mobile Traffic Alert Service 3211 does not store or track the location information of the subscribers either. These confidentiality measures ensure e.g. that the Mobile Traffic Alerting Service 3211 does not keep spamming the subscriber after the subscriber exited the traffic Alert Area, or at a later time no agency can access these confidential information, not even by compelling the Mobile Traffic Alerting Service 3211.

Figure 35:
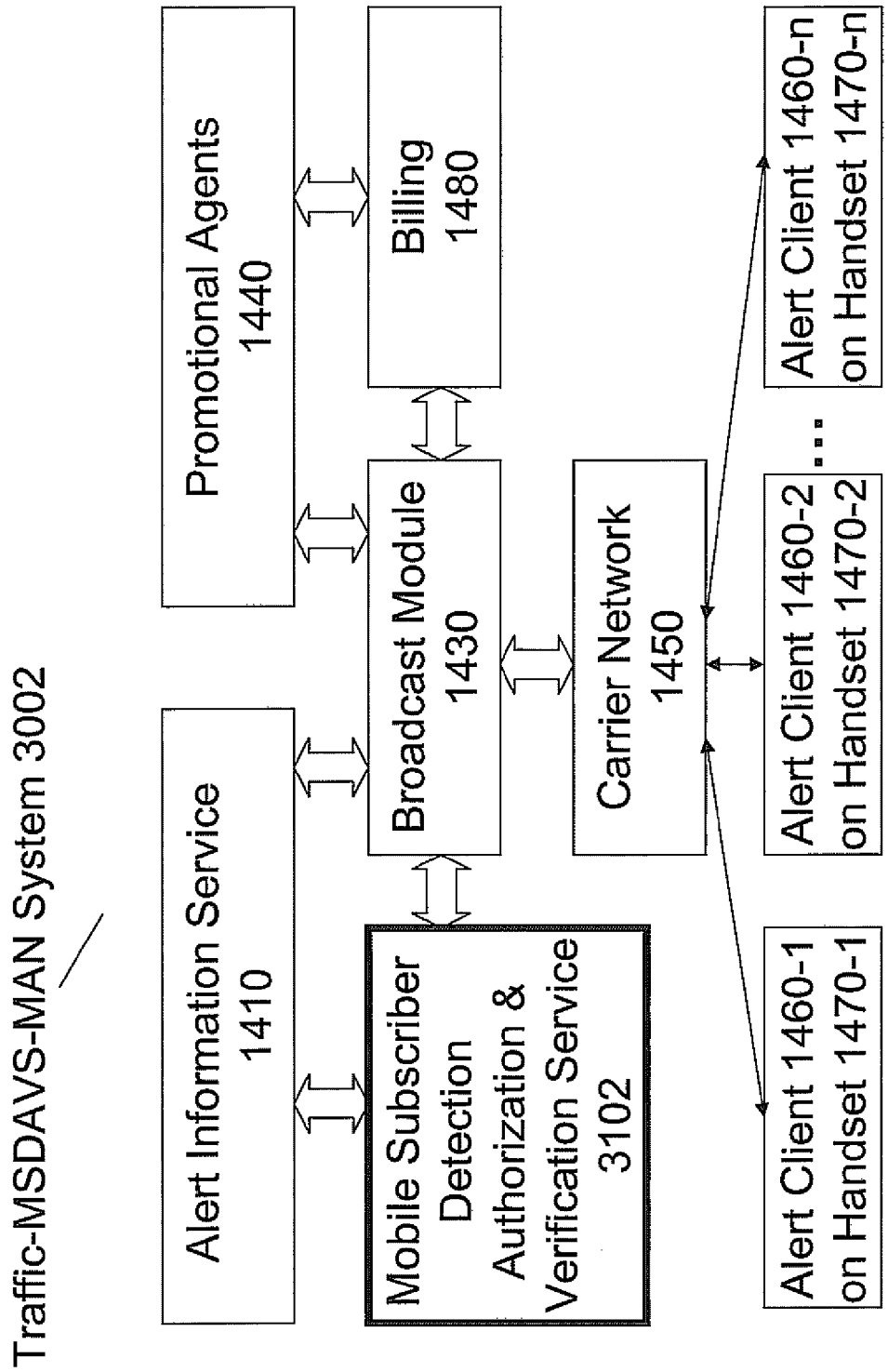
FIG. 35 illustrates a Traffic-MSDAVS MAN system.

FIG. 35 illustrates a Traffic-MSDAVS-MAN System 3002. Most blocks and their function are analogous to those of FIG. 17 and will not be described here. A difference relative to the MAN system of FIG. 17 is that the Subscriber Selector 1420 is replaced by the MSDAVS 3102. The MSDAVS 3102 can provide the Broadcast Module 1430 with the list of identified subscribers e.g. according to the protocol described in relation to FIGS. 31-34. In response, the Broadcast Module 1430 can provide the Mobile Traffic Alerting Service to the identified subscribers in the Alert Area.

Figure 36:
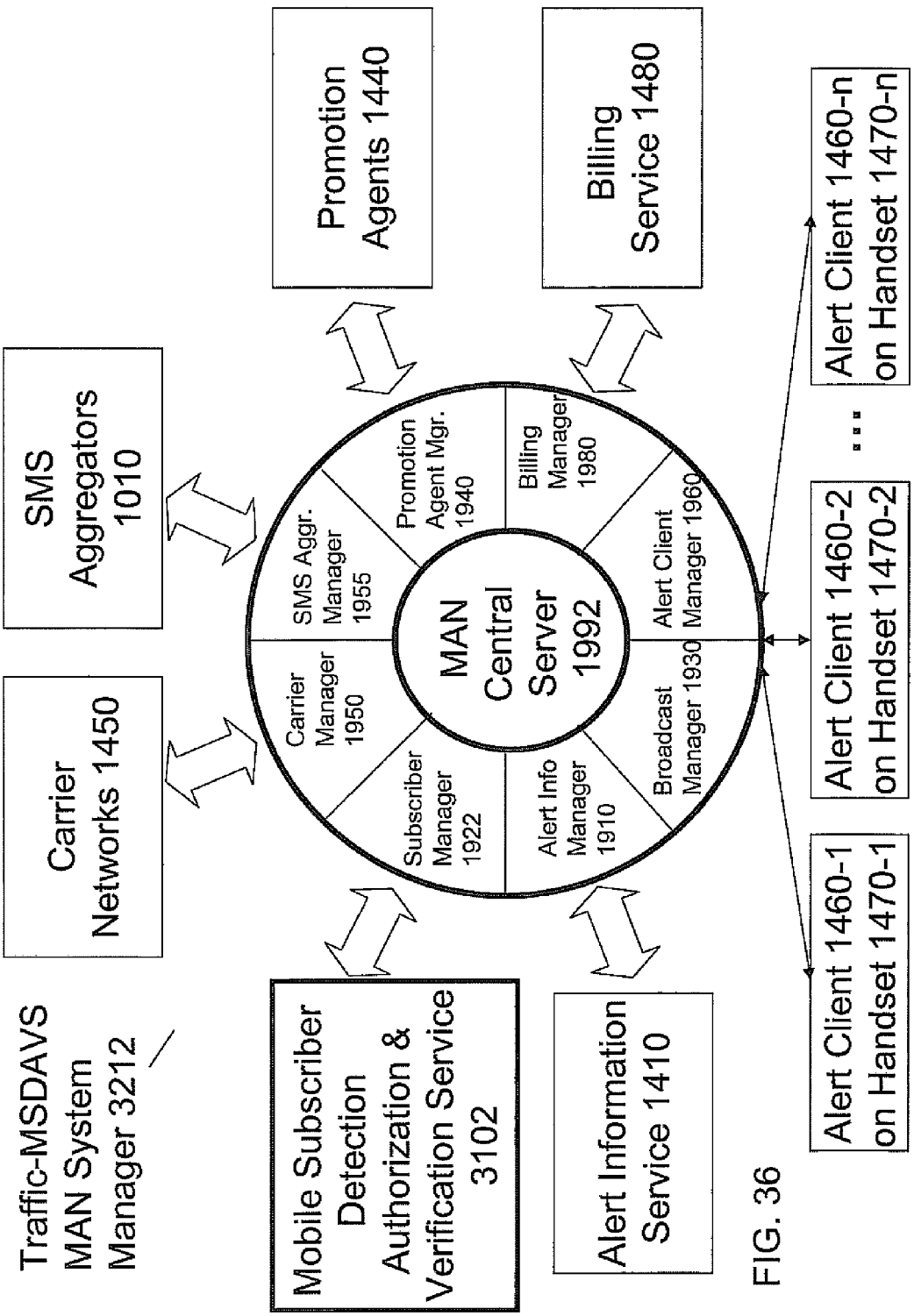
FIG. 36 illustrates a Traffic MSDAVS MAN System Manager.

FIG. 36 illustrates the Traffic-MSDAVS MAN System Manager 3212. FIG. 36 in analogous to FIG. 24 and the similarly labeled elements will not be described here. A difference relative to the MAN System Manager 1900 of FIG. 24 is that the subscriber selector 1420 is replaced by the Traffic-MSDAVS 3102. The Traffic-MSDAVS 3102 can provide the Subscriber Manager 1922 and the MAN Central Server 1992 with the list of subscribers in an Alert Area, identified e.g. according to the protocol described in relation to FIGS. 31-34. In response, the MAN Central Server 1992 can provide the Mobile Traffic Alerting Service to the identified subscribers in the Alert Area.

Figure 37:
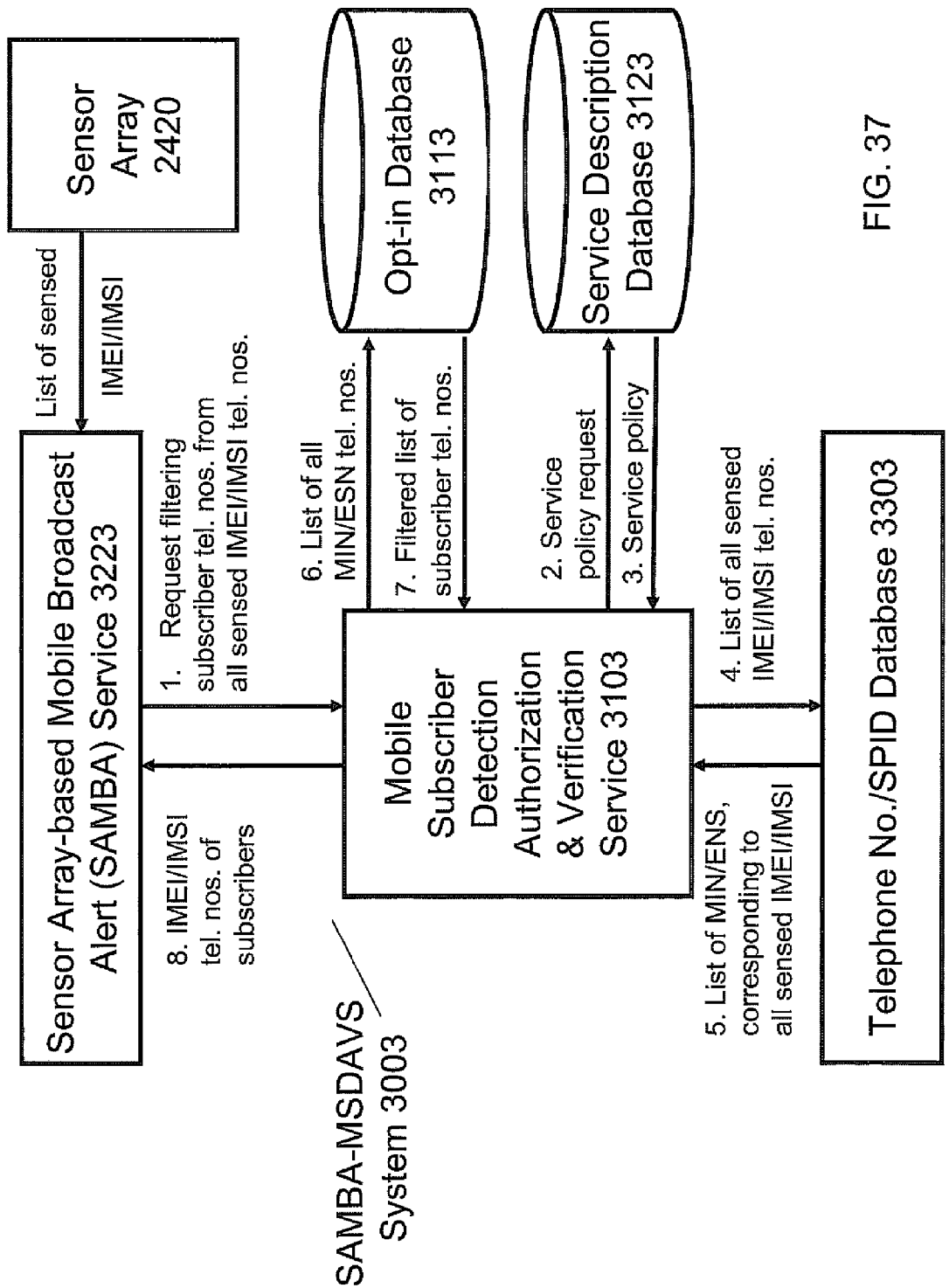
FIG. 37 illustrates a SAMBA-MSDAVS system.

FIG. 37 illustrates a Sensor-Based MSDAVS, or SAMBA-MSDAVS system 3003. In embodiments of the SAMBA-MSDAVS system 3003 the SAMBA Service 3223 can acquire the IMEI/IMSI of all cell phones in an operation area, such as a gaming floor of a casino, any office or workplace, conference, sports, high density traffic space, or educational space, including exhibit centers, sport-stadia, busy intersections, hose-race viewing/betting areas and college campuses. This can be achieved by the sensor array system of the SAMBA service 2000, as described in relation to FIGS. 25-30, especially FIGS. 27 and 29. This step can be analogous to acquiring the list of all cell phone numbers registered at cell towers in an Alert Area in the Traffic-related applications.

It may be preferred to introduce a well defined operational area for the SAMBA service 2000 and SAMBA-MSDAVS System 3003, to enhance the confidentiality of the service. Examples include having the sensor array operate specifically on a gaming floor of a hotel, but not in the upper floors, where the rooms are located.

In the SAMBA-MSDAVS System 3003 the Sensor Array 2420 can provide a list of all IMEI/IMSI sensed (virtual/logical) phone numbers to the SAMBA-MSDAVS Service 3223. Any kind of sensor arrays can be implemented based e.g. on WiFi or cell phone sensors.

In step 37-1, the SAMBA-MSDAVS service 3223 can forward the complete list of sensed IMEI/IMSI phone numbers to the MSDAVS 3103.

In step 37-2 the MSDAVS 3103 can request the service policy regarding this SAMBA-MSDAVS service from its Service Description Database 3123, which can respond in step 37-3 with the service policy regarding this service, such as levels of authorization required for accessing various confidential data, level of integrity of the service, and level of tracking and storing the data, if at all.

In step 37-4, the MSDAVS 3103 can forward all sensed IMEI/IMSI phone numbers to a Telephone Number/SPID Database 3303. This Database 3303 can perform the look-up function and identify the ESN/MIN corresponding to the sensed IMEI/IMSI numbers.

In step 37-5, the Telephone Number/SPID Database 3303 can return the complete list of MIN/ESNs, corresponding to all the sensed IMEI/IMSIs, to the MSDAVS 3103.

In step 37-6, the MSDAVS 3103 can forward this complete ESN/MIN list to the Opt-in Database 3113. The Opt-in Database 3113 can cross-reference, or filter, this complete list of MIN/ESNs against the stored or archived list of subscribers, in a look-up table type functionality.

In step 37-7, the Opt-in Database 3113 can return the list of the subscriber IMEI/IMSI telephone numbers to the MSDAVS 3103, determined by the above cross-referencing or filtering.

In step 37-8, the MSDAVS 3103 can provide this filtered list of subscriber telephone numbers to the SAMBA-MSDAVS service 3223, which then can start providing the SAMBA service 2000 exclusively to the identified subscribers. As described above in great detail, this SAMBA service 2000 can involve sending messages, promotions, alerts or notifications to the subscribers based on their location and their previously identified interests, including gaming, financial, sports, traffic or any other types of interest. FIGS. 25 and 26 illustrate in great detail the SAMBA service, and any combination of the presently described SAMBA-MSDAVS System 3003 and the SAMBA embodiments of FIGS. 25 and 26 can be implemented as well.

Figure 38:
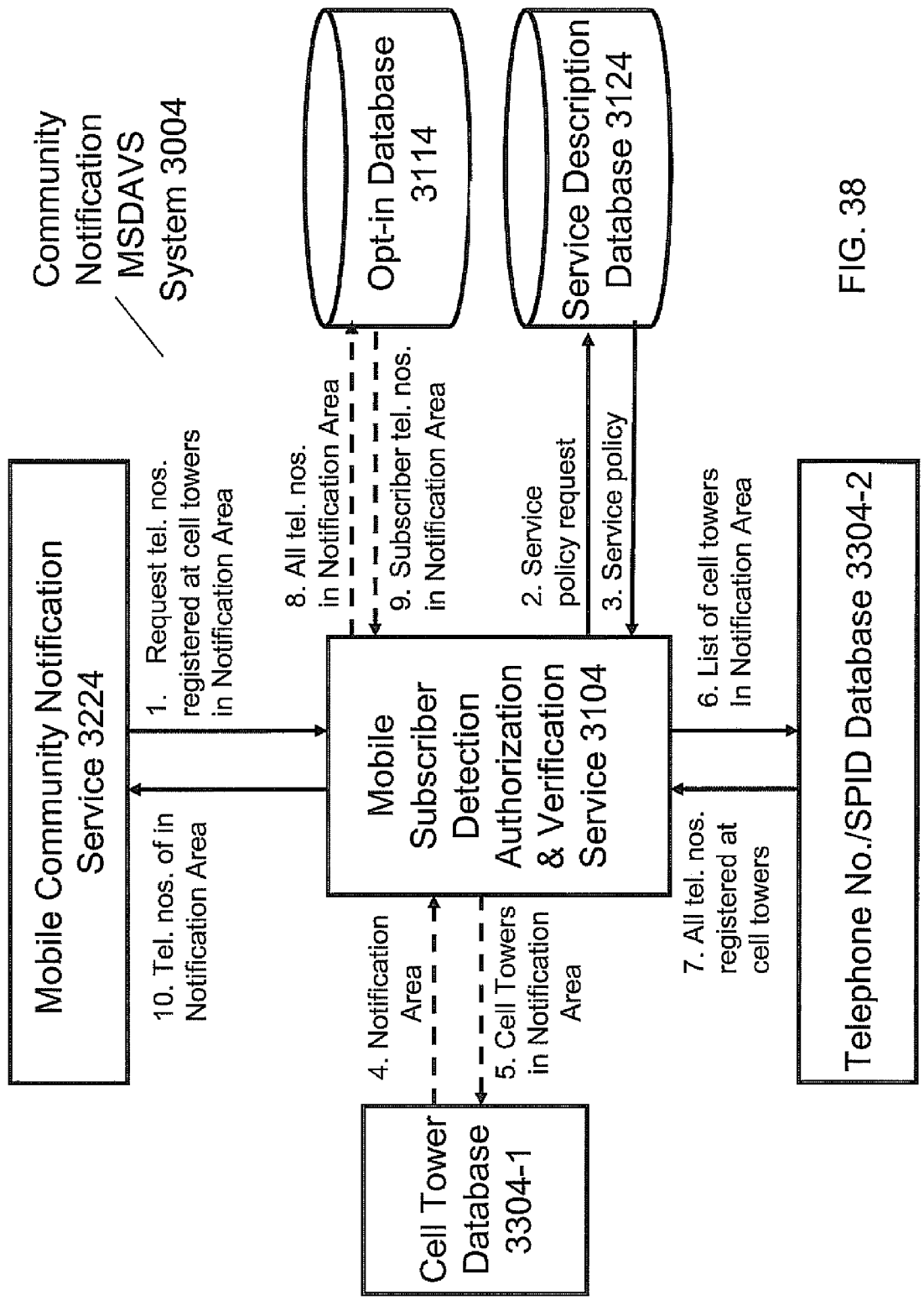
FIG. 38 illustrates a Mobile Community Notification System.

FIG. 38 illustrates a Community Notification MSDAVS System 3004. In some embodiments, a community may wish to implement mobile notification systems. Examples include campuses, where the administration or the police may wish to notify the students about an event of concern, such has a criminal activity. Or in other cases a county administration may wish to notify the residents of the county about an event of concern, such as a rapidly advancing fire or mudslide, necessitating the quick organization of the resident's mobilization and movement patterns, such as preferred or dis-preferred routes.

After learning about an event of concern, such as the above described criminal activity or natural catastrophe, a Mobile Community Notification Service (MCNS) 3224 may wish to notify the community it serves.

In step 38-1 the MCNS 3224 can request the telephone numbers of all community members or residents within a Notification Area from the MSDAVS 3104. This Notification Area can be defined e.g. by the cell towers within this area, in which case the MCNS 3224 can request all telephone numbers registered at cell towers within the Notification Area.

In steps 38-2 and 38-3 the MSDAVS 3104 can communicate with the Service Policy Database 3124 regarding the proper procedure and policy for such a process.

In the optional step 38-4, the MSDAVS 3104 can request the list of all cell towers within the Notification Area, as defined by the MCNS 3224, from a Cell Tower Database 3304-1.

In the corresponding optional step 38-5, the Cell Tower Database 3304-1 can provide the list of cell towers in the Notification Area.

In step 38-6, the MSDAVS 3104 can request all the cell phone numbers registered at the cell towers within the Notification Area from a Telephone Number Directory/SPID database 3304-2.

In step 38-7, the Telephone Number Directory/SPID database 3304-2 can return all phone numbers registered at the identified cell towers.

In some implementations, this Mobile Community Notification MSDAVS System 3004 can be opt-in based, in others it can be not opt-in based. A feature of the of the non-opt-in based service is that all members of the community can be reached, if the event of concern truly requires it, such as the above mentioned dangerous criminal activity on a campus or a rapidly advancing fire in a residential area. A feature of the opt-in based system is that it can provide notification about events, which are important, but are of less pressing nature. Some implementations may offer both levels of access, and allow the operator of the Mobile Community Notification Service 3224 to choose the level of the Notification. There can be various levels of the approval process to gain the right to operate such a non-opt-in MCNS 3224, to make sure that the system is used properly.

In an opt-in based MCNS 3224 steps 38-8 and 38-9 can be performed, where the MSDAVS 3104 communicates with an Opt-in Database 3114 to filter the complete list of phone users in the Notification Area against an Opt-in Database to identify the subscribers in the Notification Area. This filtered list can be returned in step 38-9 by the Opt-in Database 3114.

In a non-opt-in based MCNS 3224 steps 38-8 and 38-9 may not be performed.

In step 38-10 the list of telephone numbers, either filtered or non-filtered, can be forwarded to the Mobile Community Notification Service 3224, which in turn can start notifying the members in the Notification Area.

The above described Mobile Subscriber Detection Authorization and Verification Systems 3000-3004 can be organized according to numerous business models. In systems, where the confidentiality of the information is highly valued, the MSDAVS 3100 and the MAPS 3200 can be separate entities to ensure the required and expected confidentiality. In other systems, where other aspects are more highly prized, any combination of the MSDAVS 3100, the MAPS 3200, and the Confidential Information Owner 3300 can have various levels of business relationships, ranging from a contractual, through partially commonly owned, to fully commonly owned relationships.

While the invention was described in relation to specific embodiments only, these descriptions should not be construed as limiting. On the contrary, these embodiments were provided only by way of illustrations. Any combination of the above examples, any type of sub-combinations, and all types of inclusions of equivalent embodiments are within the scope of the invention. The invention is only limited by the appended claims.

The invention claimed is:

1. A system comprising:
   a Mobile Subscriber Detection Authorization and Verification System (MSDAVS), configured to:
   receive, from a mobile application service provider (MASP), an alert area defining a geographic area associated with an event of interest to users of the MASP;
   request confidential information from a confidential information owner, the confidential information including a list of telephone numbers of opted-in users within the alert area;
   receive the confidential information from a confidential information owner relating to a user who opted-in to the mobile alerting service; and
   communicate the received confidential information to the MASP.

2. The system of claim 1, the MSDAVS comprising:
   an opt-in database, to store opt-in or registration data of the opted-in users of the mobile service application.

3. The system of claim 1, the MSDAVS comprising:
   a service policy database, to store policy data regarding the mobile alerting service.

4. The system of claim 1, wherein the confidential information owner is one of a wireless carrier, a financial record manager, a gaming information manager, and an educational information manager.

5. The system of claim 1, wherein the mobile application service provider is one of a mobile traffic alert network, a location based service, a mobile application, a mobile financial application, a mobile educational application and a mobile gaming application.

6. The system of claim 1, wherein:
the mobile alerting service is a mobile traffic alerting service;
the confidential information owner is a telephone number database of one of a wireless carrier or a telephone number database operator; and
the requested confidential information is a list telephone numbers of opted-in users in an alert area, defined by the mobile traffic alerting service.

7. The system of claim 6, wherein:
the alert area is defined by the mobile service provider by identifying the corresponding alert area cell towers; and
the list of phone numbers is generated by compiling the list of all phone numbers, registered at the alert area cell towers.

8. The system of claim 7, wherein the MSDAVS is configured:
to acquire a list of cell towers in the alert area from a cell tower database;
to forward the list of alert area cell towers to a telephone number database; and
to receive a list of telephone numbers registered at the cell towers from the telephone number database.

9. The system of claim 1, wherein the MSDAVS is configured:
to communicate the received list of telephone numbers in the alert area to an opt-in database;
to cause the opt-in database to cross reference the list of telephone numbers with a list of opted-in users to create a list of telephone numbers of the opted-in users in the alert area; and
to receive from the opt-in database the list of telephone numbers of the opted-in users in the alert area.

10. The system of claim 7, wherein the MSDAVS is configured:
to receive a list of virtual telephone numbers registered at alert area cell towers;
to forward the received list to a telephone number database; and
to receive a list of mobile equipment identifiers and corresponding virtual telephone numbers from the telephone number database, created by the telephone number database based on the list of virtual telephone numbers.

11. The system of claim 10, wherein the MSDAVS is further configured:
to communicate the list of mobile equipment identifiers and corresponding virtual telephone numbers to the opt-in database for cross-referencing;
to receive a list of virtual telephone numbers of opted-in users in the alert area, created through cross-referencing by the opt-in database; and
to communicate the list of virtual telephone numbers of opted-in users in the alert area to the provider of the mobile traffic alerting service.

12. The system of claim 1, wherein:
the mobile alerting service is a sensor array-based mobile broadcast alerting (SAMBA) service;
the confidential information owner is a telephone number database of one of a wireless carrier or a telephone number database operator; and
the requested confidential information is a list telephone numbers of opted-in users in a SAMBA operation area.

13. The system of claim 12, wherein:
the list of phone numbers is generated by compiling the list of phone numbers, sensed by sensors in the SAMBA operation area.

14. The system of claim 13, wherein the MSDAVS is configured:
to communicate the received list of telephone numbers to an opt-in database;
to cause the opt-in database to cross reference the list of telephone numbers with a list of opted-in users to create a list of the telephone number of the opted-in users in the SAMBA operation area; and
to receive from the opt-in database the list of the telephone numbers of the opted-in users in the SAMBA operation area.

15. The system of claim 13, wherein the MSDAVS is configured:
to receive a list of virtual telephone numbers sensed by SAMBA sensors;
to forward the received list to a telephone number database; and
to receive a list of mobile equipment identifiers and corresponding virtual telephone numbers from the telephone number database, created by the telephone number database based on the list of virtual telephone numbers.

16. The system of claim 15, wherein the MSDAVS is further configured:
to communicate the list of mobile equipment identifiers and corresponding virtual telephone numbers to the opt-in database for cross-referencing;
to receive a list of virtual telephone numbers of opted-in users in the SAMA operation area, created through cross-referencing by the opt-in database; and
communicating the list of virtual telephone numbers of opted-in users in the SAMBA operation area to the provider of the SAMBA service.

17. A method of operating a Mobile Subscriber Detection Authorization and Verification System, the method comprising the steps of:
receiving an alert area defining a geographic region associated with an event of interest to an opted-in user of a mobile application service;
requesting confidential information from a confidential information owner in connection to providing the mobile application service to an opted-in user, the request for the confidential information including the alert area;
receiving the requested confidential information; and
relaying the confidential information to a provider of the mobile application service.

18. The method of claim 17, further comprising:
receiving an opt-in message from a user to opt-in to the mobile application service; and
storing at least a portion of the opt-in message in an opt-in database.

19. The method of claim 17, further comprising:
requesting service policy information regarding the opted-in mobile application service from a service description database; and
receiving a response regarding service policy in connection to the opted-in mobile application service from the service description database.

20. The method of claim 17, further comprising:
forwarding at least a portion of the opt-in message to a provider of the mobile application service; and
receiving a request from the provider of the mobile application service for the confidential information.

21. The method of claim 17, wherein:
the mobile application service is a mobile traffic alerting service;
the confidential information owner is a telephone number database of one of a wireless carrier or a telephone number database operator; and
the requested confidential information is a list telephone numbers of opted-in users in the alert area, defined by the mobile traffic alerting service.

22. The method of claim 21, wherein:
the alert area is defined by the mobile service provider by identifying the corresponding alert area cell towers; and
the list of phone numbers is generated by producing the list of phone numbers, registered at the alert area cell towers.

23. The method of claim 22, further comprising the steps of:
acquiring a list of cell towers in the alert area from a cell tower database;
forwarding the list of alert area cell towers to a telephone number database; and
receiving a list of all telephone numbers registered at the cell towers from the telephone number database.

24. The method of claim 23, further comprising the step of:
communicating the received list of telephone numbers in the alert area to an opt-in database;
causing the opt-in database to cross reference the list of phone numbers with a list of opted-in users to create a list of opted-in users in the alert area; and
receiving from the opt-in database the list of telephone numbers of the opted-in users in the alert area.

25. The method of claim 22, comprising:
receiving a list of virtual telephone numbers registered at alert area cell towers;
forwarding the received list to a telephone number database; and
receiving a list of mobile equipment identifiers and corresponding virtual telephone numbers from the telephone number database, created by the telephone number database based on the list of virtual telephone numbers.

26. The method of claim 25, comprising:
communicating the list of mobile equipment identifiers and corresponding virtual telephone numbers to the opt-in database for cross-referencing;
receiving a list of virtual telephone numbers of opted-in users in the alert area, created through cross-referencing by the opt-in database; and
communicating the list of virtual telephone numbers of opted-in users in the alert area to the provider of the mobile traffic alerting service.

27. The method of claim 17, wherein:
the mobile application service is a sensor array-based mobile broadcast alerting (SAMBA) service;
the confidential information owner is a telephone number database of one of a wireless carrier or a telephone number database operator; and
the requested confidential information is a list of telephone numbers of opted-in users in a SAMBA operation area.

28. The method of claim 27, wherein:
the list of phone numbers is generated by compiling the list of phone numbers, sensed by sensors in the SAMBA operation area.

29. The method of claim 27, comprising:
communicating the received list of telephone numbers to an opt-in database;
causing the opt-in database to cross reference the list of phone numbers with a list of opted-in users to create a list of telephone numbers of the opted-in users in the SAMBA operation area; and
receiving from the opt-in database the list of the telephone numbers of the opted-in users in the SAMBA operation area.

30. The method of claim 27, comprising:
receiving a list of virtual telephone numbers sensed by SAMBA sensors;
forwarding the received list to a telephone number database; and
receiving a list of mobile equipment identifiers and corresponding virtual telephone numbers from the telephone number database, created by the telephone number database based on the list of virtual telephone numbers.

31. The method of claim 27, comprising:
communicating the list of mobile equipment identifiers and corresponding virtual telephone numbers to the opt-in database for cross-referencing;
receiving a list of virtual telephone numbers of opted-in users in the SAMBA operation area, created through cross-referencing by the opt-in database; and
communicating the list of virtual telephone numbers of opted-in users in the SAMBA operation area to the provider of the SAMBA service.

32. A system for providing a mobile application service, comprising:
a mobile application service provider (MASP), configured to:
send a request to a Mobile Subscriber Detection Authorization and Verification System (MSDAVS) for confidential information from a confidential information owner in connection to providing the mobile application service to opted-in users, the request including an alert area defining a geographic area associated with an event tracked by the MASP;
receive, from the MSDAVS, the requested confidential information including a list of telephone numbers of opted-in users within the alert area; and
provide the mobile application service to the opted-in users upon the receipt of the confidential information.

33. The system of claim 32, the MASP comprising:
an opt-in database, to store opt-in or registration data of the opted-in users of the mobile application service.

34. The system of claim 32, the MASP comprising:
a service policy database, to store policy data regarding the mobile application service.

35. The system of claim 32, wherein the confidential information owner is one of a wireless carrier, a financial record manager, a gaming information manager, a mobile service information manager, and an educational information manager.

36. The system of claim 32, wherein the mobile application service provider is one of a mobile traffic alert network, a location based service, a mobile information service application, a mobile financial application, a mobile educational application and a mobile gaming application.

37. The system of claim 32, wherein
the mobile application service is a mobile traffic alerting service;
the confidential information owner is a telephone number database of one of a wireless carrier or a telephone number database operator; and
the requested confidential information is a list telephone numbers of opted-in users in an alert area, defined by the mobile traffic alerting service.

38. The system of claim 37, wherein
the alert area is defined by the mobile service provider by identifying the corresponding alert area cell towers; and
the list of phone numbers is generated by producing the list of phone numbers, registered at the alert area cell towers.

39. The system of claim 38, wherein the MASP is configured:
to receive from the MSDAVS the list of telephone numbers of opted-in users in the alert area; and
to provide the mobile traffic alerting service to the opted-in users in the alert area.

40. The system of claim 32, wherein:
the mobile application service is a sensor array-based mobile broadcast alerting (SAMBA) service;
the confidential information owner is a telephone number database of one of a wireless carrier or a telephone number database operator; and
the requested confidential information is a list telephone numbers of opted-in users in a SAMBA operation area.

41. The system of claim 40, wherein:
the list of phone numbers is generated by compiling the list of phone numbers, sensed by sensors in the SAMBA operation area.

42. The system of claim 40, wherein the SAMBA service provider is configured:
to receive the list of opted-in users in the SAMBA operation area from the MSDAVS; and
to provide the SAMBA service to the opted-in users in the SAMBA operation area.

43. A method of providing a mobile application service, the method comprising:
directing a Mobile Subscriber Detection Authorization and Verification System (MSDAVS) to request confidential information from a confidential information owner to assist the providing of the mobile application service to opted-in users, the directing including defining an alert area associated with an event tracked by the mobile application service;
receiving the confidential information, acquired by the MSDAVS from the confidential information owner; and
providing the mobile application service to the opted-in user.

44. A mobile community notification system, comprising:
a Mobile Subscriber Detection Authorization and Verification System (MSDAVS), configured to:
request confidential information from a confidential information owner, the confidential information related to a notification area defining a geographic region associated with an event identified by the mobile community notification system;
receive the requested confidential information including data allowing the mobile community notification system to contact users within the notification area; and
to communicate the received confidential information to the mobile community notification service (MCNS) provider.

45. The system of claim 44, wherein:
the confidential information owner is a telephone number database of one of a wireless carrier or a telephone number database operator; and
the requested confidential information is a list telephone numbers of users in the notification area.

46. The system of claim 45, wherein:
the notification area is defined by the mobile community notification service provider by identifying the corresponding notification area cell towers; and
the list of phone numbers is generated by compiling the list of phone numbers, registered at the notification area cell towers.

47. The system of claim 44, wherein the MSDAVS is configured:
to acquire a list of cell towers in the notification area from a cell tower database;
to forward the list of notification area cell towers to a telephone number database; and
to receive a list of telephone numbers registered at the cell towers from the telephone number database.

48. The system of claim 47, wherein the MSDAVS is configured:
to receive a list of virtual telephone numbers registered at alert area cell towers;
to forward the received list to a telephone number database; and
to receive a list of mobile equipment identifiers and corresponding virtual telephone numbers from the telephone number database, created by the telephone number database based on the list of virtual telephone numbers.

* * * * *

UNITED STATES PATENT AND TRADEMARK OFFICE
CERTIFICATE OF CORRECTION

| | | |
|---|---|---|
| PATENT NO. | : 8,306,503 B2 | Page 1 of 1 |
| APPLICATION NO. | : 12/351641 | |
| DATED | : November 6, 2012 | |
| INVENTOR(S) | : James Morrison | |

It is certified that error appears in the above-identified patent and that said Letters Patent is hereby corrected as shown below:

On page 2, in column 1, under "U.S. Patent Documents", line 1, delete "370/961" and insert --340/961--, therefor On page 2, in column 2, under "Other Publications", line 21, delete "11/970,922 ," and insert --11/970,922,--, therefor On page 2, in column 2, under "Other Publications", line 29, delete "12/251,155 ," and insert --12/251,155,--, therefor On page 2, in column 2, under "Other Publications", line 41, delete "12/566,012 ," and insert --12/566,012,--, therefor On page 2, in column 2, under "Other Publications", line 49, delete "12/402,286 ," and insert --12/402,286,--, therefor In column 52, line 32, in Claim 16, delete "SAMA" and insert --SAMBA--, therefor Signed and Sealed this
Nineteenth Day of March, 2013

Teresa Stanek Rea
*Acting Director of the United States Patent and Trademark Office*